US012629984B2

(12) United States Patent
    Nomura

(10) Patent No.: US 12,629,984 B2
(45) Date of Patent: May 19, 2026

(54) VEHICLE AIR CONDITIONER

(71) Applicant: DENSO CORPORATION, Kariya-city (JP)

(72) Inventor: Tomoyuki Nomura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 60 days.

(21) Appl. No.: 18/510,782

(22) Filed: Nov. 16, 2023

(65) Prior Publication Data

US 2024/0083216 A1 Mar. 14, 2024

Related U.S. Application Data

(63) Continuation of application No. PCT/JP2022/020763, filed on May 19, 2022.

(30) Foreign Application Priority Data

Jun. 1, 2021 (JP) ................................. 2021-092303

(51) Int. Cl.
    *B60H 1/00* (2006.01)
    *B60H 1/22* (2006.01)
(52) U.S. Cl.
    CPC ........... *B60H 1/00878* (2013.01); *B60H 1/22* (2013.01); *B60H 2001/00961* (2019.05)
(58) Field of Classification Search
    CPC ........... B60H 1/00878; B60H 1/32284; B60H 1/00921; B60H 2001/00961; B60H 2001/00307; B60H 2001/00928; B60H 2001/00949; F25B 47/02
    See application file for complete search history.

(56) References Cited

U.S. PATENT DOCUMENTS

| | | | | |
|---|---|---|---|---|
| 12,151,538 B2 * | 11/2024 | Tada | ........................ | F25B 47/02 |
| 2019/0030992 A1 | 1/2019 | Tada | | |
| 2020/0198443 A1 * | 6/2020 | Kato | .................. | B60H 1/00278 |
| 2022/0402331 A1 * | 12/2022 | Tada | .................. | B60H 1/00821 |
| 2025/0115094 A1 * | 4/2025 | Nomura | ............. | B60H 1/00921 |

FOREIGN PATENT DOCUMENTS

| | | |
|---|---|---|
| DE | 102013206630 A1 | 10/2014 |
| DE | 102016223050 A1 | 5/2018 |
| DE | 112017000488 T5 | 10/2018 |
| JP | 2013203221 A | 10/2013 |
| JP | 2017198375 A | 11/2017 |

* cited by examiner

*Primary Examiner* — Marc E Norman
(74) *Attorney, Agent, or Firm* — Harness, Dickey & Pierce, P.L.C.

(57) ABSTRACT

In a vehicle air conditioner with a refrigeration cycle, a controller includes a compression control unit and a decompression control unit, which perform control when a condensation heat defrosting operation and a heating operation of the space to be air conditioned are performed in parallel. The compression control unit achieves any one of a temperature or a pressure of a refrigerant required in a heating heat exchanger, or a temperature or a pressure of the refrigerant required in an outside air heat exchanger by operation control of a compressor. The decompression control unit achieves the other one of the temperature or the pressure of the refrigerant required in the heating heat exchanger, or the temperature or the pressure of the refrigerant required in the outside air heat exchanger by operation control of the first expansion valve.

12 Claims, 25 Drawing Sheets

HEATING MODE

CONDENSATION HEAT DEFROSTING MODE

FIG. 6

EXPERIMENTAL FORMULA RELATED TO DIFFUSION COEFFICIENT D $$D = 0.241 \times 10^{-4} \times ((Tamb + 273.15)/288)\textasciicircum 1.75$$

EXPERIMENTAL FORMULA RELATED TO REYNOLDS NUMBER Re $$Re = \rho \times Vc \times L / \mu$$

EXPERIMENTAL FORMULA RELATED TO SCHMIDT NUMBER Sc $$Sc = \mu / \rho / D$$

EXPERIMENTAL FORMULA RELATED TO SHERWOOD NUMBER Sh $$Sh = 0.332 \times Re\textasciicircum 0.5 \times Sc\textasciicircum(1/3)$$

EXPERIMENTAL FORMULA RELATED TO
EVAPORATION RATE Va PER UNIT AREA $$Va = Sh \times D \times (C_1 - C_2)/L$$

Tamb: OUTSIDE AIR TEMPERATURE (°C)

$\rho$ : DENSITY (kg/m$^2$)

Vc: WIND SPEED (m/s)

L: EVAPORATION SURFACE LENGTH (m)

$\mu$ : VISCOSITY COEFFICIENT (kg/m/s(Pa·s))

$C_1$: SATURATED WATER VAPOR AMOUNT ON WATER SURFACE (g/m$^2$)

$C_2$: VAPOR AMOUNT OF OUTSIDE AIR (g/m$^2$)

HEATING DEFROSTING MODE

HEATING MODE

CONDENSATION HEAT DEFROSTING MODE

HEATING DEFROSTING MODE

VEHICLE AIR CONDITIONER

CROSS REFERENCE TO RELATED APPLICATION

The present application is a continuation application of International Patent Application No. PCT/JP2022/020763 filed on May 19, 2022, which designated the U.S. and claims the benefit of priority from Japanese Patent Application No. 2021-092303 filed on Jun. 1, 2021. The entire disclosures of all of the above applications are incorporated herein by reference.

TECHNICAL FIELD

The present disclosure relates to a vehicle air conditioner including: a condenser that dissipates heat of a refrigerant to ventilation air; and an outdoor heat exchanger that exchanges heat between outside air and the refrigerant.

BACKGROUND

Conventionally, techniques related to a vehicle air conditioner including a condenser that dissipates heat of a refrigerant to ventilation air and an outdoor heat exchanger that exchanges heat between outside air and the refrigerant have been developed. In a vehicle air conditioner, in a case where a condenser heats a space to be air conditioned, frost may be formed on an outdoor heat exchanger when the outdoor heat exchanger absorbs heat from low-temperature outside air to a refrigerant.

When frost is formed on the outdoor heat exchanger, heat exchange performance in the outdoor heat exchanger may be significantly deteriorated, which greatly affects heating performance of the vehicle air conditioner.

SUMMARY

A vehicle air conditioner according to an aspect of the present disclosure includes a refrigeration cycle and a controller. The refrigeration cycle includes a compressor, a heating unit, an outside-air heat exchange unit, a first expansion valve, a second expansion valve and an evaporator.

The compressor can be configured to compress and discharge a refrigerant. The heating unit may include a heating heat exchanger configured to heat ventilation air to be blown to the space to be air conditioned using the refrigerant as a heat source. The heating heat exchanger condenses the refrigerant discharged from the compressor during a heating operation of heating a space to be air conditioned. The outside-air heat exchange unit includes an outside air heat exchanger in which the refrigerant absorbs heat from outside air during the heating operation.

The first expansion valve is disposed between an outflow port of the heating heat exchanger and an inflow port of the outside air heat exchanger, and is configured to decompress the refrigerant flowing out of the heating heat exchanger. The second expansion valve is configured to decompress the refrigerant flowing out of at least one of the heating heat exchanger or the outside air heat exchanger. The evaporator is configured to cause the refrigerant decompressed by the second expansion valve to absorb heat and evaporate.

The controller is configured to perform a condensation heat defrosting operation in which frost adhering to the outside air heat exchanger is melted and defrosted using heat of the refrigerant absorbed in the evaporator, and a heating operation in which a heating of the space to be air conditioned is performed using heat dissipation from the refrigerant in the heating heat exchanger.

The controller includes a compression control unit and a decompression control unit, which are configured to perform in parallel the condensation heat defrosting operation and the heating operation of the space to be air conditioned. When a temperature or a pressure of the refrigerant required in the heating heat exchanger is different from a temperature or a pressure of the refrigerant required in the outside air heat exchanger, the compression control unit may be configured to achieve any one of the temperature or the pressure of the refrigerant required in the heating heat exchanger, or the temperature or the pressure of the refrigerant required in the outside air heat exchanger by controlling operation of the compressor. In addition, the decompression control unit may be configured to achieve the other one of the temperature or the pressure of the refrigerant required in the heating heat exchanger, or the temperature or the pressure of the refrigerant required in the outside air heat exchanger by controlling operation of the first expansion valve.

BRIEF DESCRIPTION OF DRAWINGS

The above object and other objects, features, and advantages of the present disclosure will become more apparent from the following detailed description with reference to the accompanying drawings. In the accompanying drawings:

FIG. 6 is an explanatory diagram of an experimental formula for estimating an evaporation rate in dry defrosting of condensation heat defrosting;

DESCRIPTION OF EMBODIMENTS

Figure 1:
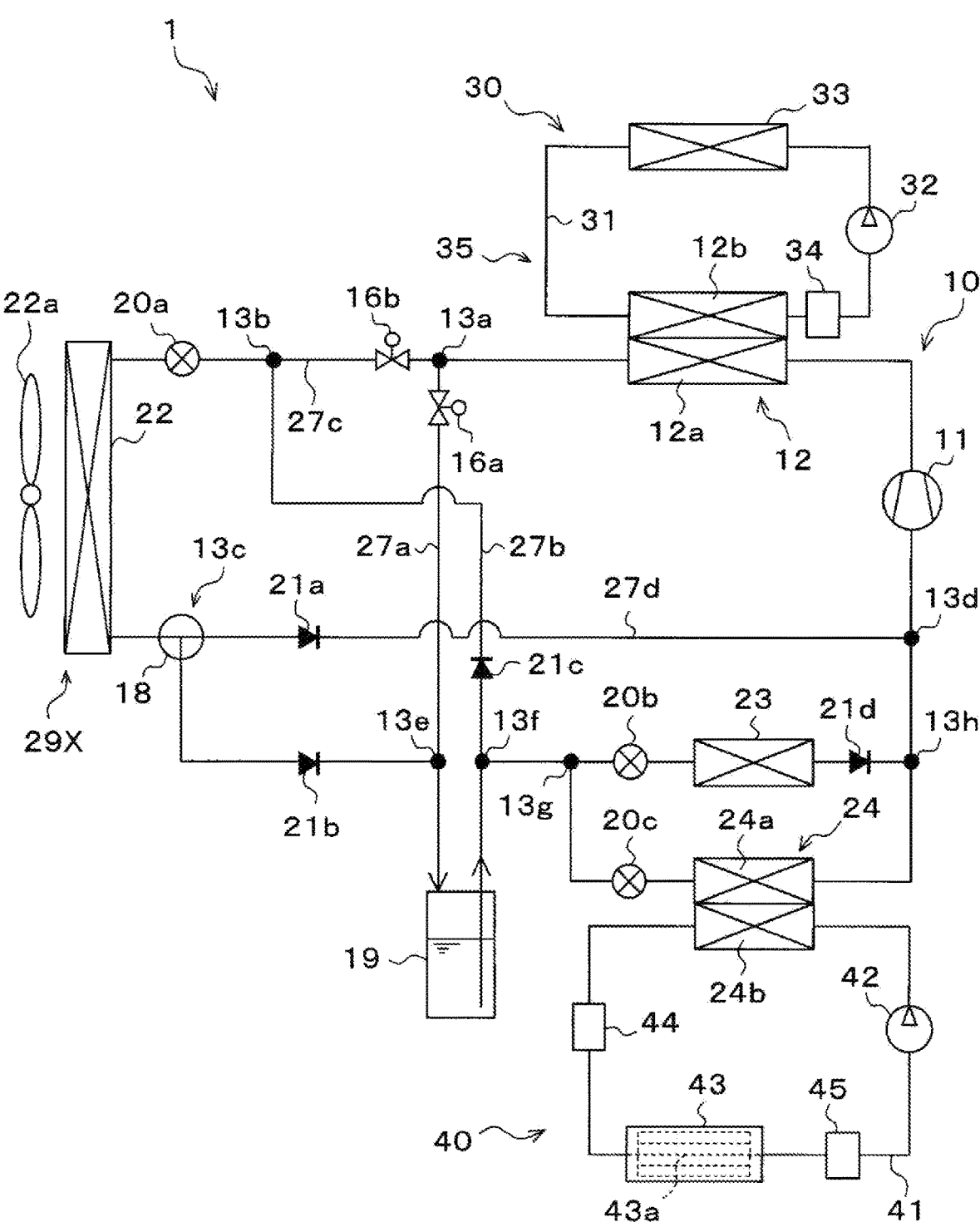
FIG. 1 is an overall configuration diagram of a vehicle air conditioner according to a first embodiment.

When frost is formed on an outdoor heat exchanger in a refrigeration cycle, heat exchange performance in the outdoor heat exchanger is significantly deteriorated, which greatly affects heating performance of a vehicle air conditioner. Therefore, defrosting of the outdoor heat exchanger or the like needs to be performed. When defrosting of the outdoor heat exchanger is performed, heat cannot be absorbed in the outdoor heat exchanger from outside air to the refrigerant. In addition, when defrosting of the outdoor heat exchanger is performed, there is also an increasing need to perform heating of the space to be air conditioned in parallel.

For example, when heating of a space to be air conditioned and defrosting of a heat exchanger are performed using a hot gas, two different temperatures of a heat amount for defrosting and a heat amount for heating are generated.

In the vehicle air conditioner, an accumulator cycle (receiver cycle) may be adopted as the refrigeration cycle. In this case, since hot gas defrosting cannot be performed in the receiver cycle, the configuration of the refrigeration cycle may be limited.

In addition, as a method for defrosting an outdoor heat exchanger, a condensation heat defrosting method using heat absorbed by an evaporator disposed on a low-pressure side of a refrigeration cycle has been developed. Since the hot gas defrosting is performed using the heat corresponding to the compression workload in the compressor, the hot gas defrosting is considered to have lower defrosting capacity than the condensation heat defrosting.

Thus, it is desired to flexibly cope with the difference between the heat amount in the outdoor heat exchanger due to the condensation heat defrosting and the heat amount in the condenser for improving comfort, and to achieve both defrosting of the outdoor heat exchanger and heating of the space to be air conditioned.

In view of the above, an object of the present disclosure is to provide a vehicle air conditioner capable of achieving an appropriate heating operation in parallel with efficient defrosting operation of an outdoor heat exchanger.

According to a vehicle air conditioner of an exemplar of the present disclosure, it is possible to perform, in parallel, a condensation heat defrosting operation in which frost adhering to an outside air heat exchanger is melted using heat absorbed into a refrigerant in an evaporator and a defrosting is performed, and a heating operation using heat-dissipation from the refrigerant in a heating heat exchanger.

In addition, in a case where the condensation heat defrosting operation and the heating operation of the space to be air conditioned are performed in parallel, when the temperature or pressure of the refrigerant required in the heating heat exchanger is different from the temperature or pressure of the refrigerant required in the outside air heat exchanger, two different refrigerant temperatures or pressures can be achieved by the compression control unit and the decompression control unit. That is, the refrigerant temperature or the refrigerant pressure required in any one of the heating heat exchanger or the outside air heat exchanger can be achieved by the compression control unit controlling the operation of the compressor. Furthermore, the refrigerant temperature or the refrigerant pressure required in the other one of the heating heat exchanger or the outside air heat exchanger can be achieved by the decompression control unit controlling the operation of the first expansion valve.

According to the vehicle air conditioner, when the condensation heat defrosting operation and the heating operation of the space to be air conditioned are performed in parallel, each of the heat dissipation amount in the outside air heat exchanger related to the condensation heat defrosting operation and the heat dissipation amount in the heating heat exchanger related to the heating operation can be controlled, and both can be achieved in an appropriate mode.

Hereinafter, a plurality of embodiments for implementing the present disclosure will be described with reference to the drawings. In each embodiment, portions corresponding to the matters described in the preceding embodiments are denoted by the same reference numerals, and redundant description may be omitted. When only a part of the configuration is described in each embodiment, another embodiment described precedingly can be applied to another part of the configuration. Not only the combination between portions explicitly described that the combination is specifically possible in each embodiment, but also partial combinations between the embodiments can be made if there is no problem in the combination in particular even when not explicitly described.

First Embodiment

First, a first embodiment of the present disclosure will be described with reference to the drawings. The vehicle air conditioner 1 according to the first embodiment is mounted on an electric vehicle that is a vehicle that obtains traveling driving force from an electric motor. The vehicle air conditioner 1 is, in an electric vehicle, an air conditioner with an in-vehicle apparatus cooling function that performs air conditioning of the vehicle interior that is a space to be air conditioned and cools a battery 75 that is an in-vehicle apparatus.

The battery 75 is a secondary battery that stores electric power to be supplied to an in-vehicle apparatus such as an electric motor, and is, for example, a lithium-ion battery. The battery 75 is what is called a battery pack formed by stacking and arranging a plurality of battery cells and electrically connecting these battery cells in series or in parallel.

In this type of battery, input/output is likely to be limited at a low temperature, and output is likely to decrease at a high temperature. Therefore, the temperature of the battery needs to be maintained within an appropriate temperature range (in the present embodiment, 5° C. or higher and 55° C. or lower) in which the charge/discharge capacity of the battery can be sufficiently utilized.

In addition, in this type of battery, the higher the temperature of the battery becomes, the more the deterioration of the cells constituting the battery is likely to progress. In other words, by maintaining the temperature of the battery at a low temperature to a certain extent, it is possible to suppress the progress of deterioration of the battery.

Therefore, in the vehicle air conditioner 1, the battery 75 can be cooled by cold energy generated by the refrigeration cycle 10. Therefore, an object to be cooled different from the ventilation air in the refrigeration cycle 10 of the present embodiment is the battery 75.

As shown in FIG. 1, the vehicle air conditioner 1 of the first embodiment includes a refrigeration cycle 10, a high-temperature side heating medium circuit 30, and a low-temperature side heating medium circuit 40. The refrigeration cycle 10 cools or heats the ventilation air to be blown into the vehicle interior in the vehicle air conditioner 1. Furthermore, the refrigeration cycle 10 cools the battery 75.

Accordingly, objects to be temperature-adjusted in the refrigeration cycle 10 are the ventilation air and the battery 75. The refrigeration cycle 10 is configured to be able to switch a refrigerant circuit in order to perform air conditioning in the vehicle interior and cooling of the battery 75.

In the refrigeration cycle 10, an HFO-series refrigerant (specifically, R1234yf) is adopted as the refrigerant. The refrigeration cycle 10 constitutes a vapor compression subcritical refrigeration cycle in which the pressure of the high-pressure refrigerant discharged from the compressor 11 does not exceed the critical pressure of the refrigerant. Refrigeration machine oil for lubricating the compressor 11 is mixed in the refrigerant. A part of the refrigeration machine oil circulates in the cycle together with the refrigerant.

In the refrigeration cycle 10, the compressor 11 sucks, compresses, and discharges the refrigerant. The compressor 11 is disposed in the drive unit room on the front side of the vehicle interior. The drive unit room forms a space in which at least a part of a drive unit (for example, an electric motor) for outputting driving force for traveling is disposed.

The compressor 11 is an electric compressor in which a fixed capacity type compression mechanism having a fixed discharge capacity is rotationally driven by an electric motor. In the compressor 11, the rotation speed (that is, refrigerant discharge capacity) is controlled by a control signal output from a controller 70 described below.

A refrigerant inlet side of the water refrigerant heat exchanger 12 is connected to a discharge port of the compressor 11. The water refrigerant heat exchanger 12 includes a refrigerant passage 12a through which the high-pressure refrigerant discharged from the compressor 11 is caused to flow, and a heating medium passage 12b through which the high-temperature side heating medium circulating through the high-temperature side heating medium circuit 30 is caused to flow.

The water refrigerant heat exchanger 12 is a heating heat exchanger that exchanges heat between the high-pressure refrigerant flowing through the refrigerant passage 12a and the high-temperature side heating medium flowing through heating medium passage 12b to heat the high-temperature side heating medium. In addition, the water refrigerant heat exchanger 12 condenses the high-pressure refrigerant flowing through the refrigerant passage 12a by heat exchange with the high-temperature side heating medium, and thus corresponds to an example of a heating heat exchanger.

An inflow port side of the first three-way joint 13a having three inflow/outflow ports communicating with each other is connected to an outlet of the refrigerant passage 12a of the water refrigerant heat exchanger 12. As such a three-way joint, a three-way joint formed by joining a plurality of pipes, or a three-way joint formed by providing a plurality of refrigerant passages in a metal block or a resin block can be adopted.

Furthermore, as described below, the refrigeration cycle 10 includes a second three-way joint 13b to an eighth three-way joint 13h. The basic configurations of the second three-way joint 13b to the eighth three-way joint 13h are similar to those of the first three-way joint 13a.

The first three-way joint 13a to the eighth three-way joint 13h function as a branch portion that branches the flow of the refrigerant flowing in from one inflow port when one of the three inflow/outflow ports is used as the inflow port and two are used as the outflow ports. In addition, when, of the three inflow/outflow ports, two are used as the inflow ports and one is used as the outflow port, the first three-way joint 13a or the like functions as a merging portion that merges the flows of the refrigerant flowing in from the two inflow ports.

In the present embodiment, the first three-way joint 13a, the third three-way joint 13c, the sixth three-way joint 13f, and the seventh three-way joint 13g are connected so as to function as a branch portion. In addition, the second three-way joint 13b, the fourth three-way joint 13d, the fifth three-way joint 13e, and the eighth three-way joint 13h are connected so as to function as a merging portion.

The inlet side of the receiver 19 is connected to one outflow port of the first three-way joint 13a through the first on-off valve 16a and the fifth three-way joint 13e. The inlet side of the heating expansion valve 20a is connected to the other outflow port of the first three-way joint 13a through the second on-off valve 16b and the second three-way joint 13b.

The first on-off valve 16a is an electromagnetic valve that opens and closes an inlet side passage 27a leading from one outflow port of the first three-way joint 13a to the inlet of the receiver 19. The opening/closing operation of the first on-off valve 16a is controlled by a control voltage output from the controller 70.

One inflow port of the fifth three-way joint 13e is connected to the outlet side of the first on-off valve 16a in the inlet side passage 27a. Furthermore, in the inlet side passage 27a, one outflow port of the fifth three-way joint 13e is connected to the inlet side of the receiver 19.

The receiver 19 is a liquid storage unit having a gas-liquid separation function. That is, the receiver 19 separates the refrigerant flowing out of the heat exchange unit functioning as a condenser that condenses the refrigerant in the refrigeration cycle 10 into gas and liquid. The receiver 19 causes a part of the separated liquid-phase refrigerant to flow out downstream, and stores the remaining liquid-phase refrigerant as excess refrigerant in the cycle.

The second on-off valve 16b is an electromagnetic valve that opens and closes the outside air side passage 27c leading from the other outflow port of the first three-way joint 13a to the one inflow port of the second three-way joint 13b. The basic configuration of the second on-off valve 16b is similar to that of the first on-off valve 16a. The opening/closing operation of the second on-off valve 16b is also controlled by a control voltage output from the controller 70.

The refrigerant outlet side of the receiver 19 is connected to the other inflow port of the second three-way joint 13b. A sixth three-way joint 13f and a third check valve 21c are disposed in the outlet side passage 27b connecting the refrigerant outlet of the receiver 19 and the other inflow port of the second three-way joint 13b.

The inflow port of the sixth three-way joint 13f is connected to the refrigerant outlet side of the receiver 19 through the outlet side passage 27b. The other inflow port in the second three-way joint 13b is connected to one outflow port in the sixth three-way joint 13f through the outlet side passage 27b and the third check valve 21c. Furthermore, the inflow port side of the seventh three-way joint 13g is connected to the other outflow port of the sixth three-way joint 13f.

The refrigerant inlet side of the outdoor heat exchanger 22 is connected to the outflow port of the second three-way joint 13b through the heating expansion valve 20a. The heating expansion valve 20a is a decompression unit that, at least when switched to a refrigerant circuit in a heating mode described below, decompresses the refrigerant flowing out of the receiver 19 and adjusts the flow rate of the refrigerant caused to flow out downstream. The heating expansion valve 20a corresponds to an example of a first expansion valve.

The heating expansion valve 20a is an electric variable throttle mechanism including a valve body configured to be able to change a throttle opening degree and an electric actuator (specifically, a stepping motor) that displaces the valve body. The operation of the heating expansion valve 20a is controlled by a control signal (specifically, the control pulse) output from the controller 70.

The heating expansion valve 20a has a full-open function of fully opening the valve opening degree to function as a simple refrigerant passage with exerting little flow regulating action and refrigerant decompression action and a full-close function of fully closing the valve opening degree to close the refrigerant passage.

As shown in FIG. 1, the refrigeration cycle 10 includes an air-cooling expansion valve 20b and a cooling expansion valve 20c. The basic configurations of the air-cooling expansion valve 20b and the cooling expansion valve 20c are similar to those of the heating expansion valve 20a. The air-cooling expansion valve 20b and the cooling expansion valve 20c correspond to an example of a second expansion valve.

The outdoor heat exchanger 22 is a heat exchanger that exchanges heat between the refrigerant flowing out of the heating expansion valve 20a and the outside air blown from the outside air fan 22a. The outdoor heat exchanger 22 is disposed on the front side in the drive unit room. Therefore, during vehicle traveling, traveling wind can be applied to the outdoor heat exchanger 22. The outdoor heat exchanger 22 is an example of an outside air heat exchanger, and constitutes an outside-air heat exchange unit 29X.

The outdoor heat exchanger 22 functions as a radiator that radiates heat from the high-pressure refrigerant in the air-cooling mode or the like. In addition, in the heating mode and the like, the outdoor heat exchanger 22 functions as an evaporator that evaporates the low-pressure refrigerant decompressed by the heating expansion valve 20a.

The outside air fan 22a is disposed to blow outside air to the outdoor heat exchanger 22. The outside air fan 22a is an electric blower whose rotation speed (that is, air blowing capacity) is controlled by a control voltage output from the controller 70. That is, the outside air fan 22a can adjust the wind speed (air volume) of the outside air with respect to the outdoor heat exchanger 22.

An inflow port side of the three-way valve 18 constituting the third three-way joint 13c is connected to the refrigerant outlet of the outdoor heat exchanger 22. The three-way valve 18 is an electric three-way flow regulating valve including one inflow port and two outflow ports and capable of continuously adjusting a passage area ratio of the two outflow ports. Operation of the three-way valve 18 is controlled by a control signal output from controller 70.

One inflow port side of the fourth three-way joint 13d is connected to one outflow port of the three-way valve 18 constituting the third three-way joint 13c through the first check valve 21a. A suction port side of the compressor 11 is connected to an outflow port of the fourth three-way joint 13d. The other inflow port side of the fifth three-way joint 13e is connected to the other outflow port of the three-way valve 18 through the second check valve 21b.

Therefore, in the refrigerant flowing out of the outdoor heat exchanger 22, the three-way valve 18 can continuously adjust the flow rate of the refrigerant caused to flow into the receiver 19, and the flow rate of the refrigerant caused to flow, as it is, into the compressor 11.

As shown in FIG. 1, the first check valve 21a is disposed in the suction side passage 27d leading from one outflow port of the third three-way joint 13c to one inflow port of the fourth three-way joint 13d. The first check valve 21a allows the refrigerant to flow from the refrigerant outlet side of the outdoor heat exchanger 22 to the suction port side of the compressor 11 through the three-way valve 18, and inhibits the refrigerant from flowing from the suction port side of the compressor 11 to the refrigerant outlet side of the outdoor heat exchanger 22.

The second check valve 21b is disposed in the refrigerant passage leading from the other outflow port of the third three-way joint 13c to the other inflow port of the fifth three-way joint 13e. The second check valve 21b allows the refrigerant to flow from the refrigerant outlet side of the outdoor heat exchanger 22 to the inlet side of the receiver 19 through the three-way valve 18, and inhibits the refrigerant from flowing from the receiver 19 side to the refrigerant outlet side of the outdoor heat exchanger 22.

As described above, the inflow port side of the seventh three-way joint 13g is connected to the other outflow port of the sixth three-way joint 13f disposed in the outlet side passage 27b. The other inflow port of the second three-way joint 13b is connected to the one outflow port of the sixth three-way joint 13f through the third check valve 21c.

The third check valve 21c allows the refrigerant to flow from the refrigerant outlet side of the receiver 19 to the heating expansion valve 20a, and inhibits the refrigerant from flowing from the second three-way joint 13b side to the receiver 19.

The inlet side of the air-cooling expansion valve 20b is connected to one outflow port of the seventh three-way joint 13g. In addition, the inlet side of the cooling expansion valve 20c is connected to the other outflow port of the seventh three-way joint 13g.

The air-cooling expansion valve 20b is a decompression unit that, at least when switched to a refrigerant circuit in an air-cooling mode described below, decompresses the refrigerant flowing out of the receiver 19 and adjusts the flow rate of the refrigerant caused to flow out downstream. When the air-cooling expansion valve 20b exerts a decompression function, it corresponds to an example of a second expansion valve.

Figure 2:
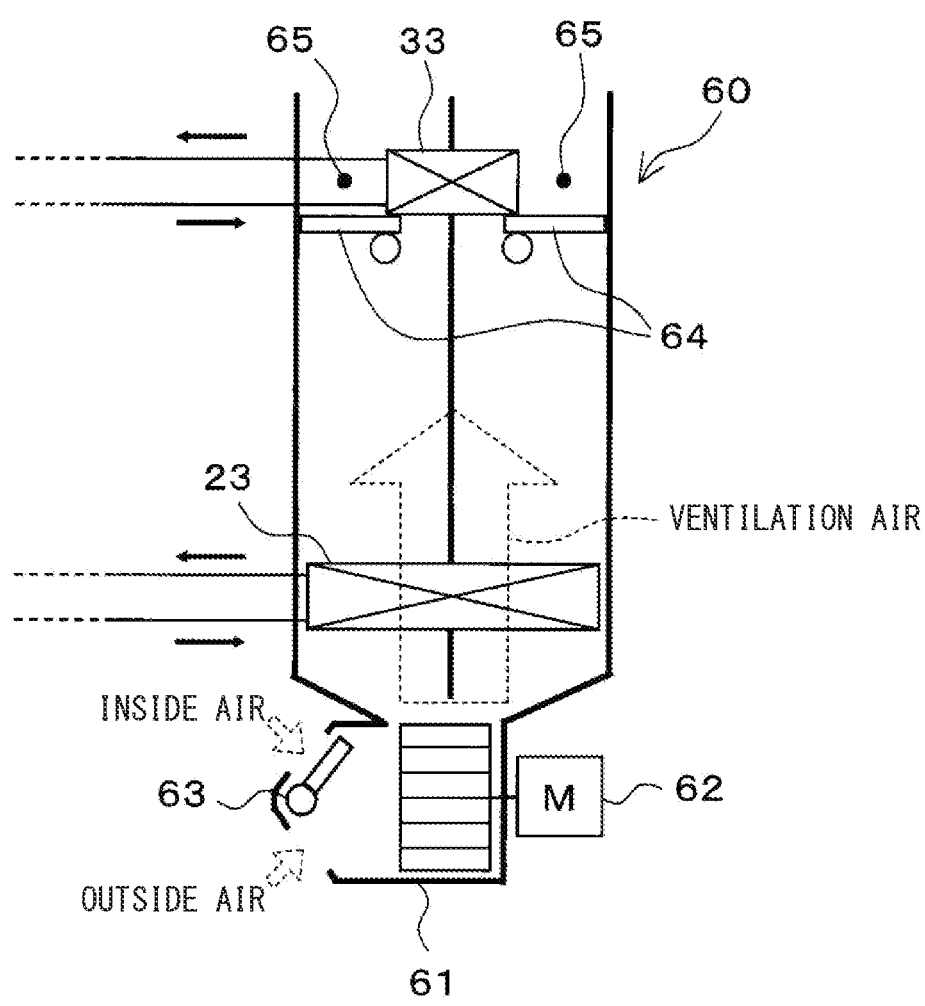
FIG. 2 is a configuration diagram of an indoor air conditioning unit in the vehicle air conditioner.

A refrigerant inlet side of the indoor evaporator 23 is connected to an outlet of the air-cooling expansion valve 20b. As shown in FIG. 2, the indoor evaporator 23 is disposed in the casing 61 of the indoor air conditioning unit 60. The indoor evaporator 23 is an evaporation unit that exchanges heat of the low-pressure refrigerant decompressed by the air-cooling expansion valve 20b with the ventilation air blown from the blower 62 and evaporates the heat exchanged low-pressure refrigerant.

The indoor evaporator 23 is a ventilation air cooling unit that cools the ventilation air by evaporating the low-pressure refrigerant to exert a heat absorbing action. Accordingly, the indoor evaporator 23 corresponds to an example of an evaporator. One inflow port of the eighth three-way joint 13h is connected to the refrigerant outlet of the indoor evaporator 23 through the fourth check valve 21d. The fourth check valve 21d allows the refrigerant to flow from the refrigerant outlet side of the indoor evaporator 23 to the eighth three-way joint 13h, and inhibits the refrigerant from flowing from the eighth three-way joint 13h side to the indoor evaporator 23.

The cooling expansion valve 20c is a decompression unit that, when a chiller 24 cools the low-temperature side heating medium, decompresses the refrigerant flowing out of the receiver 19 and adjusts the flow rate of the refrigerant caused to flow out downstream. The cooling expansion valve 20c corresponds to an example of a second expansion valve by exerting a decompression function. The inlet side of the refrigerant passage 24a of the chiller 24 is connected to the outlet of the cooling expansion valve 20c.

The chiller 24 includes a refrigerant passage 24a through which the low-pressure refrigerant decompressed by the cooling expansion valve 20c is caused to flow, and a heating medium passage 24b through which the low-temperature side heating medium circulating in the low-temperature side heating medium circuit 40 is caused to flow. The chiller 24 is an evaporation unit that exchanges heat between the low-pressure refrigerant flowing through the refrigerant passage 24a and the low-temperature side heating medium flowing through the heating medium passage 24b to evaporate the low-pressure refrigerant and exert a heat absorbing action. That is, the chiller 24 corresponds to an example of an evaporator.

The other inflow port of the eighth three-way joint 13h is connected to the outlet of the refrigerant passage 24a of the chiller 24. A suction port side of the compressor 11 is connected to an outflow port of the eighth three-way joint 13h through the fourth three-way joint 13d.

As apparent from the above description, in the refrigeration cycle 10, the first on-off valve 16a, the second on-off valve 16b, and the three-way valve 18 open and close the refrigerant passage, so that the refrigerant circuit can be switched. Therefore, the first on-off valve 16a, the second on-off valve 16b, the three-way valve 18, and the like are included in the refrigerant circuit switching unit.

The first on-off valve 16a, the second on-off valve 16b, and the first three-way joint 13a guide the refrigerant flowing out of the water refrigerant heat exchanger 12 to one of the receiver 19 side and the second three-way joint 13b side. In addition, the second three-way joint 13b guides at least one of the refrigerant flowing out of the first three-way joint 13a and the refrigerant flowing out of the receiver 19 to the heating expansion valve 20a side. In addition, the three-way valve 18 constituting the third three-way joint 13c guides the refrigerant flowing out of the outdoor heat exchanger 22 to one of the suction port side and the receiver 19 side of the compressor 11.

Next, the high-temperature side heating medium circuit 30 will be described. The high-temperature side heating medium circuit 30 is a heating medium circulation circuit that circulates the high-temperature side heating medium. As the high-temperature side heating medium, a solution containing ethylene glycol, dimethylpolysiloxane, nanofluid, or the like, an antifreeze solution, or the like can be adopted. The high-temperature side heating medium circuit 30 is configured by connecting the heating medium passage 12b of the water refrigerant heat exchanger 12, the high-temperature side pump 32, the heater core 33, the water heater 34, and the like by the high-temperature side heating medium flow path 31.

A water heater 34 is disposed on the outlet side of the heating medium passage 12b in the water refrigerant heat exchanger 12. The water heater 34 is configured to be able to dissipate heat with respect to the high-temperature side heating medium flowing out of the heating medium passage 12b of the water refrigerant heat exchanger 12, and heats the high-temperature side heating medium.

As the water heater 34, a PTC heater having a PTC element (that is, the positive character thermistor) can be adopted. The calorific value of the water heater 34 is optionally controlled by the control voltage output from the controller 70. The water heater 34 corresponds to an example of an auxiliary heating device.

A suction port side of the high-temperature side pump 32 is connected to the outlet side of the heating medium passage of the water heater 34. The high-temperature side pump 32 is a water pump that transfers the high-temperature side heating medium having passed through the water heater 34 to the heating medium inlet side of the heater core 33. The high-temperature side pump 32 is an electric pump whose rotation speed (that is, the pressure feeding capacity) is controlled by a control voltage output from the controller 70.

The heater core 33 is a heat exchanger that exchanges heat between the high-temperature side heating medium heated by the water refrigerant heat exchanger 12 and the like and the ventilation air that has passed through the indoor evaporator 23 to heat the ventilation air. As shown in FIG. 2, the heater core 33 is disposed in the casing 61 of the indoor air conditioning unit 60. An inlet side of the heating medium passage 12b of the water refrigerant heat exchanger 12 is connected to a heating medium outlet of the heater core 33.

Therefore, in the high-temperature side heating medium circuit 30, the high-temperature side pump 32 adjusts the flow rate of the high-temperature side heating medium flowing into the heater core 33, so that heat dissipation amount of the high-temperature side heating medium in the heater core 33 to the ventilation air (that is, the heating amount of the ventilation air in the heater core 33) can be adjusted.

That is, in the present embodiment, each component of the water refrigerant heat exchanger 12 and the high-temperature side heating medium circuit 30 constitutes the heating unit 35 that heats the ventilation air using the refrigerant discharged from the compressor 11 as a heat source.

Next, the low-temperature side heating medium circuit 40 will be described. The low-temperature side heating medium circuit 40 is a heating medium circulation circuit that circulates the low-temperature side heating medium. As the low-temperature side heating medium, a fluid similar to the high-temperature side heating medium can be adopted.

As shown in FIG. 1, the low-temperature side heating medium circuit 40 is configured by connecting the heating medium passage 12*b* of the chiller 24, the low-temperature side pump 42, the battery heat exchange unit 43, the electric heater 44, the low-temperature side reserve tank 45, and the like by the low-temperature side heating medium flow path 41.

The low-temperature side heating medium circuit 40 temperature-adjusts the battery 75 by causing the battery heat exchange unit 43 to exchange heat between the low-temperature side heating medium temperature-adjusted by the refrigeration cycle 10 or the like and the battery 75. The low-temperature side heating medium circuit 40 can be said to be a heating medium circuit for temperature-adjusting the battery 75 and effectively utilizing the waste heat from the battery 75 in various applications.

As shown in FIG. 1, an electric heater 44 is disposed on the outlet side of the heating medium passage 24*b* in the chiller 24. The electric heater 44 is configured to be able to dissipate heat to the low-temperature side heating medium flowing out of the heating medium passage 24*b* of the chiller 24, and heats the low-temperature side heating medium. As the electric heater 44, a PTC heater can be adopted. The calorific value of the electric heater 44 is optionally controlled by the control voltage output from the controller 70.

An inlet side of the battery heat exchange unit 43 is connected to an outlet side of the heating medium passage in the electric heater 44. The battery heat exchange unit 43 is a heat exchange unit for adjusting the temperature of the battery 75 by exchanging heat between the low-temperature side heating medium flowing through the heating medium passage 43*a* and the battery cell.

The heating medium passage 43*a* in the battery heat exchange unit 43 has a passage configuration in which a plurality of passages are connected in parallel inside the dedicated case. Accordingly, the heating medium passage 43*a* is formed to be able to uniformly absorb the waste heat of the battery 75 from the entire region of the battery 75. In other words, the refrigerant passage is formed to be able to uniformly absorb heat of all the battery cells and uniformly cool all the battery cells.

Such a battery heat exchange unit 43 only needs to be formed by disposing the heating medium passage 43*a* between the stacked battery cells. In addition, the battery heat exchange unit 43 may be formed integrally with the battery 75. For example, by providing the heating medium passage 43*a* in a dedicated case that houses the stacked battery cells, the battery heat exchange unit 43 may be formed integrally with the battery 75.

A low-temperature side reserve tank 45 is disposed at an outlet of the heating medium passage 43*a* in the battery heat exchange unit 43. The low-temperature side reserve tank 45 is a reservoir that stores the low-temperature side heating medium surplus in the low-temperature side heating medium circuit 40.

A suction port side of the low-temperature side pump 42 is connected to the heating medium outlet side of the low-temperature side reserve tank 45. The low-temperature side pump 42 is a water pump that pressure-feeds the low-temperature side heating medium to the inlet side of the heating medium passage 43*a* in the chiller 24. The basic configuration of the low-temperature side pump 42 is similar to that of the high-temperature side pump 32.

Therefore, in the low-temperature side heating medium circuit 40, the low-temperature side pump 42 can adjust the heat amount absorbed by the low-temperature side heating medium in the battery heat exchange unit 43 from the battery 75 by adjusting the flow rate of the low-temperature side heating medium flowing into the battery heat exchange unit 43. In addition, the heat amount absorbed by the battery heat exchange unit 43 can be adjusted by also adjusting the temperature difference between the battery 75 and the low-temperature side heating medium, by the electric heater 44.

That is, according to the present embodiment, each component of the chiller 24 and the low-temperature side heating medium circuit 40 constitutes a cooling unit that cools the battery 75 by evaporating the refrigerant flowing out of the cooling expansion valve 20*c*.

Next, the indoor air conditioning unit 60 will be described with reference to FIG. 2. The indoor air conditioning unit 60 is used to blow the ventilation air temperature-adjusted by the refrigeration cycle 10 into the vehicle interior. The indoor air conditioning unit 60 is disposed inside an instrument panel at the foremost part of the vehicle interior.

The indoor air conditioning unit 60 houses a blower 62, an indoor evaporator 23, a heater core 33, and the like inside an air passage formed in a casing 61 forming an outer shell thereof. The casing 61 forms an air passage for the ventilation air to be blown into the vehicle interior. The casing 61 is formed of resin (for example, polypropylene) having a certain degree of elasticity and excellent strength.

An inside/outside air switching device 63 is disposed on the most upstream side in the ventilation air flow of the casing 61. The inside/outside air switching device 63 switches between inside air (air inside the vehicle interior) and outside air (air outside the vehicle interior) and introduces the switched air into the casing 61.

The inside/outside air switching device 63 continuously adjusts the opening areas of an inside air introduction port through which inside air is introduced into the casing 61 and an outside air introduction port through which outside air is introduced into the casing 61 by the inside/outside air switching door to change an introduction ratio between an introduction air volume of the inside air and an introduction air volume of the outside air. The inside/outside air switching door is driven by an inside/outside air switching door electric actuator. The operation of the electric actuator is controlled by a control signal output from the controller 70.

A blower 62 is disposed on the downstream side in the ventilation air flow of the inside/outside air switching device 63. The blower 62 blows air sucked through the inside/outside air switching device 63 toward the vehicle interior. The blower 62 is an electric blower that drives a centrifugal multi-blade fan with an electric motor. The rotation speed (that is, air blowing capacity) of the blower 62 is controlled by a control voltage output from the controller 70.

The indoor evaporator 23 and the heater core 33 are disposed in this order with respect to the ventilation air flow on the ventilation air flow downstream side of the blower 62. That is, the indoor evaporator 23 is disposed on the ventilation air flow upstream side of the heater core 33.

In the casing 61, a cold wind bypass passage 65 through which the ventilation air after passing through the indoor evaporator 23 flows by bypassing the heater core 33 is provided. In addition, an air mix door 64 is disposed on the ventilation air flow downstream side of the indoor evaporator 23 in the casing 61 and on the ventilation air flow upstream side of the heater core 33.

The air mix door 64 is an air volume ratio adjustment unit that adjusts an air volume ratio between an air volume of the ventilation air passing through the heater core 33 side and an air volume of the ventilation air passing through the cold wind bypass passage 65, in the ventilation air after passing through the indoor evaporator 23. The air mix door 64 is driven by an air mix door electric actuator. The operation of the electric actuator is controlled by a control signal output from the controller 70.

A mixing space is disposed on the ventilation air flow downstream side of the heater core 33 and the cold wind bypass passage 65 in the casing 61. The mixing space is a space for mixing the ventilation air heated by the heater core 33 and the ventilation air passing through the cold wind bypass passage 65 and not heated.

An opening hole for blowing the ventilation air (that is, conditioned air) mixed in the mixing space into the vehicle interior being a space to be air conditioned is disposed in the ventilation air flow downstream portion of the casing 61. As the opening holes, a face opening hole, a foot opening hole, and a defroster opening hole (none of them are shown) are provided.

The face opening hole is an opening hole for blowing conditioned air toward the upper body of the occupant in the vehicle interior. The foot opening hole is an opening hole for blowing conditioned air toward the feet of the occupant. The defroster opening hole is an opening hole for blowing conditioned air toward the inside surface of the vehicle windshield.

The face opening hole, the foot opening hole, and the defroster opening hole are connected to a face blow-out port, a foot blow-out port, and a defroster blow-out port (none of them are shown) provided in the vehicle interior through ducts forming air passages, respectively.

Therefore, the air mix door 64 adjusts the air volume ratio between the air volume passing through the heater core 33 and the air volume passing through the cold wind bypass passage 65, whereby the temperature of the conditioned air mixed in the mixing space is adjusted. The temperature of the ventilation air (conditioned air) blown into the vehicle interior from each of the blow-out ports is adjusted.

In addition, a face door, a foot door, and a defroster door (none of them are shown) are disposed on the ventilation air flow upstream side of the face opening hole, the foot opening hole, and the defroster opening hole, respectively. The face door adjusts an opening area of the face opening hole. The foot door adjusts an opening area of the foot opening hole. The defroster door adjusts an opening area of the defroster opening hole.

The face door, the foot door, and the defroster door constitute a blow-out port mode switching device that switches a blow-out port mode. These doors are coupled to a blow-out port mode door drive electric actuator through a link mechanism or the like, and are rotationally operated in conjunction therewith. The operation of the electric actuator is also controlled by a control signal output from the controller 70.

Specific examples of the blow-out port mode switched by the blow-out port mode switching device include a face mode, a bi-level mode, and a foot mode. The face mode is a blow-out port mode in which air is blown out from the face blow-out port toward the upper body of the occupant in the vehicle interior with the face blow-out port fully opened.

The bi-level mode is a blow-out port mode in which air is blown out toward the upper body and the feet of the occupant in the vehicle interior with both the face blow-out port and the foot blow-out port opened. The foot mode is a blow-out port mode in which air is blown out mainly from the foot blow-out port with the foot blow-out port fully opened and the defroster blow-out port opened by a small opening degree.

Furthermore, the blow-out port mode can also be switched to the defroster mode by the occupant manually operating the blow-out mode change-over switch provided on the operation panel 71. The defroster mode is a blow-out port mode in which air is blown out from the defroster blow-out port to the inner surface of the windshield with the defroster blow-out port fully opened.

Next, an overview of the electric control unit of the vehicle air conditioner 1 will be described with reference to FIG. 3. The controller 70 includes a known microcomputer including a CPU, a ROM, a RAM, and the like, and peripheral circuits thereof. The controller 70 performs various calculations and types of processing based on an air conditioning control program stored in the ROM, and controls operations of various apparatuses to be controlled connected to the output side. The controller 70 corresponds to an example of a control unit.

The various apparatuses to be controlled include a compressor 11, a first on-off valve 16a, a second on-off valve 16b, a three-way valve 18, a heating expansion valve 20a, an air-cooling expansion valve 20b, a cooling expansion valve 20c, and an outside air fan 22a. Furthermore, the various apparatuses to be controlled include a high-temperature side pump 32, a water heater 34, a low-temperature side pump 42, an electric heater 44, a blower 62, an inside/outside air switching device 63, an air mix door 64, and the like.

Figure 3:
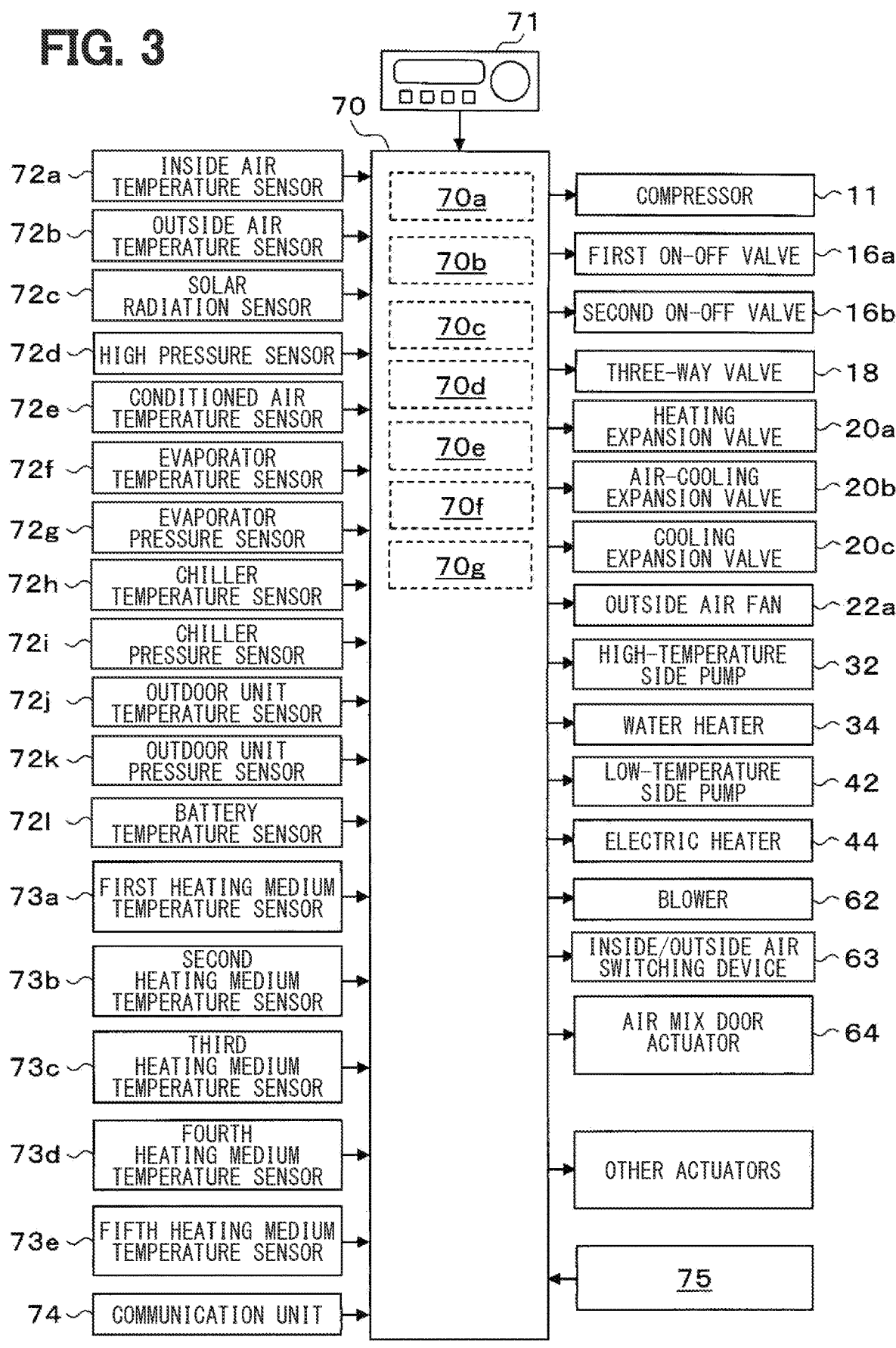
FIG. 3 is a block diagram showing a control system of the vehicle air conditioner.

As shown in FIG. 3, various control sensors are connected to the input side of the controller 70. Examples of the control sensor include an inside air temperature sensor 72a, an outside air temperature sensor 72b, a solar radiation sensor 72 c, a high pressure sensor 72d, and a conditioned air temperature sensor 72e. In addition, examples of the control sensor include an evaporator temperature sensor 72f, an evaporator pressure sensor 72g, a chiller temperature sensor 72h, a chiller pressure sensor 72i, an outdoor unit temperature sensor 72j, an outdoor unit pressure sensor 72k, and a battery temperature sensor 72l.

The inside air temperature sensor 72a is an inside air temperature detection unit that detects an inside air temperature Tr which is a temperature inside the vehicle interior. The outside air temperature sensor 72b is an outside air temperature detection unit that detects an outside air temperature Tam that is a temperature outside the vehicle interior. The solar radiation sensor 72c is a solar radiation amount detection unit that detects a solar radiation amount As with which the vehicle interior is irradiated.

The high pressure sensor 72d is a high pressure detection unit that detects a high pressure Pd that is the pressure of the high-pressure refrigerant discharged from the compressor 11. The conditioned air temperature sensor 72e is a conditioned air temperature detection unit that detects a temperature TAV of the blow-out air blown out into the vehicle interior from the mixing space.

The evaporator temperature sensor 72f is an evaporator temperature detection unit that detects a refrigerant evaporating temperature (evaporator temperature) Te at the indoor evaporator 23. Specifically, the evaporator temperature sensor 72f of the present embodiment detects the temperature of the outlet side refrigerant of the indoor evaporator 23.

The evaporator pressure sensor 72g is an evaporator pressure detection unit that detects the refrigerant evaporating pressure Pe at the indoor evaporator 23. Specifically, the evaporator pressure sensor 72g of the present embodiment detects the pressure of the outlet side refrigerant of the indoor evaporator 23.

The chiller temperature sensor 72h is a chiller-side refrigerant temperature detection unit that detects a refrigerant evaporating temperature in the refrigerant passage 24a of the chiller 24. Specifically, the chiller temperature sensor 72h according to the present embodiment detects the temperature of the outlet side refrigerant in the refrigerant passage 24a of the chiller 24.

The chiller pressure sensor 72i is a chiller-side refrigerant pressure detection unit that detects a refrigerant evaporating pressure in the refrigerant passage 24a of the chiller 24. Specifically, the chiller pressure sensor 72i detects the pressure of the outlet-side refrigerant in the refrigerant passage 24a of the chiller 24.

The outdoor unit temperature sensor 72j is an outdoor unit temperature detection unit that detects an outdoor unit refrigerant temperature T1 that is the temperature of the refrigerant flowing through the outdoor heat exchanger 22. Specifically, the outdoor unit temperature sensor 72j of the present embodiment detects the temperature of the outlet side refrigerant of the outdoor heat exchanger 22.

The outdoor unit pressure sensor 72k is an outdoor unit temperature detection unit that detects an outdoor unit refrigerant pressure P1 that is a pressure of the refrigerant flowing through the outdoor heat exchanger 22. Specifically, the outdoor unit pressure sensor 72k of the present embodiment detects the pressure of the outlet side refrigerant of the outdoor heat exchanger 22.

The battery temperature sensor 72l is a battery temperature detection unit that detects a battery temperature TB that is the temperature of the battery 75. The battery temperature sensor 72l includes a plurality of temperature detection units, and detects temperatures at a plurality of places of the battery 75. Therefore, the controller 70 can also detect a temperature difference of each unit of the battery 75. Furthermore, as the battery temperature TB, an average value of detection values of a plurality of temperature sensors is adopted.

In addition, a plurality of heating medium temperature sensors are connected to the input side of the controller 70 in order to detect the temperature of each heating medium in the high-temperature side heating medium circuit 30 and the low-temperature side heating medium circuit 40. The plurality of heating medium temperature sensors include a first heating medium temperature sensor 73a to a fifth heating medium temperature sensor 73e.

The first heating medium temperature sensor 73a is disposed at an outlet portion of the heating medium passage 12b in the water refrigerant heat exchanger 12, and detects a temperature of the high-temperature side heating medium flowing out of the water refrigerant heat exchanger 12. The second heating medium temperature sensor 73b is disposed at the outflow port portion of the heater core 33, and detects the temperature of the high-temperature side heating medium passing through the heater core 33.

The third heating medium temperature sensor 73c is disposed at an outlet portion of the heating medium passage of the water heater 34, and detects the temperature of the high-temperature side heating medium flowing out of the water heater 34. The fourth heating medium temperature sensor 73d is disposed at the inflow port portion of the heating medium passage in the chiller 24, and detects the temperature of the heating medium flowing into the chiller 24.

The fifth heating medium temperature sensor 73e is disposed at the outflow port portion in the heating medium passage 43a of the battery heat exchange unit 43, and detects the temperature of the low-temperature side heating medium flowing out of the heating medium passage 43a of the battery heat exchange unit 43.

The vehicle air conditioner 1 refers to the detection results of the first heating medium temperature sensor 73a to the fifth heating medium temperature sensor 73e to switch the flow of the heating medium in the high-temperature side heating medium circuit 30 and the low-temperature side heating medium circuit 40.

Furthermore, an operation panel 71 disposed in the vicinity of the instrument panel in the front portion of the vehicle interior is connected to the input side of the controller 70. Operation signals from various operation switches provided on the operation panel 71 are input to the controller 70.

Specifically, examples of the various operation switches provided on the operation panel 71 include an automatic switch, an air conditioner switch, an air volume setting switch, and a temperature setting switch. The automatic switch is an operation switch that sets or cancels the automatic control operation of the refrigeration cycle 10.

The air conditioner switch is an operation switch that requests the indoor evaporator 23 to cool the ventilation air. The air volume setting switch is an operation switch operated when the air volume of the blower 62 is manually set. The temperature setting switch is an operation switch that sets a target temperature Tset in the vehicle interior.

In addition, a communication unit 74 is connected to the controller 70. The communication unit 74 communicates and acquires various types of information through a public network such as the Internet and a mobile phone network and a network including a base station. Therefore, the controller 70 can acquire weather information and the like corresponding to the current position of an electric vehicle on which the vehicle air conditioner 1 is mounted.

In the controller 70 of the present embodiment, a control unit that controls various apparatuses to be controlled connected to an output side thereof is integrally configured. Therefore, a configuration (that is, hardware and software) for controlling the operation of each of the apparatuses to be controlled constitutes a control unit that controls the operation of a corresponding one of the apparatuses to be controlled.

For example, in the controller 70, a configuration for determining whether or not the frost formation amount of the outdoor heat exchanger 22 exceeds a predetermined reference constitutes the frost formation determining unit 70a. In addition, in the controller 70, the configuration in which it is determined whether or not all the frost adhering to the outdoor heat exchanger 22 has been melted by the condensation heat defrosting constitutes a melting determination unit 70b. In the controller 70, the configuration in which it is determined whether the drying of the outdoor heat exchanger 22 by evaporating and removing the moisture generated with the melting of the frost in the dry defrosting in the condensation heat defrosting is completed constitutes a drying completion determination unit 70c.

Furthermore, in the controller 70, in the heating defrosting mode in which the condensation heat defrosting and the heating are performed in parallel, the configuration in which any one of the refrigerant temperature or pressure required by the water refrigerant heat exchanger 12 and the refrigerant temperature or pressure required by the outdoor heat exchanger 22 is achieved by the operation control of the compressor constitutes the compression control unit 70d. In addition, in the controller 70, in the heating defrosting mode, the configuration in which any the other of the refrigerant temperature or pressure required by the water refrigerant heat exchanger 12 and the refrigerant temperature or pressure required by the outdoor heat exchanger 22 is achieved by the operation control of the heating expansion valve 20a constitutes the decompression control unit 70e.

In addition, in the controller 70, in the heating defrosting mode, the configuration in which it is determined which of the efficiency priority mode in which condensation heat defrosting is prioritized over heating of a space to be air conditioned and the comfort priority mode in which heating of a space to be air conditioned is prioritized over condensation heat defrosting is appropriate constitutes the mode determination unit 70f. In the controller 70, in the heating defrosting mode, the configuration of setting any one of the efficiency priority mode and the comfort priority mode based on the determination result of the mode determination unit 70f constitutes a mode setting unit 70g.

Next, the operation of the vehicle air conditioner according to the first embodiment will be described. The vehicle air conditioner 1 is configured to be able to switch a refrigerant circuit in order to perform air conditioning in the vehicle interior and cooling of the battery 75.

Specifically, in order to perform air conditioning in the vehicle interior, the vehicle air conditioner 1 can switch to a refrigerant circuit in the heating mode, a refrigerant circuit in the air-cooling mode, a refrigerant circuit in the dehumidification heating mode, and the like. The heating mode is an operation mode in which heated ventilation air is blown out into the vehicle interior. The air-cooling mode is an operation mode in which cooled ventilation air is blown out into the vehicle interior. The dehumidification heating mode is an operation mode in which the cooled and dehumidified ventilation air is reheated and blown out into the vehicle interior.

Switching between these operation modes is performed by executing an air conditioning control program stored in advance in the controller 70. The air conditioning control program is executed when an automatic switch on the operation panel 71 is turned on (ON). In the air conditioning control program, the operation mode is switched based on detection signals of various control sensors and an operation signal of the operation panel.

A heating mode in the vehicle air conditioner 1 according to the present embodiment will be described with reference to FIG. 4. In the heating mode, the controller 70 opens the first on-off valve 16a and closes the second on-off valve 16b. The controller 70 operates the three-way valve 18 so that the refrigerant outlet side of the outdoor heat exchanger 22 and the inflow port side of the first check valve 21a communicate with each other and the flow path toward the fifth three-way joint 13e side is closed. Furthermore, the controller 70 brings the heating expansion valve 20a into the throttling state where the refrigerant decompressing action is exerted, and brings the air-cooling expansion valve 20b and the cooling expansion valve 20c into the fully closed state.

In addition, the controller 70 operates the high-temperature side pump 32 to pressure-feed the high-temperature side heating medium with a predetermined pressure-feeding capacity. In the heating mode, the controller 70 keeps the low-temperature side pump 42 in a stopped state.

Figure 4:
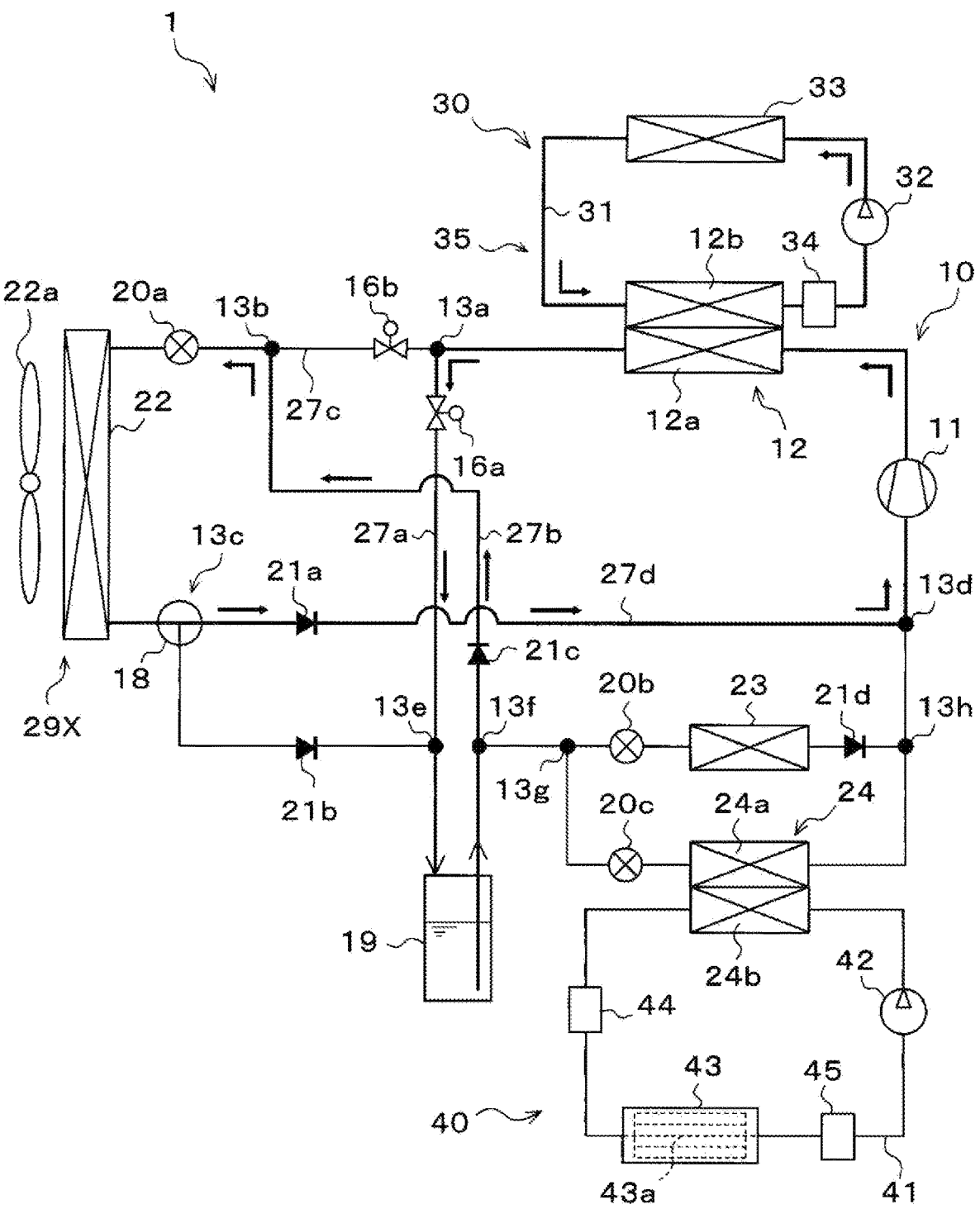
FIG. 4 is an overall configuration diagram showing operation in a heating mode in the vehicle air conditioner of the first embodiment.

Accordingly, in the refrigeration cycle 10 in the heating mode, as shown in FIG. 4, the refrigerant flows and circulates in the order of the compressor 11, the refrigerant passage 12a of the water refrigerant heat exchanger 12, the receiver 19, the heating expansion valve 20a, the outdoor heat exchanger 22, the first check valve 21a, and the compressor 11.

With this circuit configuration, the controller 70 controls operations of various apparatuses to be controlled. For example, regarding the compressor 11, the controller 70 controls the refrigerant discharge capacity so that the temperature of the high-temperature side heating medium in the heater core 33 approaches the target high-temperature side heating medium temperature.

The target high-temperature side heating medium temperature is determined based on the target blow-out temperature TAO with reference to a heating mode control map stored in advance in the controller 70. The target blow-out temperature TAO is calculated using detection signals of various control sensors and operation signals of the operation panel. The refrigerant discharge capacity of the compressor 11 is controlled so that the high pressure Pd detected by the high pressure sensor 72d approaches the target high pressure PdO determined based on the target high-temperature side heating medium temperature.

In addition, regarding the heating expansion valve 20a, the controller 70 controls the throttle opening degree so that the degree of superheat SH1 of the outlet side refrigerant of the outdoor heat exchanger 22 approaches a predetermined target degree of superheat KSH (in the present embodiment, 5° C.). The degree of superheat SH1 is calculated from the outdoor unit refrigerant temperature T1 detected by the outdoor unit temperature sensor 72j and the outdoor unit refrigerant pressure P1 detected by the outdoor unit pressure sensor 72k.

In addition, regarding the air mix door 64, the controller 70 controls the opening degree so that the blow-out air temperature TAV detected by the conditioned air temperature sensor 72e approaches the target blow-out temperature TAO. In the heating mode, the opening degree of the air mix door 64 may be controlled so that the total air volume of the ventilation air having passed through the indoor evaporator 23 flows into the water refrigerant heat exchanger 12.

In the refrigeration cycle 10, when the compressor 11 operates, the high-pressure refrigerant discharged from the compressor 11 flows into the refrigerant passage 12a of the water refrigerant heat exchanger 12. The refrigerant flowing into the water refrigerant heat exchanger 12 dissipates heat to the high-temperature side heating medium flowing through the heating medium passage 12b and condenses. Accordingly, the high-temperature side heating medium is heated in the water refrigerant heat exchanger 12.

At this time, in the high-temperature side heating medium circuit 30, the high-temperature side heating medium circulates by the operation of the high-temperature side pump 32. Therefore, the high-temperature side heating medium heated by the water refrigerant heat exchanger 12 flows into the heater core 33 through the water heater 34 and the high-temperature side pump 32. The high-temperature side heating medium flowing into the heater core 33 exchanges heat with the ventilation air passing through the indoor evaporator 23. Accordingly, the ventilation air blown into the vehicle interior is heated using at least the high-pressure refrigerant as a heat source.

The refrigerant flowing out of the water refrigerant heat exchanger 12 flows into the receiver 19 through the first three-way joint 13a and the inlet side passage 27a. The refrigerant flowing into the receiver 19 is separated into gas and liquid in the receiver 19. A part of the liquid-phase refrigerant separated in the receiver 19 flows into the heating expansion valve 20a through the outlet side passage 27b and the second three-way joint 13$b$. The rest of the liquid-phase refrigerant separated in the receiver 19 is stored in the receiver 19 as surplus refrigerant.

The refrigerant flowing into the heating expansion valve 20$a$ is decompressed until it becomes a low-pressure refrigerant. At this time, the throttle opening degree of the heating expansion valve 20$a$ is controlled so that the degree of superheat SH1 approaches the target degree of superheat KSH. In the heating mode, the throttle opening degree is controlled so that the degree of superheat of the outlet side refrigerant of the outdoor heat exchanger 22 substantially approaches the target degree of superheat KSH.

The low-pressure refrigerant decompressed in the heating expansion valve 20$a$ flows into the outdoor heat exchanger 22. The refrigerant flowing into the outdoor heat exchanger 22 exchanges heat with the outside air blown from the outside air fan 22$a$, absorbs heat from the outside air, and evaporates. The refrigerant flowing out of the outdoor heat exchanger 22 is sucked into the compressor 11 through the third three-way joint 13$c$, the suction side passage 27$d$, and the fourth three-way joint 13$d$, and compressed again.

Therefore, in the heating mode, heating in the vehicle interior can be performed by blowing out the ventilation air heated in the heater core 33 into the vehicle interior.

As described above, in the heating mode of the vehicle air conditioner 1 according to the present embodiment, the outdoor heat exchanger 22 absorbs heat from the outside air, and the heat absorbed from the outside air is used for the heating in the vehicle interior. Here, when the outside air has a low temperature and a high humidity, frost is formed on the surface of the outdoor heat exchanger 22, and the heat exchange performance in the outdoor heat exchanger 22 is deteriorated.

In other words, when frost is formed on the outdoor heat exchanger 22 in the heating mode, the amount of heat absorbed from the outside air in the outdoor heat exchanger 22 decreases, consequently, resulting in a factor in deterioration of the heating performance of the vehicle air conditioner 1.

Therefore, the vehicle air conditioner 1 according to the present embodiment executes the defrosting operation in order to cope with frost formation on the outdoor heat exchanger 22. As the operation mode of the defrosting operation according to the present embodiment, a condensation heat defrosting mode is performed. The condensation heat defrosting mode being one of the operation modes of the defrosting operation will be described with reference to FIG. 5.

The condensation heat defrosting mode is an operation mode in which defrosting of the outdoor heat exchanger 22 is performed using heat absorbed from the ventilation air in the indoor air conditioning unit 60 in the indoor evaporator 23 and heat absorbed from the low-temperature side heating medium circuit 40 in the chiller 24. The heat absorbed from the low-temperature side heating medium circuit 40 in the chiller 24 includes the heat dissipated from the battery 75 to the low-temperature side heating medium and the heat applied to the low-temperature side heating medium in the electric heater 44.

Hereinafter, as an example of the condensation heat defrosting mode, a case where defrosting of the outdoor heat exchanger 22 is performed using heat absorbed from the low-temperature side heating medium circuit 40 in the chiller 24 will be described. The condensation heat defrosting mode in this case is executed, for example, at the time of defrosting the outdoor heat exchanger 22 when the battery 75 of the electric vehicle is being charged and there is a heat capacity in the vehicle interior. Since it is assumed that the heat amount generated in the battery 75 is large during charging of the battery 75, the heat generated in the battery 75 by charging can be effectively used for defrosting of the outdoor heat exchanger 22.

In the condensation heat defrosting mode in this case, the controller 70 closes the first on-off valve 16$a$ and opens the second on-off valve 16$b$. The controller 70 operates the three-way valve 18 so that the refrigerant outlet of the outdoor heat exchanger 22 and the flow path on the fifth three-way joint 13$e$ side communicate with each other and the flow path on the first check valve 21$a$ side is closed. Furthermore, the controller 70 brings the heating expansion valve 20$a$ into the fully opened state and brings the cooling expansion valve 20$c$ into the throttling state. The controller 70 brings the air-cooling expansion valve 20$b$ into the fully closed state.

In addition, the controller 70 operates the low-temperature side pump 42 to pressure-feed the low-temperature side heating medium with a predetermined pressure-feeding capacity. The controller 70 keeps the high-temperature side pump 32 in a stopped state regarding the high-temperature side heating medium circuit 30.

Accordingly, in the refrigeration cycle 10 in the case of the condensation heat defrosting mode, a vapor compression refrigeration cycle is configured. The refrigerant flows and circulates in the order of the compressor 11, the water refrigerant heat exchanger 12, the second on-off valve 16$b$, the heating expansion valve 20$a$, the outdoor heat exchanger 22, the three-way valve 18, the receiver 19, the cooling expansion valve 20$c$, the chiller 24, and the compressor 11.

With this circuit configuration, the controller 70 controls operations of various apparatuses to be controlled. For example, regarding the compressor 11, the controller 70 controls the refrigerant discharge capacity so that the temperature of the low-temperature side heating medium in the chiller 24 approaches the target low-temperature side heating medium temperature. The target low-temperature side heating medium temperature is determined so that the battery temperature approaches an appropriate temperature range.

Regarding the cooling expansion valve 20$c$, the controller 70 controls the throttle opening degree so that the degree of superheat of the outlet side refrigerant of the refrigerant passage 24$a$ in the chiller 24 approaches a predetermined reference chiller side degree of superheat. The degree of superheat of the outlet side refrigerant in the chiller 24 is calculated based on the temperature of the outlet side refrigerant detected in the chiller temperature sensor 72$h$ and the pressure of the outlet side refrigerant detected in the chiller pressure sensor 72$i$. In addition, the reference chiller side degree of superheat is set so that the battery temperature TB is a temperature of the low-temperature side heating medium that can be maintained within an appropriate temperature range of the battery 75.

Figure 5:
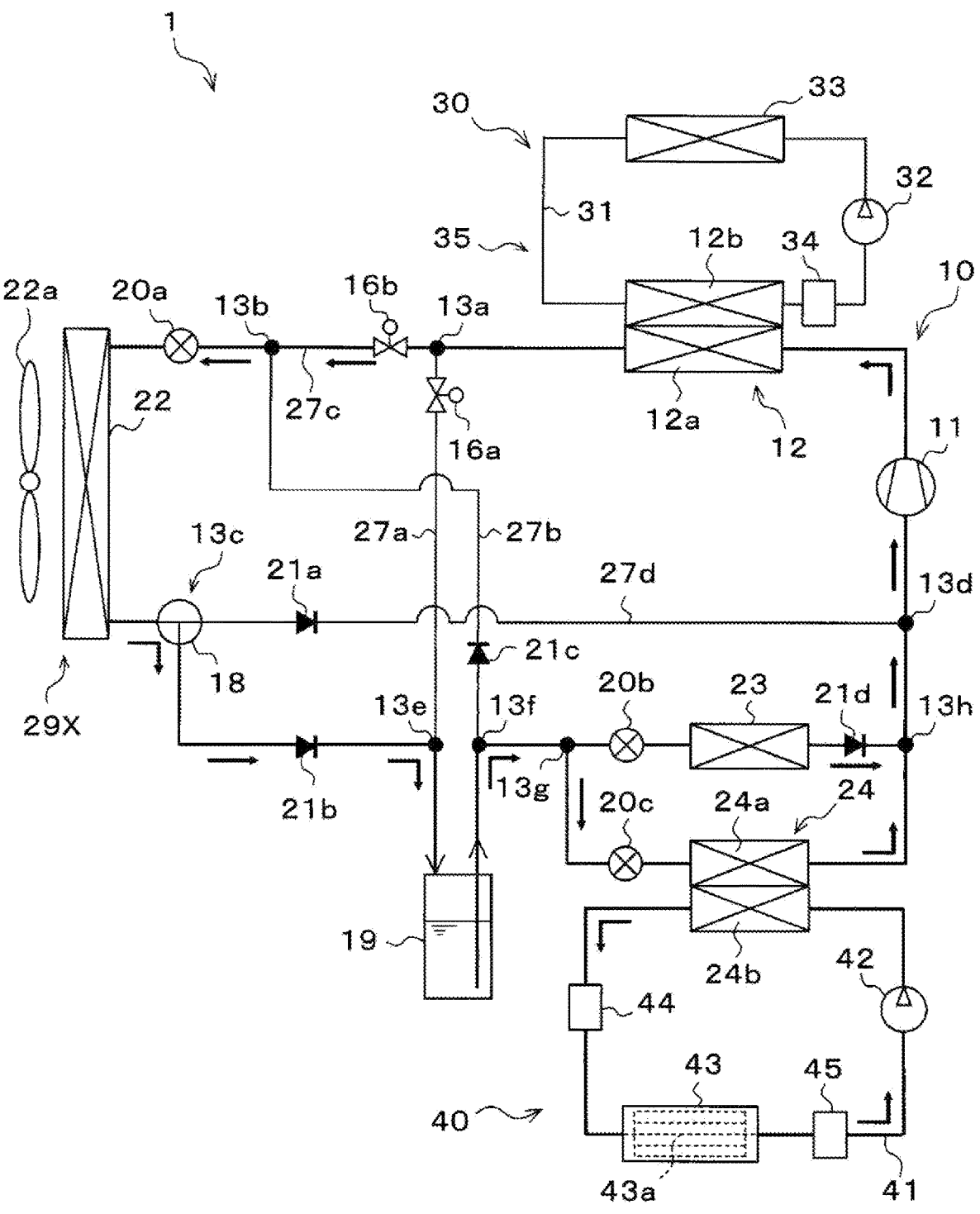
FIG. 5 is an overall configuration diagram showing an example of operation in a condensation heat defrosting mode in the vehicle air conditioner of the first embodiment.

As shown in FIG. 5, in the refrigeration cycle 10, the high-pressure refrigerant discharged from the compressor 11 passes through the refrigerant passage 12$a$ of the water refrigerant heat exchanger 12. The high-pressure refrigerant having flowed out of the water refrigerant heat exchanger 12 passes through the heating expansion valve 20$a$ in the fully opened state through the second on-off valve 16$b$ and the outside air side passage 27$c$, and flows into the outdoor heat exchanger 22.

Therefore, the high-pressure refrigerant discharged from the compressor 11 flows into the outdoor heat exchanger 22 with hardly dissipating heat. Therefore, the heat of the high-pressure refrigerant can be applied to the outdoor heat exchanger 22, and the defrosting of the outdoor heat exchanger 22 can be performed.

The refrigerant flowing out of the outdoor heat exchanger 22 flows into the receiver 19 through the three-way valve 18, the second check valve 21*b*, and the fifth three-way joint 13*e*, and is separated into gas and liquid. A part of the liquid-phase refrigerant separated in the receiver 19 flows into the cooling expansion valve 20*c* through the sixth three-way joint 13*f* and the seventh three-way joint 13*g*, is decompressed, and flows into the refrigerant passage 24*a* of the chiller 24. Accordingly, the low-pressure refrigerant flowing into the chiller 24 absorbs heat from the low-temperature side heating medium that has absorbed heat of the battery 75 and evaporates. The refrigerant flowing out of the chiller 24 is guided to the suction port of the compressor 11, compressed again, and discharged.

In the condensation heat defrosting mode in this case, the heat generated in the battery 75 absorbed by the chiller 24 can be pumped up in the refrigeration cycle 10 and used for defrosting of the outdoor heat exchanger 22.

The condensation heat defrosting operation of the outdoor heat exchanger 22 in the vehicle air conditioner 1 according to the present embodiment is executed when the frost formation amount adhering to the outdoor heat exchanger 22 exceeds a predetermined reference. In the condensation heat defrosting mode, after the frost adhering to the outdoor heat exchanger 22 is melted, moisture generated by the melting is evaporated and removed.

Specifically, in the condensation heat defrosting mode, melting defrosting for the purpose of melting the frost adhering to the outdoor heat exchanger 22 and dry defrosting for the purpose of evaporating and removing moisture generated by the melting defrosting are performed.

Here, even when the frost adhering to the outdoor heat exchanger 22 is melted by defrosting the outdoor heat exchanger 22, when the outside air temperature is a low temperature of 0° C. or lower, moisture generated by the melting (hereinafter, also referred to as residual moisture) is frozen again, and the heat exchange performance of the outdoor heat exchanger 22 is deteriorated.

Since deterioration in heat exchange performance of the outdoor heat exchanger 22 is a factor of deterioration in air conditioning performance of the vehicle air conditioner 1 and the like, re-freezing of moisture generated by defrosting needs to be prevented. As a method for preventing re-freezing of moisture generated by defrosting, it is conceivable that moisture generated by defrosting is evaporated to remove moisture from the surface of the outdoor heat exchanger 22. In the condensation heat defrosting mode, dry defrosting is introduced in consideration of preventing re-freezing of the melted moisture.

It is considered that there is an efficient condition for evaporating and removing moisture from the outdoor heat exchanger 22 at the time of condensation heat defrosting in the vehicle air conditioner 1. Therefore, regarding evaporation and removal of moisture from the outdoor heat exchanger 22, in order to identify useful conditions from the viewpoint of the energy efficiency and the quality of the vehicle air conditioner 1, evaporation of moisture in the outdoor heat exchanger 22 will be considered.

First, preconditions for considering evaporation of moisture in the outdoor heat exchanger 22 will be described. It is assumed that the frost adhering to the outdoor heat exchanger 22 melts and becomes water in 1 to 2 minutes after the start of the defrosting operation from the tendency of past actual measurement results, and that all the frost adhering to the outdoor heat exchanger is melted.

It is assumed that there is no distribution on the evaporation surface of the residual moisture on the surface of the outdoor heat exchanger 22. It is assumed that the refrigerant temperature in the outdoor heat exchanger is uniform at the condensation temperature. It is assumed that the wind speed of the evaporation surface in the residual moisture of the outdoor heat exchanger 22 is all uniform. In evaporative removal of residual moisture, changes over time such as transient changes in water surface area are ignored.

The evaporation water temperature of the residual moisture on the surface of the outdoor heat exchanger 22 is defined as satisfying the following relationship. The value obtained by multiplying the value obtained by subtracting the evaporation water temperature of the residual moisture from the refrigerant condensation temperature of the outdoor heat exchanger 22 by the conductivity of water and the evaporation surface area and dividing the multiplied value by the thickness of the residual moisture is equal to the value obtained by multiplying the value obtained by subtracting the refrigerant condensation temperature of the outdoor heat exchanger 22 from the outside air temperature by the thermal conductivity of water to air and the evaporation surface area.

Regarding the water-retaining state of the residual moisture in the air passage of the outdoor heat exchanger 22, it is assumed that the inside of the fin partitioning the air passage is in a state of not being filled with the residual moisture, and that the evaporation surface area of the outdoor heat exchanger 22 in this case has a predetermined value.

Under the above-described preconditions, the evaporation rate Va per unit area will be considered using a plurality of experimental formulas shown in FIG. 6. Specifically, an experimental formula relating to the diffusion coefficient D, an experimental formula relating to the Reynolds number Re, an experimental formula relating to the Schmidt number Sc, an experimental formula relating to the Sherwood number Sh, and an experimental formula relating to the evaporation rate Va per unit area are used.

From these experimental formulas shown in FIG. 6, it is found that the evaporation rate Va per unit area tends to increase as the wind speed Vc increases. In addition, the evaporation rate Va per unit area tends to increase as the evaporation water temperature of residual moisture increases. The evaporation water temperature of the residual moisture increases as the refrigerant condensation temperature increases, and increases as the wind speed Vc decreases. When the wind speed Vc is increased at the same refrigerant condensation temperature, both factors of increasing and decreasing the evaporation rate Va per unit area are affected.

Figure 7:
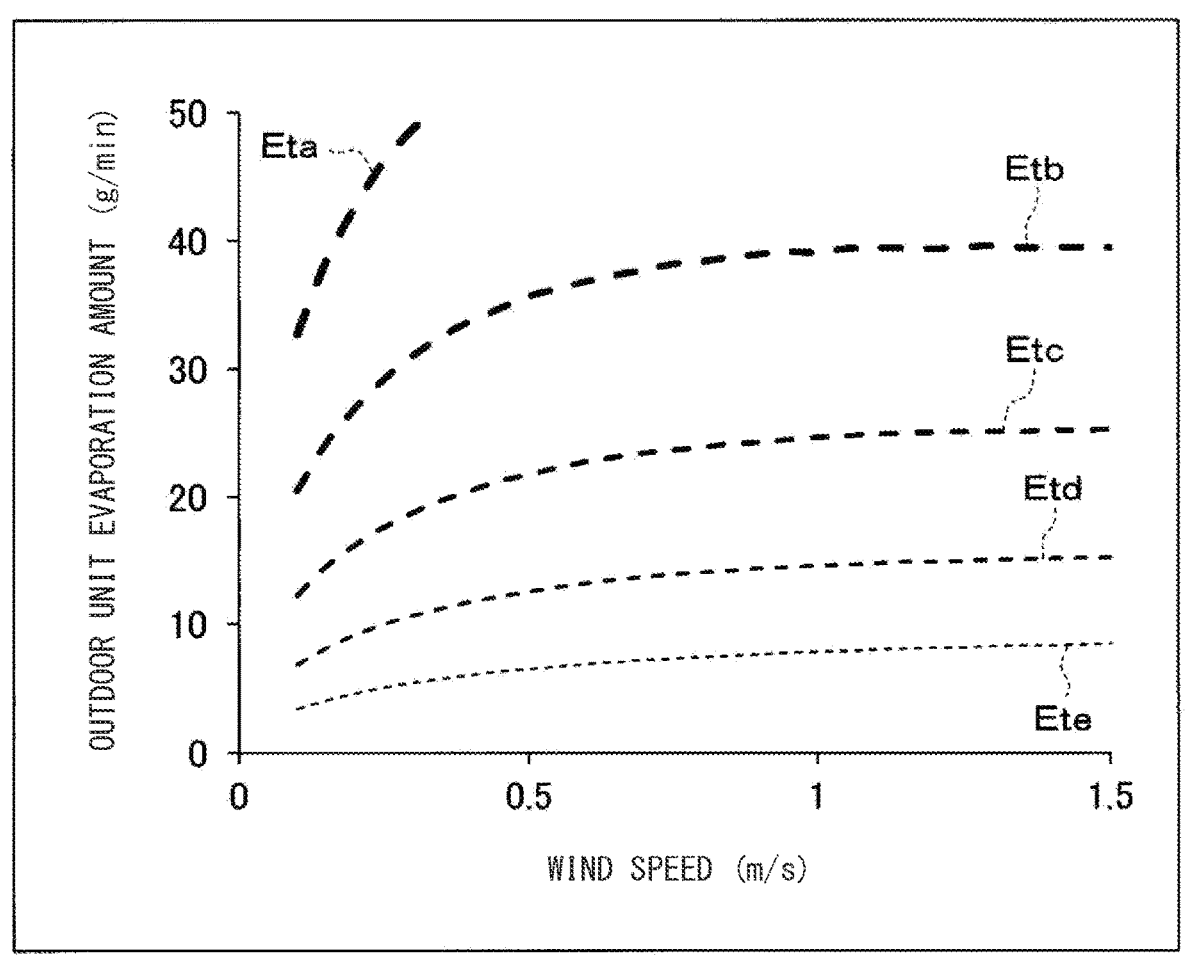
FIG. 7 is a graph showing a relationship between an outdoor unit evaporation amount and a wind speed with respect to a condensation temperature of the outdoor heat exchanger.

FIG. 7 shows a result of calculation of the relationship between the outdoor unit evaporation amount and the wind speed Vc at different refrigerant condensation temperatures using the experimental formula shown in FIG. 6. Eta in FIG. 7 indicates the relationship between the outdoor unit evaporation amount and the wind speed when the refrigerant condensation temperature is 20° C.

Similarly, Etb indicates the relationship between the outdoor unit evaporation amount and the wind speed when the refrigerant condensation temperature is 30° C., and Etc indicates the relationship between the outdoor unit evaporation amount and the wind speed when the refrigerant condensation temperature is 40° C. Etd indicates the relationship between the outdoor unit evaporation amount and the wind speed when the refrigerant condensation temperature is 50° C., and Ete indicates the relationship between the outdoor unit evaporation amount and the wind speed when the refrigerant condensation temperature is 60° C.

It can be seen from the graph shown in FIG. 7 that the outdoor unit evaporation amount tends to increase as the evaporation water temperature of residual moisture accompanying an increase in the wind speed Vc increases. Furthermore, it can be seen that the outdoor unit evaporation amount tends to increase as the evaporation water temperature of residual moisture accompanying an increase in refrigerant condensation temperature increases. That is, by appropriately adjusting the refrigerant condensation temperature that can be controlled by the vehicle air conditioner 1 and the wind speed Vc by the outside air fan 22a, evaporation removal of residual moisture in the outdoor heat exchanger 22 can be more efficiently achieved.

Here, in the vehicle air conditioner 1 according to the present embodiment, when evaporation removal of moisture in the outdoor heat exchanger 22 is performed, the operation of the refrigeration cycle 10 is required in order to achieve the refrigerant condensation temperature and the wind speed Vc described above.

Figure 8:
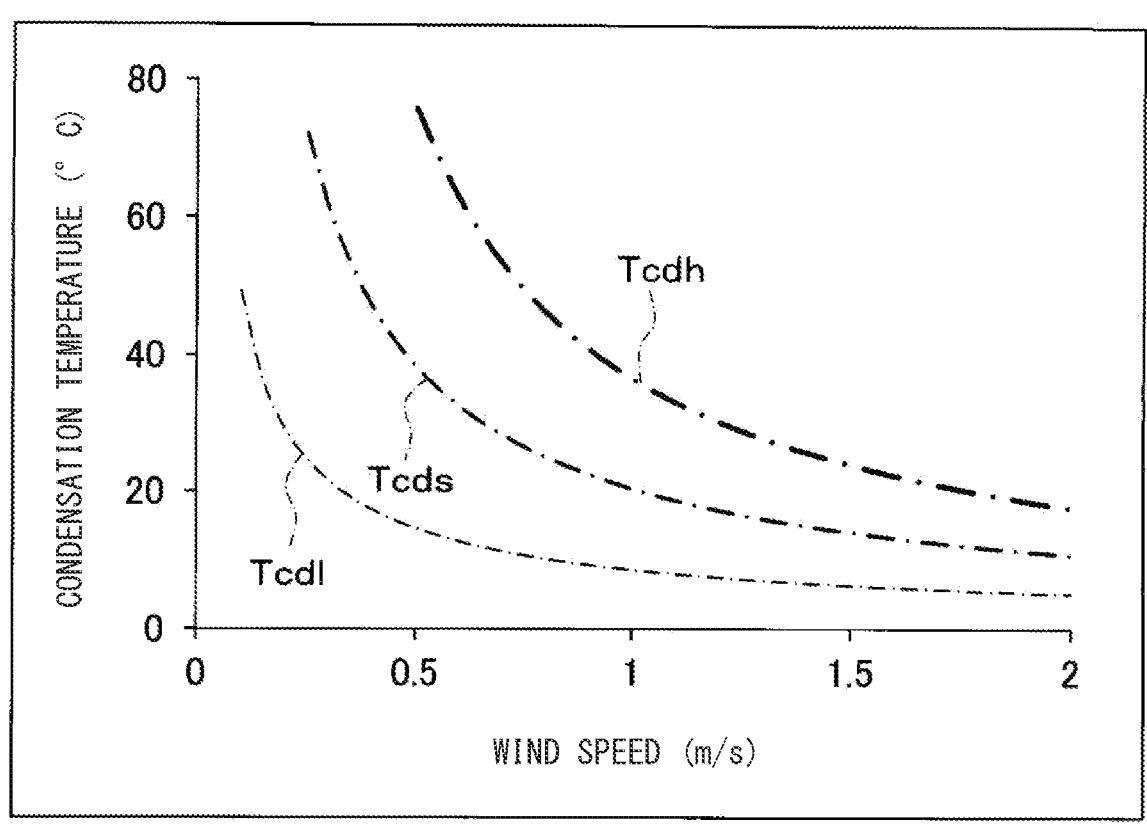
FIG. 8 is a graph showing a relationship between the condensation temperature and the wind speed with respect to the compressor rotational speed.

The relationship between the refrigerant condensation temperature and the wind speed in a range that can be achieved by a general refrigeration cycle is examined. FIG. 8 is a graph showing the relationship between the refrigerant condensation temperature and the wind speed when the refrigerant discharge capacity of the compressor and the heat absorption amount of the chiller 24 are set as conditions.

In FIG. 8, Tcdh indicates the relationship between the refrigerant condensation temperature and the wind speed when the rotation speed of the compressor 11 and the heat absorption amount of the chiller 24 are maximum. In addition, Tcdl indicates the relationship between the refrigerant condensation temperature and the wind speed when the rotation speed of the compressor 11 and the heat absorption amount of the chiller 24 are minimum. Tcds indicates the relationship between the refrigerant condensation temperature and the wind speed when the rotation speed of the compressor 11 and the heat absorption amount of the chiller 24 are standard values.

Figure 9:
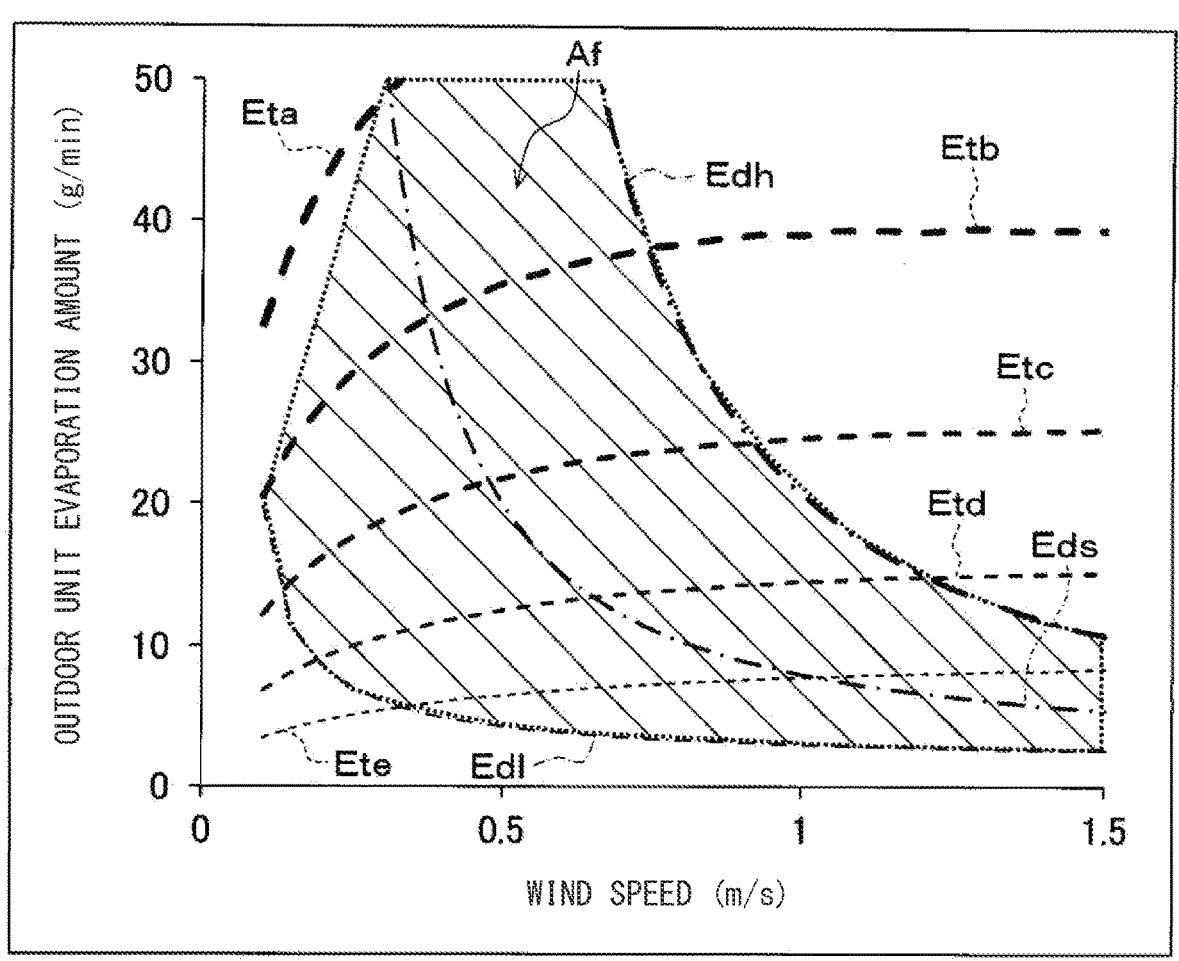
FIG. 9 is a graph showing an operating condition area achievable by the refrigeration cycle device in relation to the outdoor unit evaporation amount and the wind speed.

The graph shown in FIG. 9 is formed using the graphs shown in FIGS. 7 and 8. In FIG. 9, Edh indicates the relationship between the outdoor unit evaporation amount and the wind speed when the rotation speed of the compressor 11 and the heat absorption amount of the chiller 24 are maximum. In addition, Edl indicates the relationship between the outdoor unit evaporation amount and the wind speed when the rotation speed of the compressor 11 and the heat absorption amount of the chiller 24 are minimum. Wds indicates the relationship between the outdoor unit evaporation amount and the wind speed when the rotation speed of the compressor 11 and the heat absorption amount of the chiller 24 are standard values.

According to the graph shown in FIG. 9, it is possible to identify the operating condition area Af that can be achieved in the refrigeration cycle according to the wind speed. By operating the refrigeration cycle under the outdoor unit evaporation amount and the wind speed Vc included in the operating condition area Af, at least evaporation removal of residual moisture in the outdoor heat exchanger 22 can be achieved in a relatively short period of time.

Performing evaporation removal of residual moisture in the outdoor heat exchanger 22 means that water vapor derived from residual moisture is generated. When water vapor is generated from the outdoor heat exchanger 22 in the drive unit room when the outside air temperature is low, it is recognized from the outside that white fog-shaped gas is generated from the drive unit room. Therefore, there is a possibility of false recognition that white smoke is generated from an apparatus in the drive unit room.

Therefore, when performing evaporation removal of residual moisture in the outdoor heat exchanger 22, it is necessary to promote evaporation removal of residual moisture while suppressing visual recognition of white fog. As a standard for visual recognition of white fog, a method using a psychrometric chart is known.

Figure 10:
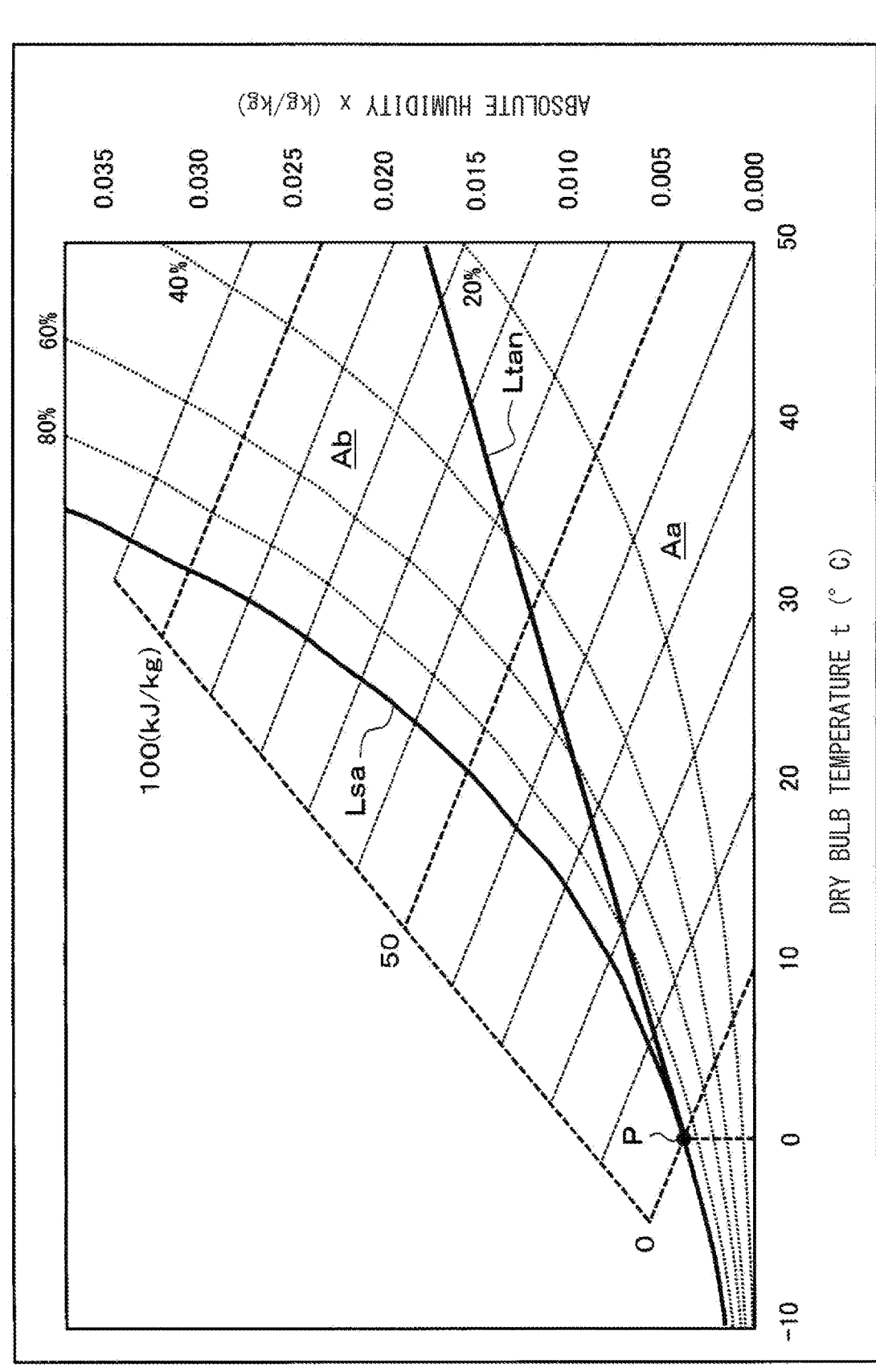
FIG. 10 is a psychrometric chart showing reference regarding visibility of white fog in dry defrosting.

FIG. 10 is an explanatory diagram of a psychrometric chart. In this figure, a horizontal axis represents temperature, a vertical axis represents absolute humidity, and an oblique curve in the figure represents relative humidity ψ. A line having a relative humidity ψ of 100% is particularly referred to as a saturation line Lsa. A region on the left side of the saturation line Lsa indicates a state in which moisture is completely liquefied. On the right side of the saturation line Lsa, water vapor and other gases (air and the like) are in a state of being mixed. In the gas in this state, the higher the relative humidity ψ is, the more moisture is condensed and the gas is likely to be visually recognized as white fog.

Here, it is assumed that the water vapor causes the false recognition as the white fog at the time of evaporation removal of the residual moisture in the outdoor heat exchanger 22 at a stage where the substance-mixing of the outside air and the air after passing through the outdoor heat exchanger 22 is completed. When the mixing of the outside air and the air after passing through the outdoor heat exchanger 22 is completed, a relationship based on a mixing ratio of the two is finally reached.

Therefore, although the diffusion of heat is faster than the diffusion of substances, it is considered that whether or not there is a problem as a result of the white fog being visually recognized can be defined as a state in which substance mixing is completed from empirical knowledge, and it can be determined by the mixing ratio between the outside air and the air after passing through the outdoor heat exchanger 22.

The state of the air on the air outlet side in the outside air heat exchanger includes not only the state of the air after passing through the outdoor heat exchanger 22 but also the state in which the substance-mixing of the air after passing through the outdoor heat exchanger 22 and the outside air is completed.

With reference to FIG. 10, determination of visibility of white fog using a psychrometric chart will be described by exemplifying a case where the outside air temperature is 0° C. First, a tangent Ltan to the saturation line Lsa is obtained from the saturation point at the outside air temperature in the psychrometric chart. The tangent Ltan indicates the visibility limit at which water vapor is recognized as white fog. In the case shown in FIG. 10, a tangent Ltan passing through the saturation point P when the outside air temperature is 0° C. is obtained.

In the psychrometric chart in FIG. 10, a region positioned below the tangent Ltan corresponds to the visibility suppressing region Aa where water vapor generated from the outdoor heat exchanger 22 is not recognized as white fog. On the other hand, in the psychrometric chart, a region positioned at the saturation line Lsa or lower and above the tangent Ltan corresponds to the visibility region Ab where water vapor generated from the outdoor heat exchanger 22 is recognized as white fog and becomes a problem.

Depending on which of the visibility suppressing region Aa and the visibility region Ab the air state at the stage where the mixing of the outside air and the air after passing through the outdoor heat exchanger 22 is completed belongs to, whether the water vapor is visually recognized as the white fog can be identified. Therefore, by controlling the refrigerant condensation temperature and the wind speed Vc in the outdoor heat exchanger 22 so that the state of the air at the stage where the mixing of the outside air and the air after passing through the outdoor heat exchanger 22 is completed belongs to the visibility suppressing region Aa, quick dry defrosting can be achieved in a state where visibility as white fog is suppressed.

In addition, with the tangent Ltan as a reference in the psychrometric chart, since the state of the air at the stage where the mixing of the outside air and the air after passing through the outdoor heat exchanger 22 is completed is set to be the visibility suppressing region Aa, the state of the air does not belong to the visibility region Ab. Therefore, it is possible to sufficiently suppress visibility as white fog in the process until the outside air and the air after passing through the outdoor heat exchanger 22 are completed.

Here, on the assumption that the refrigerant side capacity and the air side capacity in the refrigeration cycle are balanced, the air side specific enthalpy Sep with respect to the refrigerant side outdoor unit capacity at a refrigeration cycle balance point (that is, the refrigerant discharge capacity and the heat absorption amount) that produces any wind speed Vc and a refrigerant condensation temperature is calculated. From the air side specific enthalpy Sep, a specific enthalpy line Lse corresponding to the air side specific enthalpy Sep is identified in the psychrometric chart.

Figure 11:
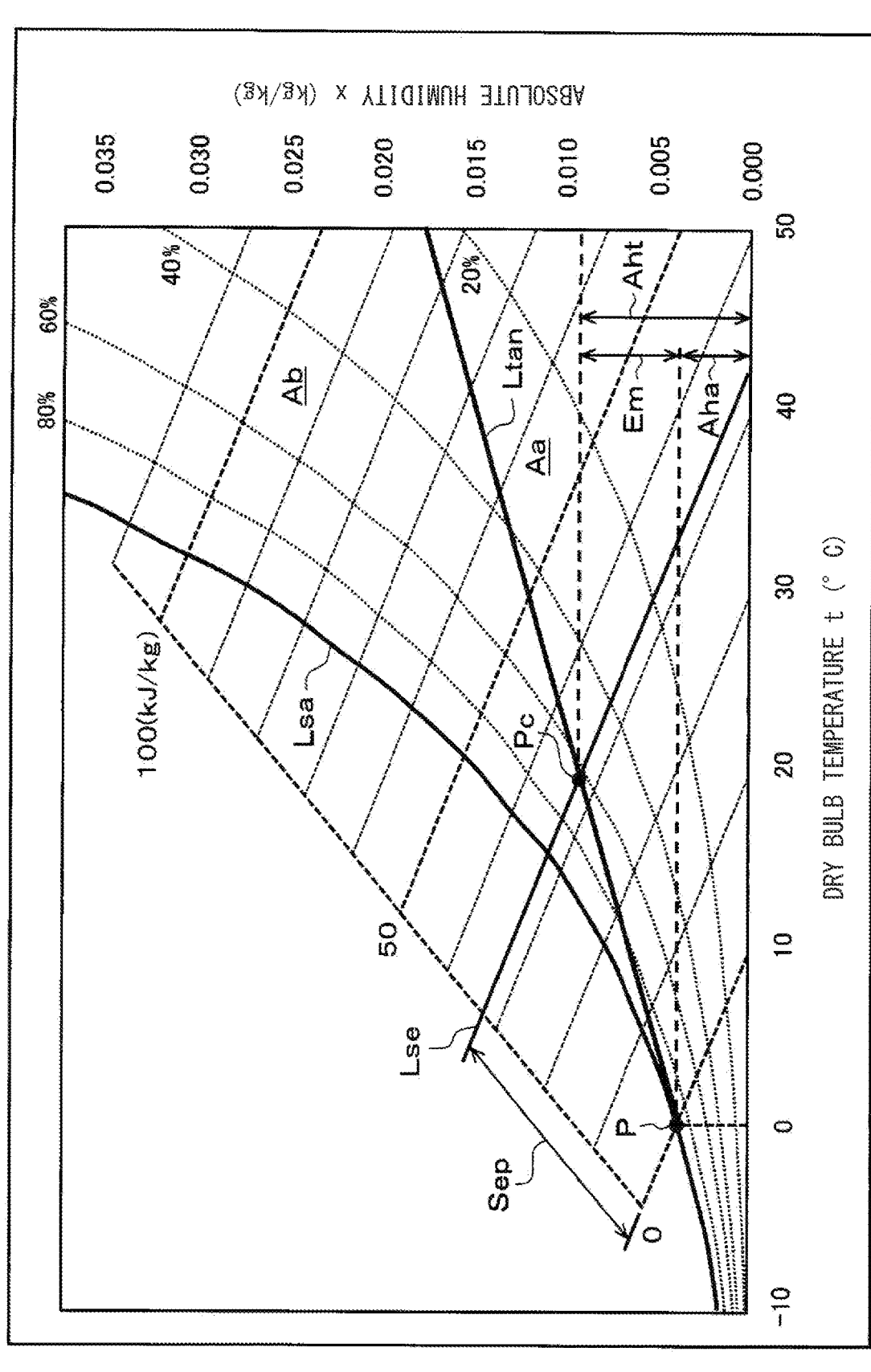
FIG. 11 is a psychrometric chart relating to calculation of an allowable upper limit evaporation amount per unit weight.

For example, on the assumption of a certain optional system, when the outside air temperature is 0° C., the wind speed Vc is 0.5 m/s, and the refrigerant condensation temperature is 35° C., the air side specific enthalpy is calculated to be 33 kJ/kg. The specific enthalpy line Lse corresponding to the calculated 33 kJ/kg is identified in the psychrometric chart shown in FIG. 11.

Subsequently, an intersection point Pc between the tangent Ltan and the specific enthalpy line Lse is identified. Here, the allowable upper limit evaporation amount Em per unit passing air weight is calculated by subtracting the absolute humidity Aha at the intersection point Pc from the absolute humidity Aht at the saturation point P of the outside air temperature. The allowable upper limit evaporation amount Em per unit passing air weight indicates a water vapor amount allowed until saturation with respect to air per unit weight after passing the outdoor heat exchanger 22.

Figure 12:
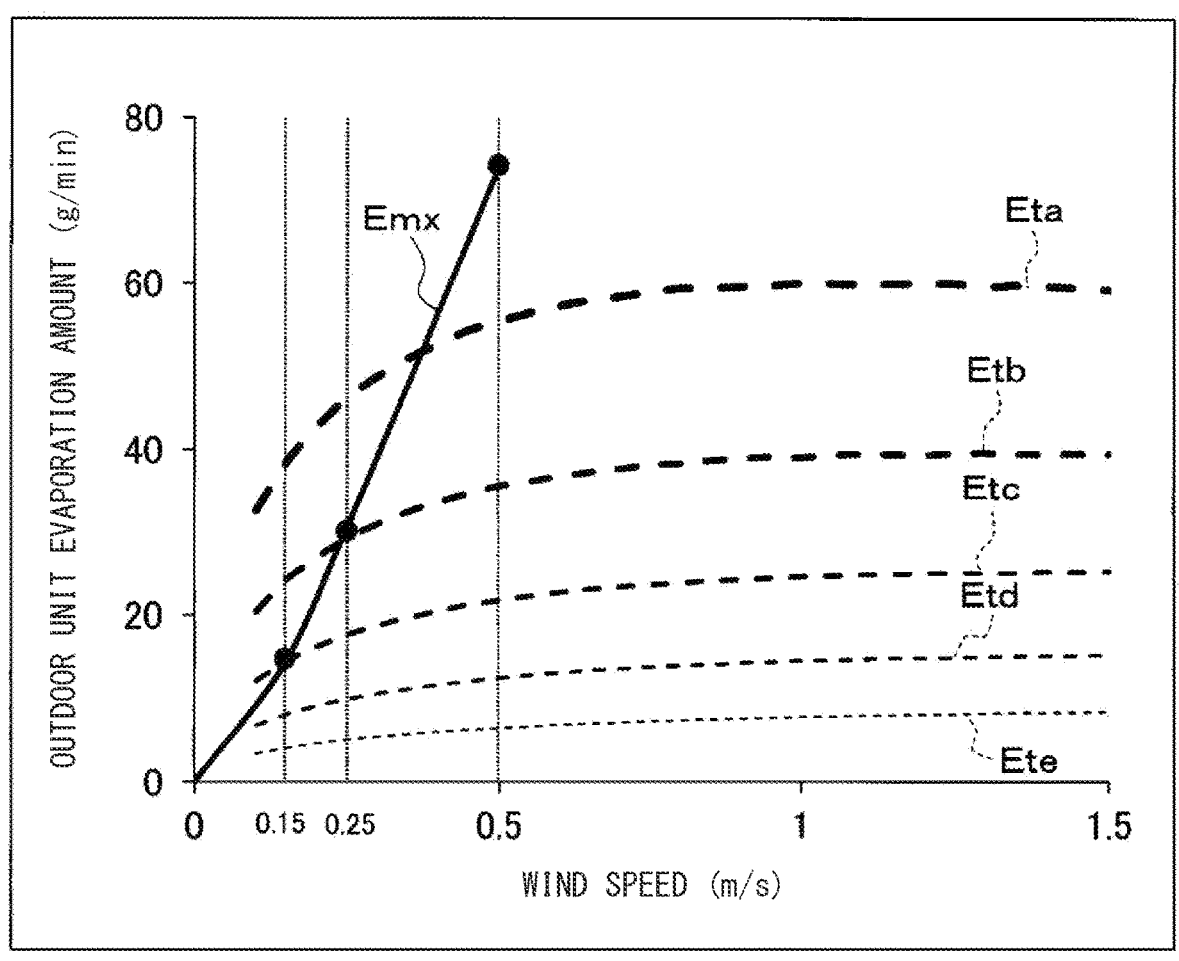
FIG. 12 is a graph showing the relationship between the outdoor unit evaporation amount and the wind speed with respect to the condensation temperature, and the relationship with the allowable upper limit evaporation amount.

The allowable upper limit evaporation amount Em per unit passing air weight calculated in this manner was calculated by changing various conditions such as the wind speed Vc and the refrigerant condensation temperature. The allowable upper limit evaporation amount Em per unit passing air weight under various conditions is summarized as an allowable upper limit evaporation amount line Emx in FIG. 12. In FIG. 12, when the outdoor unit evaporation amount and the wind speed Vc are in a region lower than the allowable upper limit evaporation amount line Emx, evaporation removal of the residual moisture can be efficiently performed in a state of not being visually recognized as the white fog finally.

Here, in the condensation heat defrosting in the vehicle air conditioner 1, it is assumed that by the heating operation at the time of the low outside air temperature, the maximum allowable frost formation amount of the frost adhering to the outdoor heat exchanger 22 adheres. Therefore, in the present embodiment, the required moisture evaporation amount En that needs to be evaporated and removed from the outdoor heat exchanger 22 is obtained by subtracting the moisture amount falling from the outdoor heat exchanger 22 due to the melting of frost from the maximum allowable frost formation amount.

Figure 13:
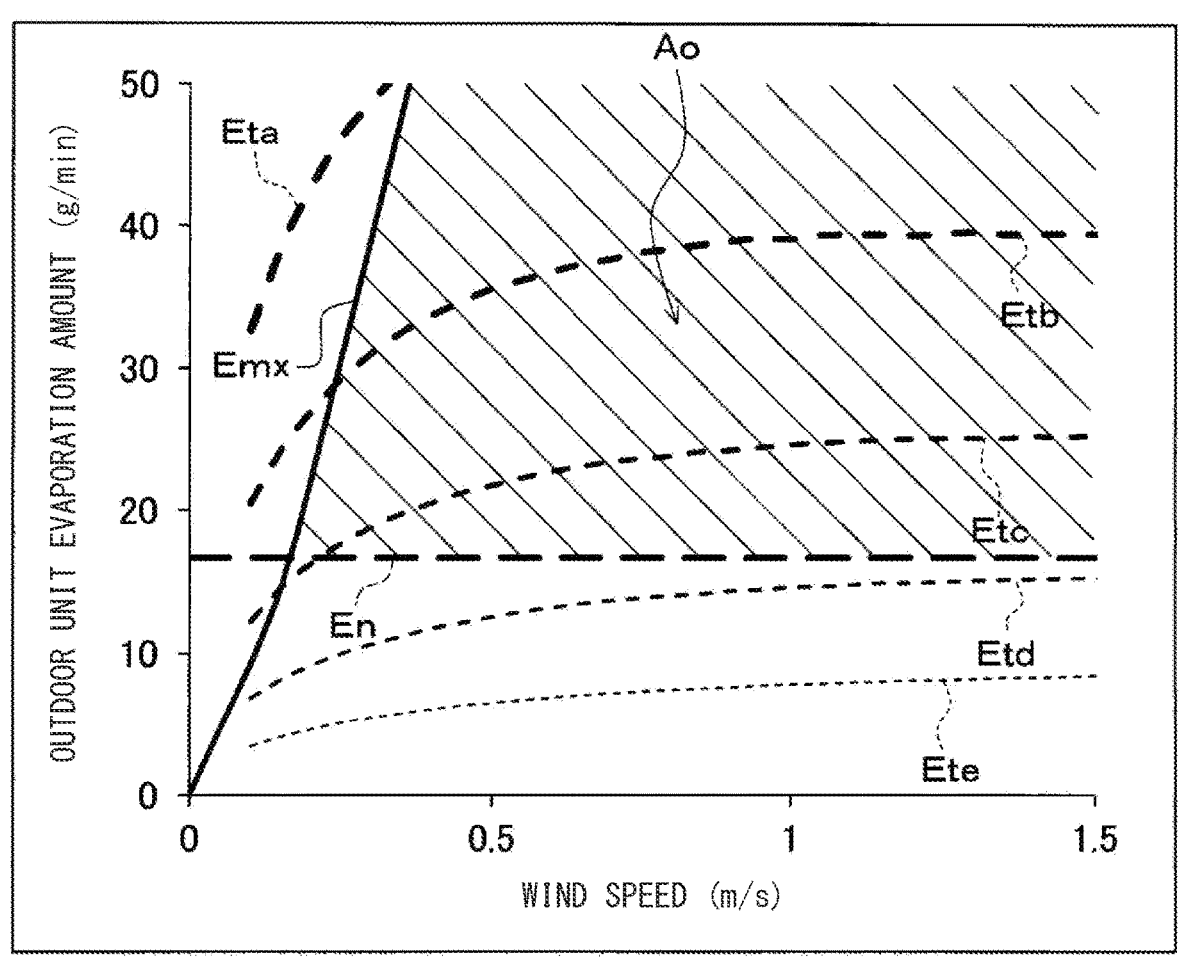
FIG. 13 is a graph showing object areas for sufficiently recovering the heat exchange performance of the outdoor heat exchanger while suppressing visual recognition of white fog by dry defrosting.

As shown in FIG. 13, regarding evaporation removal of residual moisture from the outdoor heat exchanger 22, an operating condition for quickly recovering heat exchange performance of the outdoor heat exchanger 22 without visually recognizing white fog is defined in the object area Ao. The object area Ao is determined so that the wind speed is larger than the wind speed Vc related to the allowable upper limit evaporation amount line Emx and the outdoor unit evaporation amount is larger than the required moisture evaporation amount En.

Figures 14, 15:
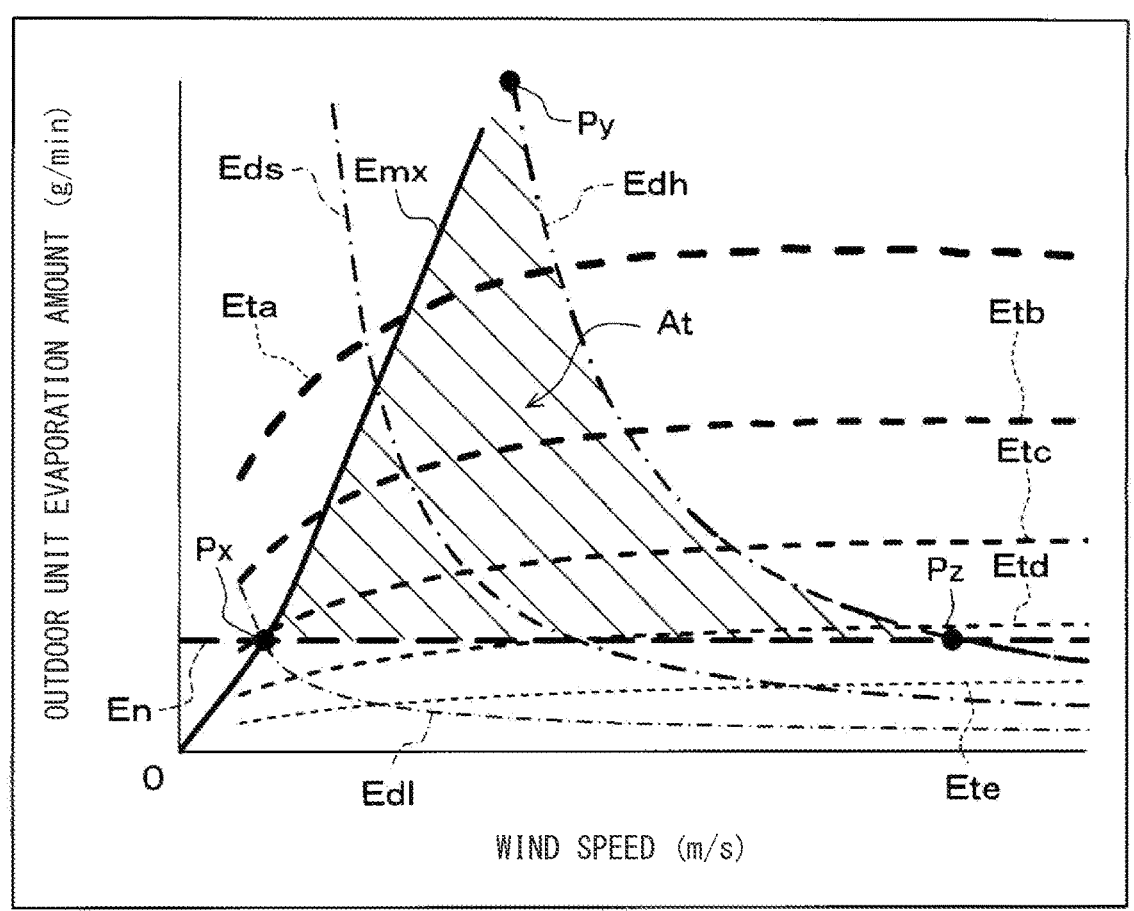
FIG. 14 is a graph showing feasible target areas for sufficiently recovering the heat exchange performance of the outdoor heat exchanger while suppressing visual recognition of white fog by dry defrosting.
FIG. 15 is a control characteristic diagram for determining a target condensation temperature in dry defrosting.

The consideration made using FIGS. 6 to 13 can be summarized in the graph shown in FIG. 14. The graph in FIG. 14 is content obtained by summarizing the graph shown in FIG. 9 and the graph shown in FIG. 13. A target area At shown in the graph in FIG. 14 indicates an operating condition for quickly recovering heat exchange performance of the outdoor heat exchanger 22 without visually recognizing white fog under an operating condition that can be achieved by the refrigeration cycle, regarding evaporation removal of residual moisture. Specifically, the target area At is defined by an overlapping range between the operating condition area Af in FIG. 9 and the object area Ao in FIG. 13.

As shown in FIG. 14, the target area At includes a point Px, a point Py, and a point Pz. The point Px indicates an intersection point of the allowable upper limit evaporation amount line Emx and the required moisture evaporation amount En. The point Py indicates an intersection point of the allowable upper limit evaporation amount line Emx and the curve Edh indicating the outdoor unit evaporation amount when the rotation speed of the compressor 11 and the heat absorption amount of the chiller 24 are maximum. The point Pz indicates an intersection point of the curve Edh and the required moisture evaporation amount En.

The minimum value of the wind speed Vc in the target area At is the wind speed at the point Px and is 0.12 m/s, and the maximum value of the wind speed Vc in the target area At is the wind speed at the point Pz and is 1.2 m/s.

Therefore, when the residual moisture is evaporated and removed from the outdoor heat exchanger 22 in the defrosting operation, by adjusting the wind speed by the outside air fan 22a in the range of 0.12 m/s to 1.2 m/s, the residual moisture can be quickly evaporated and removed without visually recognizing the white fog.

The minimum value of the outdoor unit evaporation amount in the target area At is identified based on the outdoor unit evaporation amount at the points Px and Pz, and corresponds to the required moisture evaporation amount En. Since the refrigerant condensation temperature can be identified from the outdoor unit evaporation amount, the minimum value of the refrigerant condensation temperature in the target area At is identified as 15° C.

In addition, the maximum value of the outdoor unit evaporation amount in the target area At is identified based on the outdoor unit evaporation amount at the point Py. Calculating from the outdoor unit evaporation amount at the point Py, the maximum value of the refrigerant condensation temperature in the target area At is identified as 70° C.

Therefore, when the residual moisture is evaporated and removed from the outdoor heat exchanger 22 in the defrosting operation, by supplying the heat amount adjusted so that the refrigerant condensation temperature is 15° C. to 70° C.

to the outdoor heat exchanger 22, the residual moisture can be quickly evaporated and removed without visually recognizing the white fog.

Here, the control in the dry defrosting mode can be performed using the defrosting condition coefficient DCC as the operating condition related to evaporation removal of residual moisture from the outdoor heat exchanger 22. The defrosting condition coefficient DCC is a parameter determined by multiplying the wind speed Vc supplied to the outdoor heat exchanger 22 by the outside air fan 22a by the refrigerant condensation temperature in the outdoor heat exchanger 22. In calculating the defrosting condition coefficient DCC, Celsius is adopted as the unit of the refrigerant condensation temperature in the outdoor heat exchanger 22. This is because in discussing an event of dry defrosting, a temperature difference from the melting point of water which is used as a reference is an important factor.

When the defrosting condition coefficient DCC is used, the defrosting condition coefficient DCC relating to the target area At is set to 1.8 to 35. The value "1.8" related to the defrosting condition coefficient DCC is a value related to the point Px, and is obtained by multiplying 0.12 m/s by 15° C. The value "35" related to the defrosting condition coefficient DCC is a value related to the point Py, and is obtained by multiplying 0.5 m/s by 70° C.

Therefore, when the residual moisture is evaporated and removed from the outdoor heat exchanger 22, by adjusting the wind speed Vc and the refrigerant condensation temperature so that the defrosting condition coefficient DCC becomes 1.8 to 35, the residual moisture can be quickly evaporated and removed without visually recognizing the white fog.

Here, dry defrosting in condensation heat defrosting will be described. In the dry defrosting for evaporating and removing residual moisture caused by the melted frost, the operation of the vehicle air conditioner 1 is controlled using the parameters such as the wind speed Vc and the refrigerant condensation temperature determined as described above.

At this time, the controller 70 controls the refrigerant discharge capacity of the compressor 11 so that the refrigerant condensation temperature in the outdoor heat exchanger 22 approaches the target condensation temperature TCO. The target condensation temperature TCO is determined with reference to a control map stored in advance in the controller 70.

In the present embodiment, as shown in the control characteristic diagram in FIG. 15, the target condensation temperature TCO is determined to be increased as the outside air temperature rises. Accordingly, the refrigerant condensation temperature in the dry defrosting is adjusted to be lower as the outside air temperature is lower within the range of 15° C. to 70° C.

Regarding the air-cooling expansion valve 20b and the cooling expansion valve 20c, the controller 70 controls the throttle opening degree so that the degree of superheat of the outlet side refrigerant of the refrigerant passage 24a in the chiller 24 approaches a predetermined reference chiller side degree of superheat (for example, 10° C.).

Regarding the outside air fan 22a corresponding to the supply amount of outside air to the outdoor heat exchanger 22, the rotation speed of the outside air fan 22a is controlled so as to approach the target wind speed VaO. The target wind speed VaO is determined with reference to a control map stored in advance in the controller 70.

Figures 16, 17:
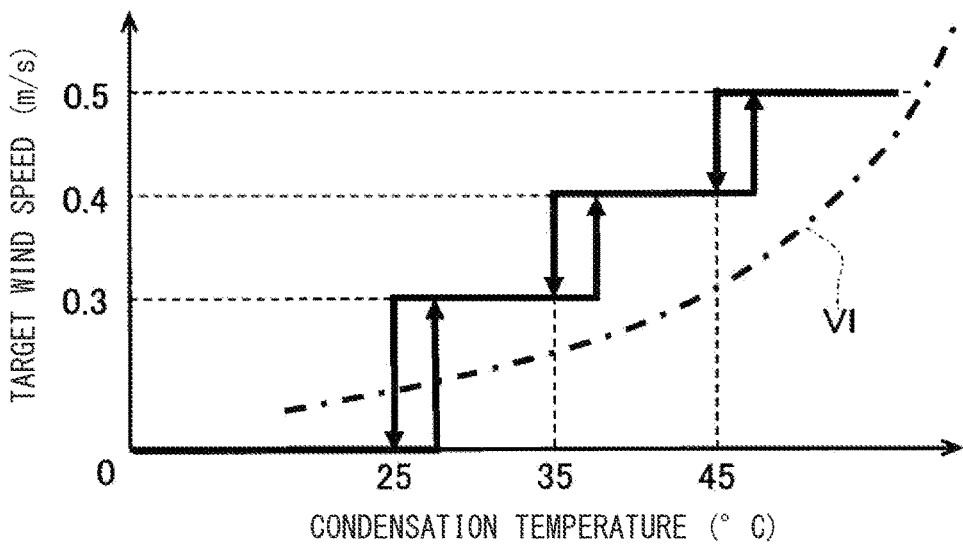
FIG. 16 is a control characteristic diagram for determining a target wind speed in dry defrosting.
FIG. 17 is an explanatory view showing an example of changes in the wind speed, the compressor rotation speed, and the discharge pressure in the dry defrosting mode.

In the present embodiment, as shown in the control characteristic diagram in FIG. 16, the target wind speed VaO is determined so as to decrease as the refrigerant condensation temperature of the outdoor heat exchanger 22 decreases. As described above, since the target condensation temperature TCO is set to be lower as the outside air temperature becomes lower, the target wind speed VaO is also set to be lower as the outside air temperature becomes lower.

In the control characteristic diagram shown in FIG. 16, the target wind speed VaO is set to be larger than the visibility limit wind speed Vl in a state where the operation of the outside air fan 22a is performed. The visibility limit wind speed Vl indicates an upper limit value of the wind speed Vc at which water vapor is visually recognized as white fog in dry defrosting due to the refrigerant condensation temperature of the outdoor heat exchanger 22. Accordingly, by setting the target wind speed VaO in dry defrosting in accordance with the control characteristic diagram shown in FIG. 16, it is possible to promote evaporation removal of residual moisture from the outdoor heat exchanger 22 while suppressing visibility of white fog.

When determining the target wind speed of the outside air fan 22a, when the outside air temperature is lower than the low-temperature side reference temperature (for example, −15° C.), the target wind speed is set to 0.12 m/s or less. In a state where the outside air temperature is lower than the low-temperature side reference temperature, it is considered that water vapor generated in the dry defrosting mode is rapidly cooled and becomes ice particles. In this case, since it is considered that there is a low possibility of being falsely recognized as white smoke, the target wind speed VaO is set to 0.12 m/s or less.

As a method for achieving the target wind speed of 0.12 m/s when the outside air temperature is lower than the low-temperature side reference temperature, the outside air fan 22a may be stopped. In addition, the supply of air to the outdoor heat exchanger 22 may be hindered by a shutter device disposed on the ventilation path to the outdoor heat exchanger 22.

The condensation heat defrosting mode ends when the dry defrosting is completed. Regarding whether the dry defrosting is completed, completion of the dry defrosting is assumed in a state where the residual moisture on the surface of the outdoor heat exchanger 22 is evaporated and removed from the surface of the outdoor heat exchanger 22.

As shown in FIG. 17, in the condensation heat defrosting mode, the dry defrosting is executed after the melting defrosting is completed. Since the residual moisture evaporated in the dry defrosting is considered to be derived from the melting of the frost in the melt defrosting, it is considered that there is a strong correlation between the amount of energy input during the melt defrosting and the amount of energy required during the dry defrosting.

In the present embodiment, whether dry defrosting has been completed is determined by using a relationship between the energy amount input during melt defrosting and the energy amount required during dry defrosting. First, the melt moisture amount indicating the total amount of frost melted by melt defrosting is estimated. The melt moisture amount is estimated by dividing the total energy amount input to the melting of frost in melt defrosting by the melting heat of ice per unit weight.

Specifically, a value obtained by subtracting the heat dissipation loss due to the wind speed or the like from the total value of the workload of the compressor 11 and the heat absorption amount in the chiller 24 is cumulatively added to calculate the total energy amount input to the melting of frost during melt defrosting. The calculated total energy amount corresponds to an example of the input energy amount. The heat dissipation loss due to the wind speed or the like corresponds to the heat dissipation energy amount during melt defrosting.

The heat dissipation energy amount at the time of melt defrosting is identified using, for example, a control table obtained by experimentally acquiring a heat dissipation loss with respect to air from a relationship between a wind speed and an outside air temperature. In the control table, it is set so that the lower the outside air temperature, the larger the heat dissipation energy amount. In addition, in the control table, it is set so that the larger the wind speed, the larger the heat dissipation energy amount.

By dividing the calculated total energy amount by the melting heat (for example, about 334 kj/kg) of ice per unit weight, the melt moisture amount being the total amount of frost melted at the time of melt defrosting is estimated.

Subsequently, a required workload is calculated using the calculated melt moisture amount. The required workload means an energy amount required for evaporating residual moisture corresponding to a melt moisture amount in dry defrosting, and corresponds to an example of the required energy amount. Specifically, the required workload is calculated by multiplying the estimated melt moisture amount by the evaporation latent heat (for example, about 2400 kj/kg) of water per unit weight.

Next, it is determined whether the dry input workload, which is an integrated value of energy input during dry defrosting, is greater than or equal to a required workload (that is, whether or not the dry input workload is greater than or equal to the required energy amount). The dry input workload corresponds to an example of the dry input energy amount.

When the dry input energy amount is identified, the heat dissipation energy amount at the time of dry defrosting is excluded from the total value of the workload of the compressor 11 and the heat absorption amount in the chiller 24. The heat dissipation energy amount at the time of dry defrosting means heat dissipation loss heat-dissipated to air at the time of dry defrosting. Therefore, by referring to the above-described control table and using the wind speed and the outside air temperature at the time of dry defrosting, the heat dissipation energy amount at the time of dry defrosting can be identified.

When the dry input workload is equal to or higher than the required workload, it is considered that all the residual moisture generated by the melt defrosting has been evaporated at the dry defrosting, and thus it is determined that the dry defrosting has been completed. When the dry input workload is less than the required workload, it is determined that the dry defrosting is not completed.

By performing the dry defrosting completion determination in this manner, the vehicle air conditioner 1 can reliably remove residual moisture in the outdoor heat exchanger 22. In addition, by considering the heat dissipation energy amount at the time of melt defrosting and at the time of dry defrosting, determination accuracy regarding completion of removal of residual moisture can be improved. In addition, since the wind speed and the outside air temperature are used, the heat dissipation energy amount is appropriately identified according to the environment at the time of melt defrosting and at the time of dry defrosting. From this point as well, the determination accuracy regarding the completion of dry defrosting can be enhanced.

The vehicle air conditioner 1 according to the first embodiment has a heating defrosting mode in order to perform heating of the space to be air conditioned (in the vehicle interior) described above and condensation heat defrosting on the outdoor heat exchanger 22 in parallel. The heating defrosting mode in the vehicle air conditioner 1 will be described with reference to FIG. 18.

In the heating defrosting mode, in order to improve comfort by heating the space to be air conditioned (in the vehicle interior), a heating capacity in which the refrigerant temperature in the water refrigerant heat exchanger 12 is, for example, 40° C. to 70° C. is required.

On the other hand, the condensation heat defrosting in the heating defrosting mode is required to have a defrosting capacity in which the refrigerant temperature of the outdoor heat exchanger 22 is, for example, about 30° C. From the viewpoint of defrosting of the outdoor heat exchanger 22, it is considered that a higher refrigerant temperature is better. However, when the refrigerant temperature is too high, visibility of white fog caused by evaporation of moisture increases, and there is a high possibility of being falsely recognized as white smoke or the like. Therefore, the defrosting capacity in the outdoor heat exchanger 22 also needs to be controlled by the operation of the refrigeration cycle 10.

In the heating defrosting mode, the controller 70 closes the first on-off valve 16a and opens the second on-off valve 16b. The controller 70 operates the three-way valve 18 so that the refrigerant outlet of the outdoor heat exchanger 22 and the flow path on the fifth three-way joint 13e side communicate with each other and the flow path on the first check valve 21a side is closed. Furthermore, the controller 70 brings each of the heating expansion valve 20a and the cooling expansion valve 20c into a throttling state. The controller 70 brings the air-cooling expansion valve 20b into the fully closed state.

In addition, with respect to the high-temperature side heating medium circuit 30, the controller 70 causes the high-temperature side pump 32 to pressure-feed the high-temperature side heating medium with a predetermined pressure-feeding capacity. The controller 70 causes the water heater 34 of the high-temperature side heating medium circuit 30 to generate heat according to a predetermined condition to heat the high-temperature side heating medium. With respect to the low-temperature side heating medium circuit 40, the controller 70 causes the low-temperature side pump 42 to operate and to pressure-feed the low-temperature side heating medium with a predetermined pressure-feeding capacity.

Accordingly, in the refrigeration cycle 10 in the case of the heating defrosting mode, a vapor compression refrigeration cycle is configured. The refrigerant flows and circulates in the order of the compressor 11, the water refrigerant heat exchanger 12, the second on-off valve 16b, the heating expansion valve 20a, the outdoor heat exchanger 22, the three-way valve 18, the receiver 19, the cooling expansion valve 20c, the chiller 24, and the compressor 11.

With this circuit configuration, the controller 70 controls operations of various apparatuses to be controlled. For example, the refrigerant discharge capacity (that is, the rotation speed) of the compressor 11, the throttle opening degree of the heating expansion valve 20a, the throttle opening degree of the cooling expansion valve 20c, the calorific value of the water heater 34, and the like are controlled according to a heating defrosting control program to be described below. Details of the heating defrosting control program will be described below.

The condensation heat defrosting in the heating defrosting mode includes melt defrosting and dry defrosting as in the condensation heat defrosting mode described above. Therefore, at the time of dry defrosting, the wind speed Vc supplied to the outdoor heat exchanger 22 by the outside air fan 22a and the refrigerant condensation temperature in the outdoor heat exchanger 22 are set so as to belong to the target area At shown in FIG. 14, and are controlled so as to be the set target values.

Figure 18:
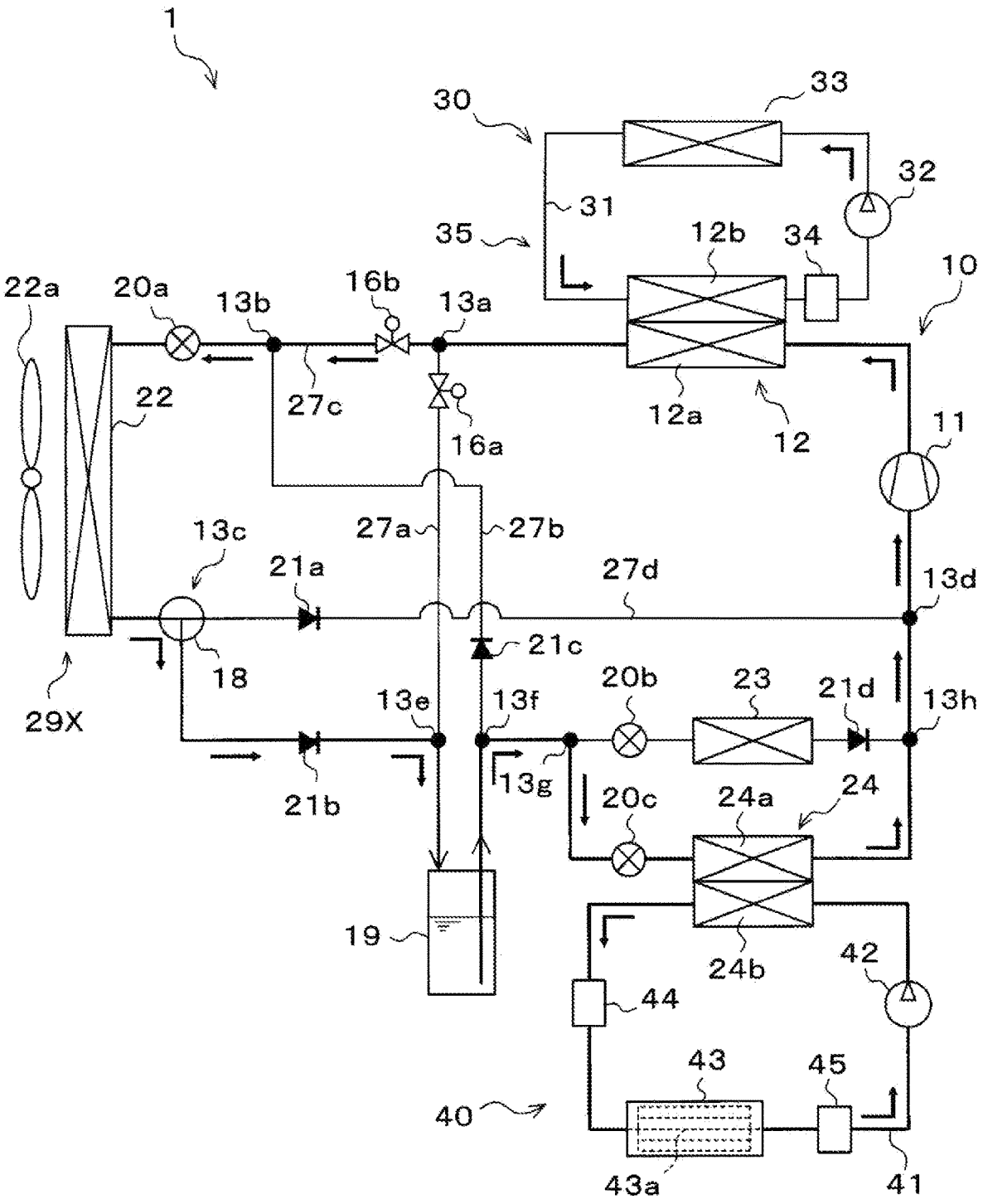
FIG. 18 is an overall configuration diagram showing an example of operation in a heating defrosting mode in the vehicle air conditioner of the first embodiment.

As shown in FIG. 18, in the refrigeration cycle 10, the high-pressure refrigerant discharged from the compressor 11 flows into the refrigerant passage 12a of the water refrigerant heat exchanger 12. The refrigerant flowing into the water refrigerant heat exchanger 12 dissipates heat to the high-temperature side heating medium flowing through the heating medium passage 12b and condenses. Accordingly, the high-temperature side heating medium is heated in the water refrigerant heat exchanger 12.

At this time, in the high-temperature side heating medium circuit 30, the high-temperature side heating medium circulates by the operation of the high-temperature side pump 32. Therefore, the high-temperature side heating medium heated by the water refrigerant heat exchanger 12 flows into the heater core 33 through the water heater 34 and the high-temperature side pump 32. The high-temperature side heating medium flowing into the heater core 33 exchanges heat with the ventilation air passing through the indoor evaporator 23. Accordingly, in the heating defrosting mode, the ventilation air blown into the vehicle interior is heated using at least the high-pressure refrigerant as a heat source.

The refrigerant flowing out of the water refrigerant heat exchanger 12 flows into the heating expansion valve 20a through the second on-off valve 16b and the outside air side passage 27c, and is decompressed into the intermediate-pressure refrigerant according to the throttle opening degree of the heating expansion valve 20a. The intermediate-pressure refrigerant decompressed by the heating expansion valve 20a flows into the outdoor heat exchanger 22.

Therefore, since the intermediate-pressure refrigerant flowing out of the heating expansion valve 20a flows into the outdoor heat exchanger 22, heat of the intermediate-pressure refrigerant can be applied to the outdoor heat exchanger 22. That is, in the heating defrosting mode, the condensation heat defrosting of the outdoor heat exchanger 22 using the heat of the intermediate-pressure refrigerant can be performed.

The refrigerant flowing out of the outdoor heat exchanger 22 flows into the receiver 19 through the three-way valve 18, the second check valve 21b, and the fifth three-way joint 13e, and is separated into gas and liquid. A part of the liquid-phase refrigerant separated in the receiver 19 flows into the cooling expansion valve 20c through the sixth three-way joint 13f and the seventh three-way joint 13g, is decompressed, and flows into the refrigerant passage 24a of the chiller 24.

Accordingly, the low-pressure refrigerant flowing into chiller 24 absorbs heat from the low-temperature side heating medium that has absorbed heat of the battery 75 and evaporates. The refrigerant flowing out of the chiller 24 is guided to the suction port of the compressor 11, compressed again, and discharged.

In the heating defrosting mode in this case, heat generated in the battery 75 absorbed by the chiller 24 can be pumped up in the refrigeration cycle 10 and used for heating of the space to be air conditioned and condensation heat defrosting of the outdoor heat exchanger 22.

Next, control contents in the heating defrosting mode in the vehicle air conditioner 1 will be described with reference to FIGS. 19 to 21. The heating defrosting operation in the vehicle air conditioner 1 is implemented by the controller 70 executing the heating defrosting control program stored in the ROM. The heating defrosting control program is executed simultaneously when the vehicle air conditioner 1 is powered on.

As described above, in the heating defrosting mode, the condensation heat defrosting of the outdoor heat exchanger 22 is performed in parallel with the heating of the space to be air conditioned. Since the condensation heat defrosting includes melt defrosting and dry defrosting, a state in which heating of the space to be air conditioned and melt defrosting of the outdoor heat exchanger 22 are performed and a state in which heating of the space to be air conditioned and dry defrosting of the outdoor heat exchanger 22 are performed occur.

Figure 19:
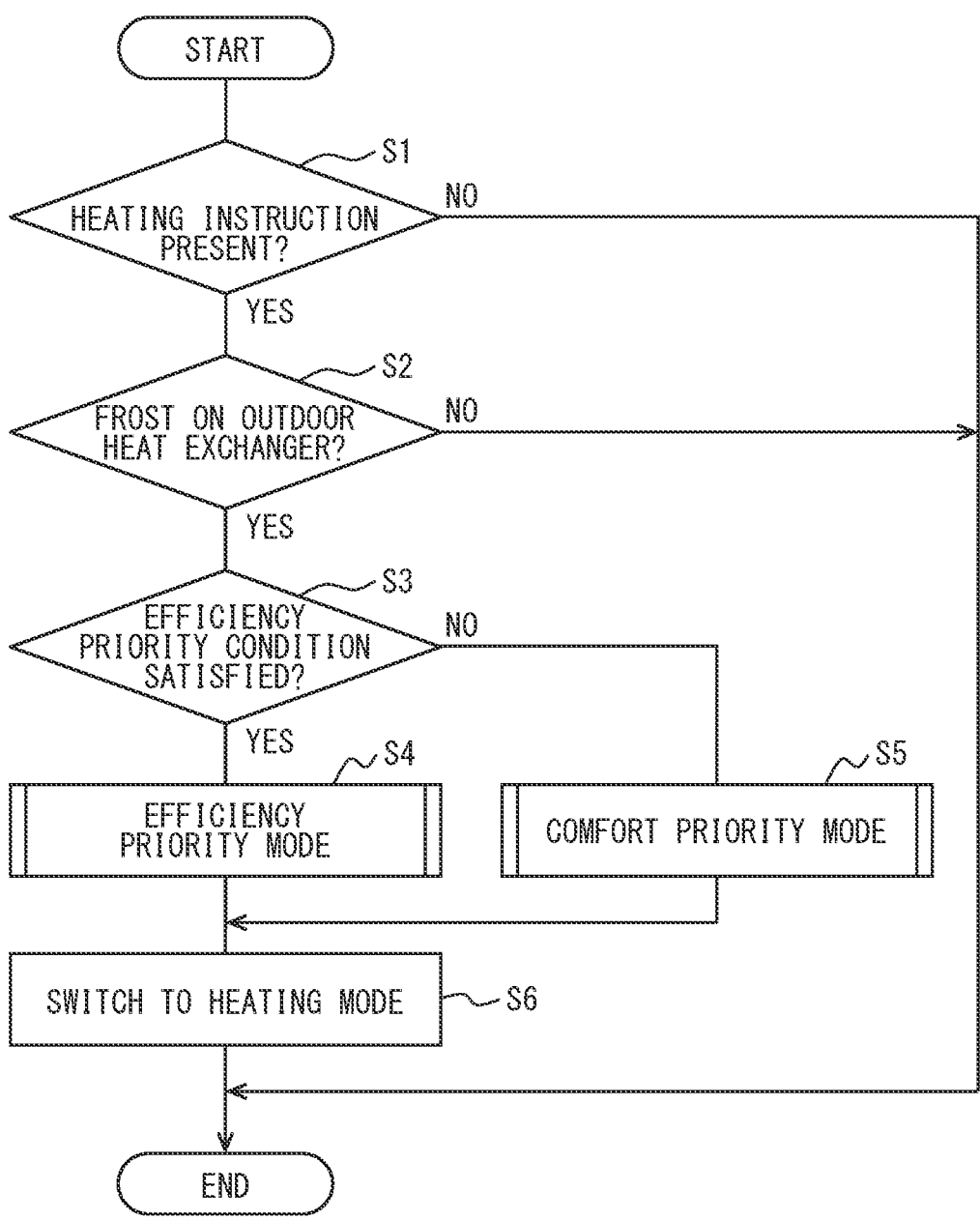
FIG. 19 is a flowchart showing control contents in a heating defrosting mode in the vehicle air conditioner.

As shown in FIG. 19, first, in step S1, it is determined whether or not there is a heating instruction regarding the operation of the vehicle air conditioner 1. The heating instruction is issued when heating of the space to be air conditioned is requested based on detection signals of the various control sensors and an operation signal of the operation panel in accordance with execution of the air conditioning control program. When the heating instruction is issued, the processing proceeds to step S2. On the other hand, when there is no heating instruction, the heating defrosting control program is ended. In this case, an air-conditioning operation according to another operation mode and a cooling operation of the battery 75 are performed.

In step S2, it is determined whether frost is formed on the outdoor heat exchanger 22. The determination processing in step S2 is determined depending on whether the frost formation amount of the frost adhering to the outdoor heat exchanger 22 exceeds a predetermined reference. When the frost formation amount exceeds the reference and it is determined that frost is formed on the outdoor heat exchanger 22, the processing proceeds to step S3. When it is determined that no frost is formed on the outdoor heat exchanger 22, the heating defrosting control program is ended. In this case, the vehicle air conditioner 1 performs the heating operation.

When the processing proceeds to step S3, the operation mode of the vehicle air conditioner 1 is set to the heating defrosting mode. In the heating defrosting mode, the heating of the space to be air conditioned and the condensation heat defrosting of the outdoor heat exchanger 22 are performed in parallel, but the capacity of the refrigeration cycle 10 is considered to be insufficient when both are performed in parallel.

Therefore, the vehicle air conditioner 1 has, as the heating defrosting mode, an efficiency priority mode in which the condensation heat defrosting of the outdoor heat exchanger 22 is prioritized over the heating of the space to be air conditioned, and a comfort priority mode in which the heating of the space to be air conditioned is prioritized over the condensation heat defrosting of the outdoor heat exchanger 22.

In step S3, processing of determining which of heating of the space to be air conditioned and condensation heat defrosting of the outdoor heat exchanger 22 is preferentially executed is performed. Specifically, it is determined whether or not the efficiency priority condition, which is assumed to be more suitable for the efficiency priority mode than the comfort priority mode, is satisfied by the detection signals of the various control sensors and the operation signal of the operation panel.

As an example of the efficiency priority condition, there is a case where an operation signal to the effect that the efficiency priority mode is selected is output as the operation signal of the operation panel 71. That is, when the efficiency priority mode is selected by the user's operation, it is determined that the efficiency priority condition is satisfied.

In addition, examples of the efficiency priority condition include a case where it is determined from detection signals of various control sensors that the heating load of the space to be air conditioned is smaller than the reference. When the heating load is smaller than the reference, it is determined that the efficiency priority condition is satisfied.

When the efficiency priority condition is satisfied, the processing proceeds to step S4 to perform control related to the efficiency priority mode of the heating dehumidification mode. Control contents related to the efficiency priority mode in step S4 will be described below with reference to the drawings. When the control related to the efficiency priority mode of the heating dehumidification mode is ended, the processing proceeds to step S6.

On the other hand, when the efficiency priority condition is not satisfied, the processing proceeds to step S5 to perform control related to the comfort priority mode of the heating dehumidification mode. Control contents related to the comfort priority mode in step S5 will be described below with reference to the drawings. When the control related to the comfort priority mode of the heating dehumidification mode is ended, the processing proceeds to step S6.

In step S6, since the condensation heat defrosting of the outdoor heat exchanger 22 is completed when steps S4 and S5 are ended, the operation mode of the vehicle air conditioner 1 is switched from the heating defrosting mode to the heating mode. After switching to the heating mode, the heating defrosting control program is ended.

Next, control contents related to the efficiency priority mode of the heating defrosting mode will be described with reference to FIG. 20. When the processing proceeds to step S4 to start the efficiency priority mode, as shown in FIG. 20, first, in step 11, defrosting capacity control is performed.

In the defrosting capacity control in step S11, the refrigerant discharge capacity (rotation speed) of the compressor 11 is controlled so that the refrigerant condensation temperature in the outdoor heat exchanger 22 becomes the target condensation temperature. At the time of dry defrosting in the heating defrosting mode, the target condensation temperature TCO is set according to the control characteristic diagram shown in FIG. 15 as described in the condensation heat defrosting mode.

A strong correlation is recognized between the temperature of the refrigerant and the pressure of the refrigerant in the refrigeration cycle 10. Therefore, the target refrigerant pressure corresponding to the target condensation temperature TCO can be identified, and processing can also be performed using the refrigerant pressure in the outdoor heat exchanger 22 and the target refrigerant pressure.

That is, when the refrigerant condensation temperature of the outdoor heat exchanger 22 is higher than the target condensation temperature, the rotation speed of the compressor 11 is controlled to be lower than that of the current time point, and when the refrigerant condensation temperature is lower than the target condensation temperature, the rotation speed of the compressor 11 is controlled to be higher than that of the current time point. Accordingly, the heat dissipation amount of the refrigerant in the outdoor heat exchanger 22 can be controlled to a state suitable for condensation heat defrosting.

In step S12, it is determined whether the refrigerant condensation temperature of the outdoor heat exchanger 22 is lower than the target condensation temperature. That is, it is determined whether the capacity generated in the refrigeration cycle 10 is insufficient for the condensation heat defrosting of the outdoor heat exchanger 22. When the refrigerant condensation temperature is lower than the target condensation temperature, the processing proceeds to step S14. When the refrigerant condensation temperature is not lower than the target condensation temperature, the processing proceeds to step S13.

In step S13, since predetermined capacity is secured for the condensation heat defrosting of the outdoor heat exchanger 22, heating capacity control is performed. In the heating capacity control in step S13, the opening degree of the heating expansion valve 20a is controlled so that the blow-out air temperature TAV becomes the target blow-out temperature TAO.

The refrigerant temperature corresponding to the target blow-out temperature TAO can be identified, and further, a strong correlation is recognized between the temperature of the refrigerant and the pressure of the refrigerant in the refrigeration cycle 10. Therefore, the target refrigerant pressure corresponding to the target blow-out temperature TAO can be identified, and the processing can also be performed using the refrigerant pressure in the water refrigerant heat exchanger 12 and the target refrigerant pressure corresponding to the blow-out air temperature TAV.

That is, when the blow-out air temperature TAV is higher than the target blow-out temperature TAO, the opening degree of the heating expansion valve 20a is controlled to be larger than that of the current time point, and when the blow-out air temperature TAV is lower than the target blow-out temperature TAO, the opening degree of the heating expansion valve 20a is controlled to be smaller than that of the current time point.

Accordingly, the heat dissipation amount in the water refrigerant heat exchanger 12 can be controlled to any value lower than the heat dissipation amount in the outdoor heat exchanger 22. That is, it is possible to create different refrigerant temperatures of a refrigerant temperature required for condensation heat defrosting of the outdoor heat exchanger 22 and a refrigerant temperature required for heating in the vehicle interior, and to appropriately control each of the refrigerant temperatures.

In step S14, since it is determined in the determination processing in step S12 that the condensation heat defrosting of the outdoor heat exchanger 22 is insufficient for the predetermined capacity, the defrosting capacity improvement control is performed. In the defrosting capacity improvement control in step S14, the opening degree of the heating expansion valve 20a is set to the fully opened state to decrease the temperature of the refrigerant flowing through the water refrigerant heat exchanger 12 and suppress the heat dissipation amount, thereby increasing the heat dissipation amount in the outdoor heat exchanger 22.

Accordingly, even when the refrigerant condensation temperature cannot be adjusted to be higher than the target condensation temperature only by the operation control of the compressor 11, a state in which the refrigerant condensation temperature is higher than the target condensation temperature can be created by the opening degree control of the heating expansion valve 20a.

When the processing proceeds to step S15, it is determined whether the blow-out air temperature TAV is lower than the target blow-out temperature TAO. That is, it is determined whether the heat dissipation amount in the water refrigerant heat exchanger 12 is insufficient for the required heating capacity. When the blow-out air temperature TAV is lower than the target blow-out temperature TAO, the processing proceeds to step S16. On the other hand, when the blow-out air temperature TAV is not lower than the target blow-out temperature TAO, the processing proceeds to step S17.

In step S16, since the blow-out air temperature TAV is lower than the target blow-out temperature TAO, and the heating capacity of the refrigeration cycle 10 is insufficient for the target, the auxiliary heating control is executed. In the auxiliary heating control, the calorific value of the water heater 34 is controlled so that the blow-out air temperature TAV becomes the target blow-out temperature TAO. That is, by compensating the shortage of the heating capacity by the refrigeration cycle 10 for the target value with the heating capacity of the water heater 34, the comfort of the space to be air conditioned is secured.

In step S17, the liquid back prevention control is performed. In the liquid back prevention control, the opening degree of the cooling expansion valve 20c is controlled so that liquid back in which the refrigerant in the liquid phase state is supplied to the suction port of the compressor 11 does not occur. The opening degree of the cooling expansion valve 20c is controlled so that the degree of superheat of the refrigerant on the suction port side of the compressor 11 becomes a predetermined reference value. Accordingly, it is possible to prevent malfunction of the compressor 11 due to inflow of the liquid-phase refrigerant from the suction port of the compressor 11.

In step S18, it is determined whether the condensation heat defrosting of the outdoor heat exchanger 22 has been completed. As described above, the condensation heat defrosting is performed in the order of the melt defrosting and the dry defrosting. Therefore, in step S18, it is determined whether or not moisture generated by melt defrosting has been evaporated and removed from the outdoor heat exchanger 22 by dry defrosting. When the condensation heat defrosting is completed, the control related to the efficiency priority mode of the heating defrosting mode is ended. When the condensation heat defrosting is not completed, the processing returns to step S11, and the control related to the efficiency priority mode is started again.

Figure 20:
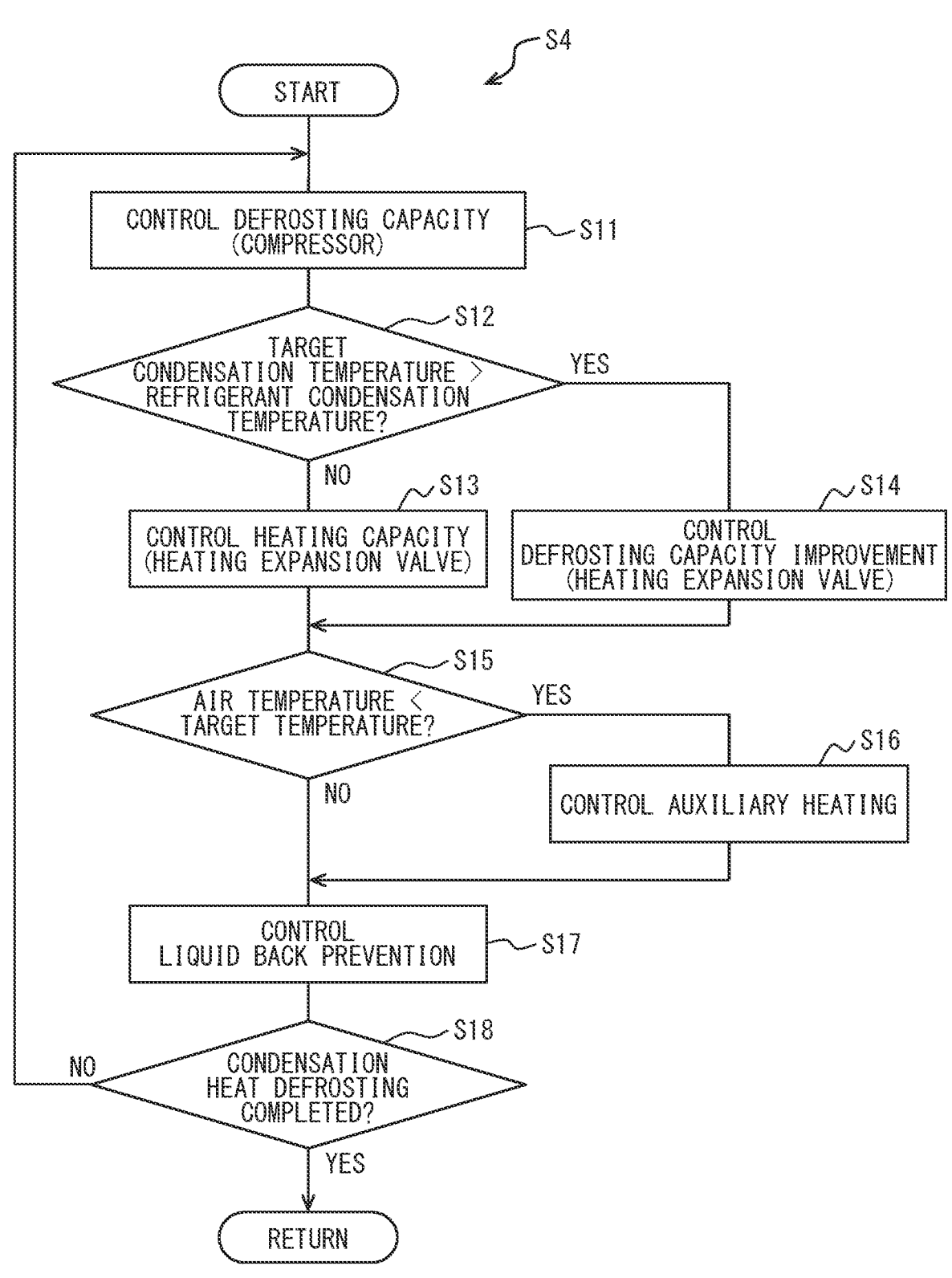
FIG. 20 is a flowchart showing control contents in an efficiency priority mode in a heating defrosting mode.

As shown in FIG. 20, in the efficiency priority mode, heating capacity required for condensation heat defrosting of the outdoor heat exchanger 22 is achieved by controlling refrigerant discharge capacity of the compressor 11 in step S11. In step S13, the heating capacity required for heating of the space to be air conditioned is achieved by controlling the opening degree of the heating expansion valve 20a.

Accordingly, with the cycle configuration in the heating defrosting mode, each of the defrosting capacity required for condensation heat defrosting of the outdoor heat exchanger 22 and the heating capacity required for heating of the space to be air conditioned can be controlled, and different refrigerant condensation temperatures can be achieved.

In addition, in the efficiency priority mode, when the refrigerant condensation temperature is lower than the target condensation temperature, the defrosting capacity improvement control is performed to adjust the opening degree of the heating expansion valve 20a to the fully open state. Accordingly, since the refrigeration cycle 10 operates so as to satisfy the heat dissipation amount required for condensation heat defrosting of the outdoor heat exchanger 22 in preference to securing the heat dissipation amount required for heating of the space to be air conditioned, condensation heat defrosting can be achieved in preference to heating of the space to be air conditioned.

Furthermore, in the efficiency priority mode of the heating defrosting mode, when the heating capacity of the space to be air conditioned due to the operation of the refrigeration cycle 10 is insufficient (step S15), the high-temperature side heating medium is heated by the water heater 34 in the auxiliary heating control.

Accordingly, in the heating defrosting mode, even when the heating capacity by the refrigeration cycle 10 is insufficient for heating of the space to be air conditioned, compensation can be made using the water heater 34 that is a heat source different from the refrigeration cycle 10, and comfort can be secured.

Next, control contents related to the comfort priority mode of the heating defrosting mode will be described with reference to FIG. 21. When the processing proceeds to step S5 to start the comfort priority mode, as shown in FIG. 21, first, in step 21, heating capacity control is performed.

In the heating capacity control in step S21, the refrigerant discharge capacity (rotation speed) of the compressor 11 is controlled so that the blow-out air temperature TAV becomes equal to the target blow-out temperature TAO. The target blow-out temperature TAO in the heating defrosting mode is determined similarly to the heating mode.

That is, when the blow-out air temperature TAV is higher than the target blow-out temperature TAO, the rotation speed of the compressor 11 is controlled to be lower than that of the current time point, and when the blow-out air temperature TAV is lower than the target blow-out temperature TAO, the rotation speed of the compressor 11 is controlled to be higher than that of the current time point. Accordingly, it is possible to secure a heat dissipation amount in the water refrigerant heat exchanger 12 required for heating of the space to be air conditioned, and it is possible to heat the space to be air conditioned in an appropriate mode.

In step S22, it is determined whether the blow-out air temperature TAV is lower than the target blow-out temperature TAO. That is, it is determined whether the heat dissipation amount in the water refrigerant heat exchanger 12 is insufficient for the required heating capacity. When the blow-out air temperature TAV is lower than the target blow-out temperature TAO, the processing proceeds to step S23. On the other hand, when the blow-out air temperature TAV is not lower than the target blow-out temperature TAO, the processing proceeds to step S24.

In step S23, since the blow-out air temperature TAV is lower than the target blow-out temperature TAO, and the heating capacity of the refrigeration cycle 10 is insufficient for the target, the auxiliary heating control is executed. In the auxiliary heating control, the calorific value of the water heater 34 is controlled so that the blow-out air temperature TAV becomes the target blow-out temperature TAO. That is, by compensating the shortage of the heating capacity by the refrigeration cycle 10 for the target value with the heating capacity of the water heater 34, the comfort of the space to be air conditioned is secured.

When the processing proceeds to step S24, the defrosting capacity control in the heating defrosting mode is performed. In the defrosting capacity control in step S24, the opening degree of the heating expansion valve 20a is controlled so that the refrigerant condensation temperature in the outdoor heat exchanger 22 becomes the target condensation temperature. At the time of dry defrosting in the heating defrosting mode, the target condensation temperature TCO is set according to the control characteristic diagram shown in FIG. 15 as described in the condensation heat defrosting mode.

That is, when the refrigerant condensation temperature of the outdoor heat exchanger 22 is higher than the target condensation temperature, the opening degree of the heating expansion valve 20a is controlled to be lower than that of the current time point, and when the refrigerant condensation temperature is lower than the target condensation temperature, the opening degree of the heating expansion valve 20*a* is controlled to be higher than that of the current time point. Accordingly, the heat dissipation amount of the refrigerant in the outdoor heat exchanger 22 can be controlled to a state suitable for condensation heat defrosting.

In step S25, it is determined whether the refrigerant condensation temperature of the outdoor heat exchanger 22 is higher than the target condensation temperature. Here, in the condensation heat defrosting of the outdoor heat exchanger 22, since the target condensation temperature is set to belong to within the target area At shown in FIG. 14, a state where the temperature is higher than the target condensation temperature is considered to be a state where there is a high possibility that moisture evaporated by the condensation heat defrosting is visually recognized as white fog.

That is, in step S25, it is determined whether the evaporated moisture is highly likely to be visually recognized as white fog from the viewpoint of the heat amount applied by the condensation heat defrosting. When the refrigerant condensation temperature is higher than the target condensation temperature, the processing proceeds to step S26. When the refrigerant condensation temperature is not higher than the target condensation temperature, the processing proceeds to step S27.

In step S26, since it is determined that the evaporated moisture is highly likely to be visually recognized as white fog from the viewpoint of the heat amount applied by the condensation heat defrosting, the condensation heat defrosting of the outdoor heat exchanger 22 in the heating defrosting mode is stopped. Accordingly, it is possible to prevent white fog derived from moisture evaporated by condensation heat defrosting from being falsely recognized as white smoke. When the processing in step S26 is ended, the control related to the comfort priority mode of the heating defrosting mode is ended. As a result, in step S6 in FIG. 19, the operation mode of the vehicle air conditioner 1 is switched to the heating mode.

In step S27, the liquid back prevention control is performed. In the liquid back prevention control in step S27, similarly to step S17, the opening degree of the cooling expansion valve 20*c* is controlled so that liquid back in which the refrigerant in the liquid phase state is supplied to the suction port of the compressor 11 does not occur. Accordingly, it is possible to prevent malfunction of the compressor 11 due to inflow of the liquid-phase refrigerant from the suction port of the compressor 11.

In step S28, it is determined whether the condensation heat defrosting of the outdoor heat exchanger 22 has been completed. The contents of the determination processing in step S28 are similar to those in step S17. When the condensation heat defrosting is completed, the control related to the comfort priority mode of the heating defrosting mode is ended. When the condensation heat defrosting is not completed, the processing returns to step S21, and the control related to the comfort priority mode is started again.

Figure 21:
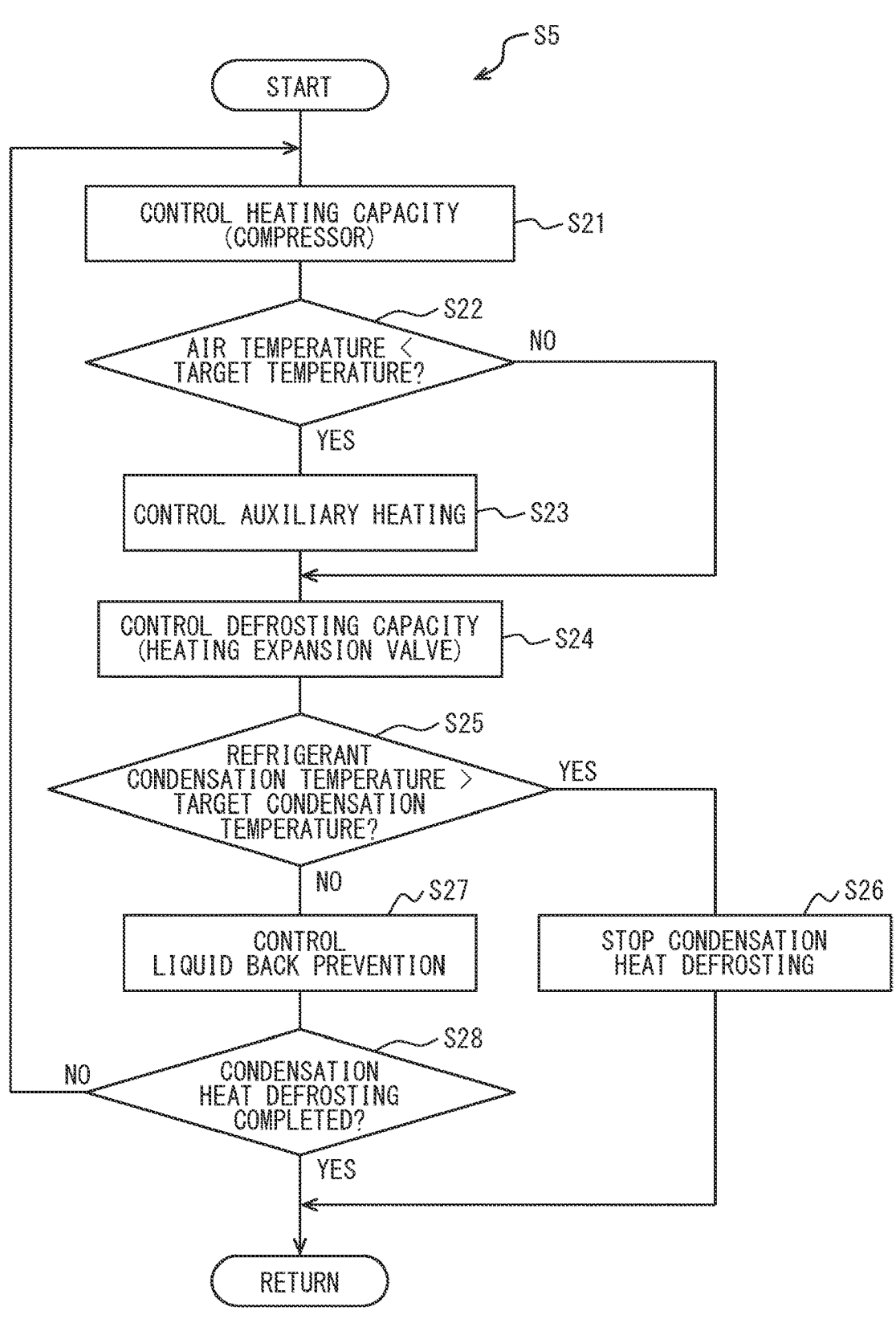
FIG. 21 is a flowchart showing control contents in a comfort priority mode in a heating defrosting mode.

As shown in FIG. 21, in the comfort priority mode, the heating capacity required for heating of the space to be air conditioned is achieved by controlling the refrigerant discharge capacity of the compressor 11 in step S21. In step S24, defrosting capacity required for condensation heat defrosting of the outdoor heat exchanger 22 is achieved by controlling the opening degree of the heating expansion valve 20*a*.

Accordingly, with the cycle configuration in the heating defrosting mode, each of the defrosting capacity required for condensation heat defrosting of the outdoor heat exchanger 22 and the heating capacity required for heating of the space to be air conditioned can be controlled, and different refrigerant condensation temperatures can be achieved.

In addition, as a result of the determination processing in step S25, when it is determined that the evaporated moisture is highly likely to be visually recognized as white fog from the viewpoint of the heat amount applied by the condensation heat defrosting, the condensation heat defrosting in the heating defrosting mode is stopped and the mode is switched to the heating mode. Accordingly, it is possible to prevent the water vapor generated by the condensation heat defrosting from being falsely recognized as white smoke.

In the comfort priority mode, heating of the space to be air conditioned is continuously performed as described above, but the condensation heat defrosting is stopped when conditions such as step S25 are satisfied. That is, in the comfort priority mode, the heating of the space to be air conditioned can be preferentially performed over the condensation heat defrosting of the outdoor heat exchanger 22.

Furthermore, in the comfort priority mode of the heating defrosting mode, when the heating capacity of the space to be air conditioned due to the operation of the refrigeration cycle 10 is insufficient (step S22), the high-temperature side heating medium is heated by the water heater 34 in the auxiliary heating control.

Accordingly, in the heating defrosting mode, even when the heating capacity by the refrigeration cycle 10 is insufficient for heating of the space to be air conditioned, compensation can be made using the water heater 34 that is a heat source different from the refrigeration cycle 10, and comfort can be secured.

As described above, the vehicle air conditioner 1 according to the first embodiment can operate in the heating defrosting mode in which the condensation heat defrosting of the outdoor heat exchanger 22 and the heating of the space to be air conditioned are performed in parallel using the refrigeration cycle 10 and the controller 70.

In addition, in the heating defrosting mode, when the temperature or pressure of the refrigerant required in the water refrigerant heat exchanger 12 is different from the temperature or pressure of the refrigerant required in the outdoor heat exchanger 22, two different refrigerant temperatures or pressures are achieved by the operation control of the compressor 11 and the operation control of the heating expansion valve 20*a*.

That is, the compression control unit 70*d* can control the operation of the compressor 11 and achieve the refrigerant temperature or pressure required for any one of the water refrigerant heat exchanger 12 and the outdoor heat exchanger 22. Furthermore, the decompression control unit 70*e* can control the operation of the heating expansion valve 20*a* and achieve the refrigerant temperature or pressure required for any one of the water refrigerant heat exchanger 12 and the outdoor heat exchanger 22.

According to the vehicle air conditioner 1, in the heating defrosting mode, it is possible to control each of the heat dissipation amount in the outdoor heat exchanger 22 related to the condensation heat defrosting and the heat dissipation amount in the water refrigerant heat exchanger 12 related to the heating, and it is possible to achieve both of them in an appropriate mode.

In the condensation heat defrosting in the vehicle air conditioner 1, dry defrosting that evaporates moisture generated by the melt defrosting using heat absorbed into the refrigerant is executed. By performing dry defrosting by condensation heat defrosting, re-freezing of moisture generated by melting of frost can be suppressed, and deterioration in heat exchange performance of the outdoor heat exchanger 22 and deterioration in heating performance of the vehicle air conditioner 1 accompanying re-freezing can be prevented.

In addition, in the dry defrosting of the condensation heat defrosting, the target condensation temperature TCO required in the outdoor heat exchanger 22 is set to be positioned within the target area At in FIG. 14, and in the dry defrosting, the refrigerant condensation temperature in the outdoor heat exchanger 22 is controlled to approach the target condensation temperature. Accordingly, at the time of dry defrosting, the possibility that water vapor derived from melted moisture is visually recognized as white fog can be reduced, and it is possible to prevent the water vapor from being falsely recognized as white smoke or the like.

In the dry defrosting of the condensation heat defrosting, the wind speed of the outside air blown to the outdoor heat exchanger 22 by the outside air fan 22a is set to be positioned within the target area At in FIG. 14, and in the dry defrosting, the operation of the outside air fan 22a is controlled so as to have the set wind speed. Accordingly, at the time of dry defrosting, the possibility that water vapor derived from melted moisture is visually recognized as white fog can be reduced, and it is possible to prevent the water vapor from being falsely recognized as white smoke or the like.

As shown in FIG. 20, in the efficiency priority mode of the heating defrosting mode, the operation of the compressor 11 is controlled so that the refrigerant condensation temperature becomes the target condensation temperature TCO by the defrosting capacity control in step S11. In the heating capacity control in step S13, the opening degree control of the heating expansion valve 20a is performed so that the blow-out air temperature TAV becomes the target blow-out temperature TAO.

Accordingly, with the cycle configuration in the heating defrosting mode, each of the defrosting capacity required for condensation heat defrosting of the outdoor heat exchanger 22 and the heating capacity required for heating of the space to be air conditioned can be controlled, and different refrigerant condensation temperatures can be achieved.

In addition, in the efficiency priority mode, when the refrigerant condensation temperature is lower than the target condensation temperature, the defrosting capacity improvement control is performed to adjust the opening degree of the heating expansion valve 20a to the fully open state. Accordingly, since the refrigeration cycle 10 operates so as to satisfy the heat dissipation amount required for condensation heat defrosting of the outdoor heat exchanger 22 in preference to securing the heat dissipation amount required for heating of the space to be air conditioned, condensation heat defrosting can be achieved in preference to heating of the space to be air conditioned.

As shown in FIG. 21, in the comfort priority mode of the heating defrosting mode, the heating capacity required for heating of the space to be air conditioned is achieved by controlling the refrigerant discharge capacity of the compressor 11 in step S21. In step S24, defrosting capacity required for condensation heat defrosting of the outdoor heat exchanger 22 is achieved by controlling the opening degree of the heating expansion valve 20a.

Accordingly, with the cycle configuration in the heating defrosting mode, each of the defrosting capacity required for condensation heat defrosting of the outdoor heat exchanger 22 and the heating capacity required for heating of the space to be air conditioned can be controlled, and different refrigerant condensation temperatures can be achieved.

Furthermore, in the heating defrosting mode, when the heating capacity of the space to be air conditioned due to the operation of the refrigeration cycle 10 is insufficient (steps S15 and S22), the high-temperature side heating medium is heated by the water heater 34 in the auxiliary heating control (steps S16 and S23).

Accordingly, in the heating defrosting mode, even when the heating capacity by the refrigeration cycle 10 is insufficient for heating of the space to be air conditioned, compensation can be made using the water heater 34 that is a heat source different from the refrigeration cycle 10, and comfort can be secured.

In addition, as a result of the determination processing in step S25, when it is determined that the evaporated moisture is highly likely to be visually recognized as white fog from the viewpoint of the heat amount applied by the condensation heat defrosting, the condensation heat defrosting in the heating defrosting mode is stopped and the mode is switched to the heating mode. Accordingly, it is possible to prevent the water vapor generated by the condensation heat defrosting from being falsely recognized as white smoke.

In the comfort priority mode, heating of the space to be air conditioned is continuously performed as described above, but the condensation heat defrosting is stopped when conditions such as step S25 are satisfied. That is, in the comfort priority mode, the heating of the space to be air conditioned can be preferentially performed over the condensation heat defrosting of the outdoor heat exchanger 22.

Furthermore, in the comfort priority mode of the heating defrosting mode, when the heating capacity of the space to be air conditioned due to the operation of the refrigeration cycle 10 is insufficient (step S22), the high-temperature side heating medium is heated by the water heater 34 in the auxiliary heating control.

Accordingly, in the heating defrosting mode, even when the heating capacity by the refrigeration cycle 10 is insufficient for heating of the space to be air conditioned, compensation can be made using the water heater 34 that is a heat source different from the refrigeration cycle 10, and comfort can be secured.

In addition, as shown in FIG. 19, any one of the efficiency priority mode and the comfort priority mode in the heating dehumidification mode is set based on the determination result as to whether the efficiency priority condition is satisfied in step S3. Whether to satisfy the efficiency priority condition is determined by an operation instruction by the user, an operating environment surrounding the vehicle air conditioner 1, and the like. That is, according to the vehicle air conditioner 1, the heating defrosting mode can be achieved in a mode according to the intention of the user or the surrounding environment of the vehicle air conditioner 1.

Second Embodiment

Next, a second embodiment different from the above-described embodiment will be described with reference to FIGS. 22 and 23. In the second embodiment, a configuration of the heating unit 35, a device adopted as the auxiliary heating device, and the like are different from those of the above-described embodiment. Other basic configurations and the like are the same as those of the above-described embodiment, and thus repeated description thereof will be omitted.

First, the heating unit 35 of the vehicle air conditioner 1 according to the second embodiment includes an indoor condenser 12X. The heating unit 35 according to the first embodiment includes a water refrigerant heat exchanger 12 and a high-temperature side heating medium circuit 30.

Figure 22:
FIG. 22 is an overall configuration diagram of a vehicle air conditioner according to a second embodiment.

As shown in FIG. 22, the indoor condenser 12X is disposed between a discharge port of the compressor 11 and an inflow port of the first three-way joint 13a, and is a condenser that condenses the high-pressure refrigerant discharged from the compressor 11. As shown in FIG. 23, the indoor condenser 12X is disposed at the position of the heater core 33 in the first embodiment in the casing 61 of the indoor air conditioning unit 60.

Accordingly, the indoor condenser 12X can exchange heat between the high-pressure refrigerant discharged from the compressor 11 and the ventilation air having passed through the indoor evaporator 23 to condense the high-pressure refrigerant, and heat the ventilation air. That is, the indoor condenser 12X corresponds to an example of a heating heat exchanger.

Figure 23:
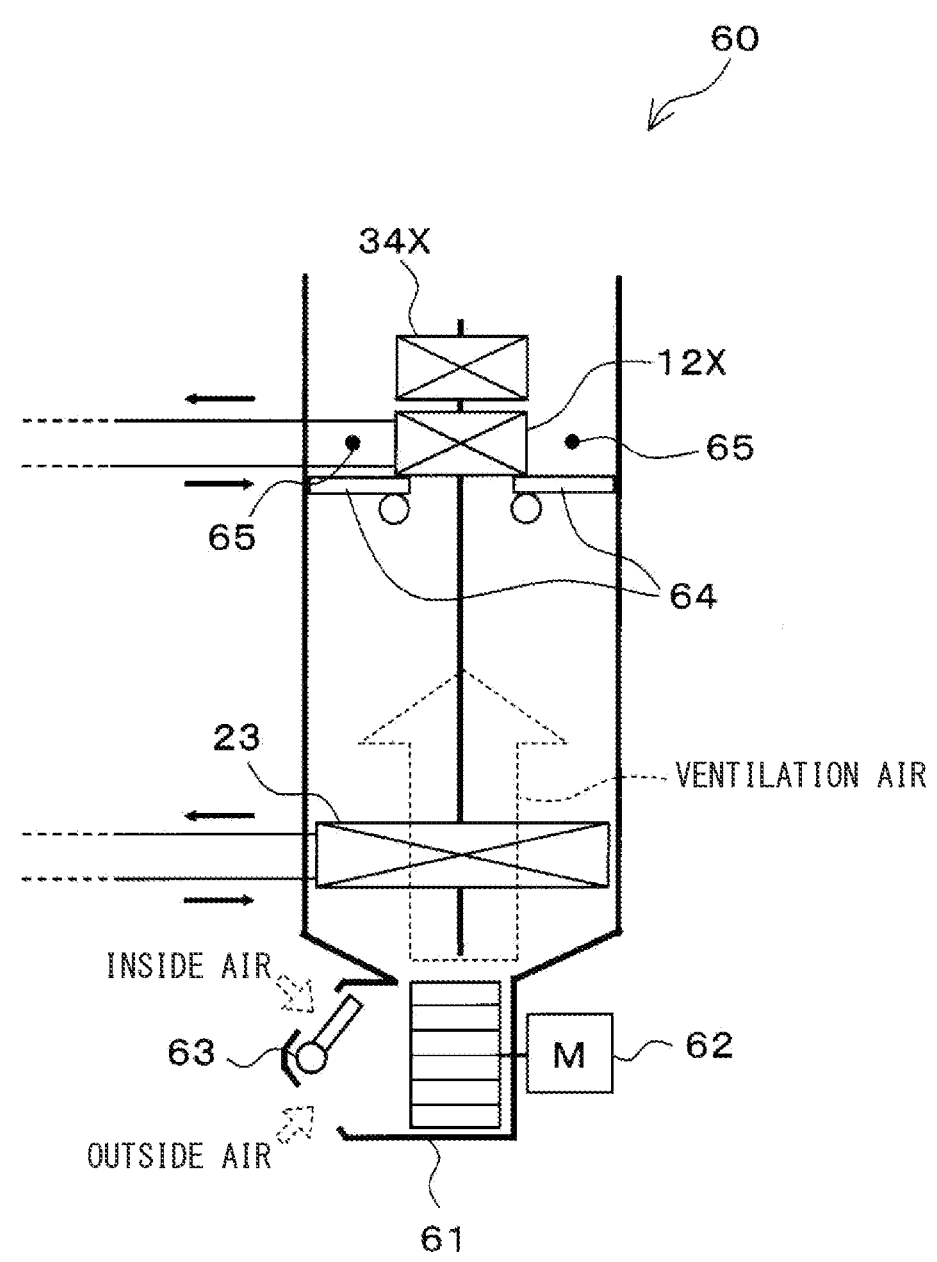
FIG. 23 is a configuration diagram of an indoor air conditioning unit in the second embodiment.

As shown in FIG. 23, the air heater 34X is disposed on the ventilation air flow downstream side with respect to the indoor condenser 12X inside the casing 61 of the indoor air conditioning unit 60. The air heater 34X is configured to be able to dissipate heat to the ventilation air having passed through the indoor condenser 12X, and heats the ventilation air.

As the air heater 34X, a PTC heater having a PTC element (that is, the positive character thermistor) can be adopted. The calorific value of the air heater 34X is optionally controlled by the control voltage output from the controller 70. The air heater 34X corresponds to an example of an auxiliary heating device.

As shown in FIG. 22, the vehicle air conditioner 1 according to the second embodiment has the same configuration as that of the first embodiment described above except for the configuration of the heating unit 35 and the arrangement of the air heater 34X. Therefore, repeated description of the overview of the condensation heat defrosting and of control contents related to the heating defrosting mode will be omitted.

Accordingly, the vehicle air conditioner 1 according to the second embodiment can achieve, in the heating defrosting mode, both the condensation heat defrosting of the outdoor heat exchanger 22 and heating in the vehicle interior even when the configuration of the heating unit 35 is changed from that of the first embodiment. The compression control unit 70d and the decompression control unit 70e can create two different refrigerant temperatures related to the condensation heat defrosting of the outdoor heat exchanger 22 and heating in the vehicle interior, and control each of the two.

As described above, according to the vehicle air conditioner 1 according to the second embodiment, even when the configuration or the like of the heating unit 35 is changed, the same effect as that of the above-described embodiment can be obtained from the same configuration as that of the above-described embodiment.

Third Embodiment

Next, a third embodiment different from the above-described embodiments will be described with reference to FIGS. 24 to 27. In the above-described embodiments, the cycle configuration of the refrigeration cycle 10 is what is called a receiver cycle, but the refrigeration cycle 10 in the third embodiment is different in that it is configured as an accumulator cycle. In addition, in FIGS. 24 to 27, the same or equivalent parts as those of the above-described embodiments are denoted by the same reference numerals. The same applies to the following drawings.

Figure 24:
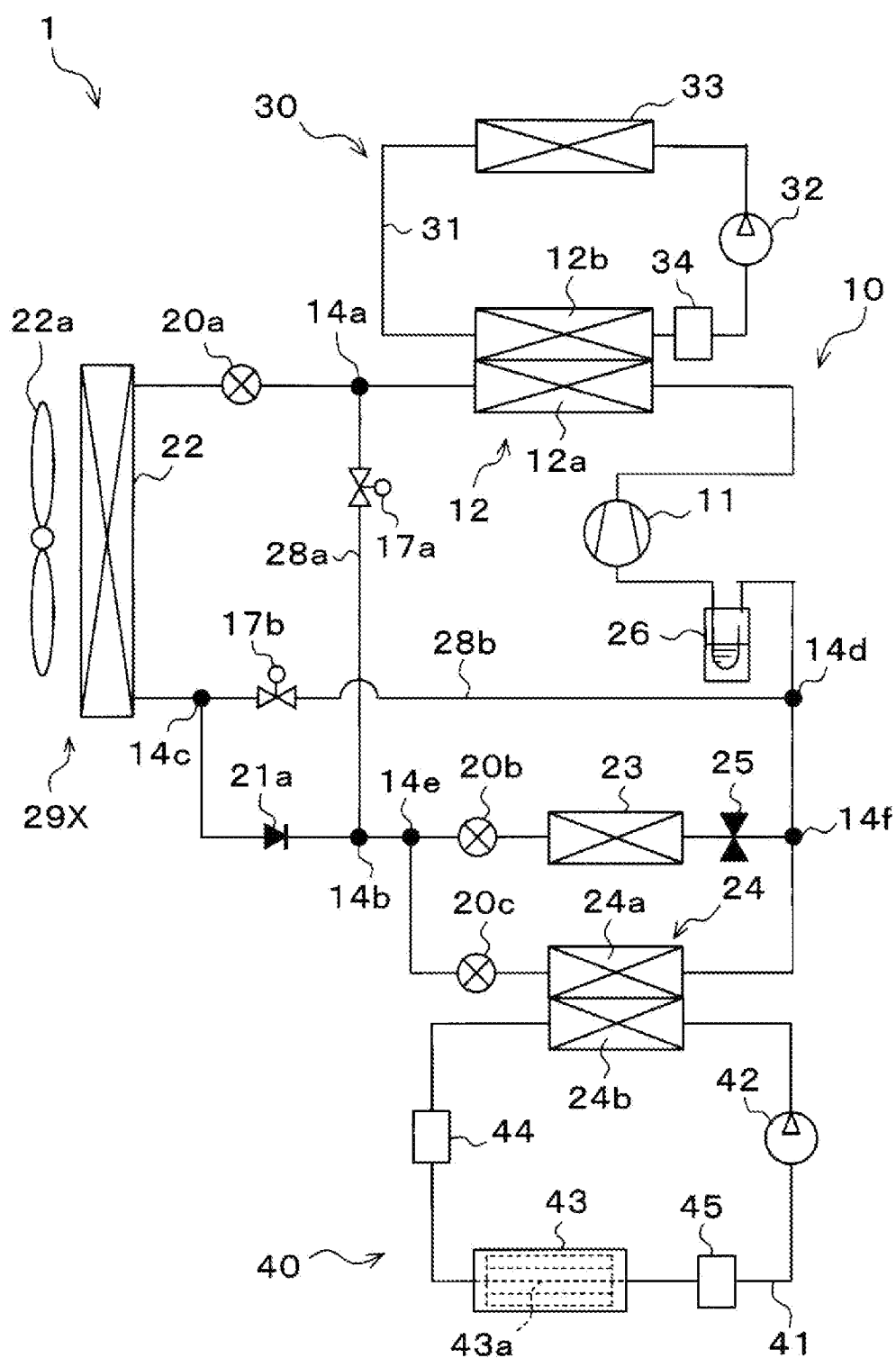
FIG. 24 is an overall configuration diagram of a vehicle air conditioner according to a third embodiment.

As shown in FIG. 24, the vehicle air conditioner 1 according to the third embodiment includes a refrigeration cycle 10, a high-temperature side heating medium circuit 30, a low-temperature side heating medium circuit 40, an indoor air conditioning unit 60, and the like. The configurations of the high-temperature side heating medium circuit 30, the low-temperature side heating medium circuit 40, the indoor air conditioning unit 60, and the controller 70 according to the third embodiment are similar to those of the above-described embodiments.

A compressor 11, a water refrigerant heat exchanger 12, a heating expansion valve 20a, an air-cooling expansion valve 20b, a cooling expansion valve 20c, an outdoor heat exchanger 22, an indoor evaporator 23, a chiller 24, and the like are connected to the refrigeration cycle 10 according to the third embodiment.

An inlet side of the refrigerant passage 12a of the water refrigerant heat exchanger 12 is connected to a discharge port of the compressor 11 according to the third embodiment. The water refrigerant heat exchanger 12 has a configuration similar to that of the above-described embodiments. The water refrigerant heat exchanger 12 corresponds to an example of a heating heat exchanger, and constitutes the heating unit 35 together with the high-temperature side heating medium circuit 30.

To an outlet of the refrigerant passage 12a of the water refrigerant heat exchanger 12, an inflow port side of the first connection portion 14a having a three-way joint structure having three inflow/outflow ports communicating with each other is connected. In the refrigeration cycle 10 according to the third embodiment, a second connection portion 14b to a sixth connection portion 14f configured similarly to the first connection portion 14a are disposed.

An inlet side of the heating expansion valve 20a is connected to one outflow port of the first connection portion 14a. The heating expansion valve 20a corresponds to an example of a first expansion valve. One inflow port side of the second connection portion 14b is connected to the other outflow port of the first connection portion 14a through a refrigerant bypass passage 28a. A dehumidification on-off valve 17a is disposed in the refrigerant bypass passage 28a.

The dehumidification on-off valve 17a is an electromagnetic valve that opens and closes a refrigerant passage connecting the other outflow port side of the first connection portion 14a and one inflow port side of the second connection portion 14b. Furthermore, the refrigeration cycle 10 includes a heating on-off valve 17b as described below. The basic configuration of the heating on-off valve 17b is similar to that of the dehumidification on-off valve 17a. The dehumidification on-off valve 17a and the heating on-off valve 17b can switch the refrigerant circuit of each operation mode by opening and closing the refrigerant passage.

A refrigerant inlet side of the outdoor heat exchanger 22 is connected to an outlet of the heating expansion valve 20a. Similarly to the first embodiment, the outdoor heat exchanger 22 is an example of an outside air heat exchanger, and constitutes an outside-air heat exchange unit 29X. The outside air fan 22a is disposed to blow outside air to the outdoor heat exchanger 22.

An inflow port side of the third connection portion 14c is connected to the refrigerant outflow port of the outdoor heat exchanger 22. One inflow port side of the fourth connection portion 14d is connected to one outflow port of the third connection portion 14c through the heating passage 28b. A heating on-off valve 17b that opens and closes the refrigerant passage is disposed in the heating passage 28b.

The other inflow port side of the second connection portion 14b is connected to the other outflow port of the third connection portion 14c. A first check valve 21a is disposed in a refrigerant passage connecting the other outflow port side of the third connection portion 14c and the other inflow port side of the second connection portion 14b.

An inflow port side of the fifth connection portion 14e is connected to the outflow port of the second connection portion 14b. An inlet side of the air-cooling expansion valve 20b is connected to one outflow port of the fifth connection portion 14e. An inlet side of the cooling expansion valve 20c is connected to the other outflow port of the fifth connection portion 14e. Similarly to the first embodiment, the air-cooling expansion valve 20b and the cooling expansion valve 20c correspond to an example of a second expansion valve.

A refrigerant inlet side of the indoor evaporator 23 is connected to an outlet of the air-cooling expansion valve 20b. Similarly to the first embodiment, the indoor evaporator 23 is an example of an evaporator. The inlet side of the refrigerant passage 24a of the chiller 24 is connected to the outlet of the cooling expansion valve 20c. The chiller 24 corresponds to an example of an evaporator. The other inflow port side of the sixth connection portion 14f is connected to the outlet of the refrigerant passage 24a of the chiller 24.

An inlet side of the evaporating pressure adjusting valve 25 is connected to a refrigerant outlet of the indoor evaporator 23. The evaporating pressure adjusting valve 25 maintains the refrigerant evaporating pressure in the indoor evaporator 23 at a predetermined reference pressure or higher to prevent frost formation on the indoor evaporator 23. The evaporating pressure adjusting valve 25 includes a mechanical variable throttle mechanism that increases a valve opening degree in accordance with an increase in pressure of the outlet side refrigerant of the indoor evaporator 23.

Accordingly, the evaporating pressure adjusting valve 25 maintains the refrigerant evaporating temperature in the indoor evaporator 23 at a temperature equal to or higher than a frost formation suppression temperature (in the present embodiment, 1° C.) at which frost formation of the indoor evaporator 23 can be suppressed. One inflow port side of the sixth connection portion 14f is connected to the outlet of the evaporating pressure adjusting valve 25. The other inflow port side of the fourth connection portion 14d is connected to the outflow port of the sixth connection portion 14f.

An inlet side of the accumulator 26 is connected to the outflow port of the fourth connection portion 14d. The accumulator 26 is a gas-liquid separator that separates the refrigerant flowing into the accumulator into gas and liquid and stores surplus liquid-phase refrigerant in the cycle. A suction port side of the compressor 11 is connected to a gas-phase refrigerant outlet of the accumulator 26.

According to the refrigeration cycle 10 according to the third embodiment, various refrigerant circuits can be switched by controlling the operations of the heating on-off valve 17b, the air-cooling expansion valve 20b, the cooling expansion valve 20c, the dehumidification on-off valve 17a, and the heating on-off valve 17b. That is, the vehicle air conditioner 1 according to the third embodiment can switch to the refrigerant circuit in the heating mode, the refrigerant circuit in the air-cooling mode, the refrigerant circuit in the dehumidification heating mode, and the like.

Figure 25:
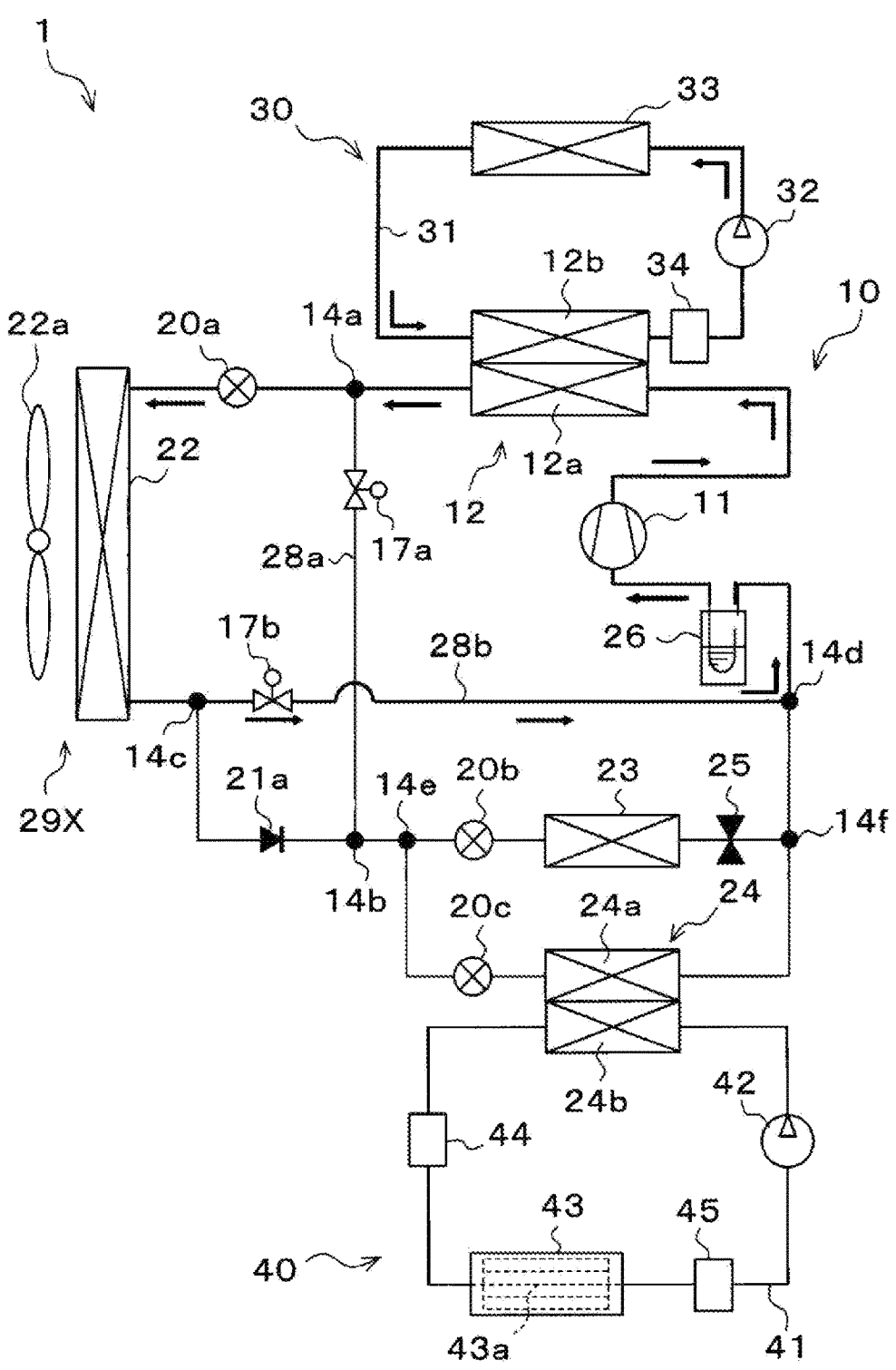
FIG. 25 is an overall configuration diagram showing operation in a heating mode in the vehicle air conditioner of the third embodiment.

Next, a heating mode of the vehicle air conditioner 1 according to the third embodiment will be described with reference to FIG. 25. In the heating mode according to the third embodiment, the controller 70 closes the dehumidification on-off valve 17a and opens the heating on-off valve 17b. The controller 70 brings the heating expansion valve 20a into the throttling state, and brings the air-cooling expansion valve 20b and the cooling expansion valve 20c into the fully closed state.

In addition, the controller 70 operates the high-temperature side pump 32 to pressure-feed the high-temperature side heating medium with a predetermined pressure-feeding capacity. In the heating mode, the controller 70 keeps the low-temperature side pump 42 in a stopped state.

Accordingly, in the refrigeration cycle 10 in the heating mode, a vapor compression refrigeration cycle is configured. As shown in FIG. 25, the refrigerant in the heating mode flows and circulates in the order of the compressor 11, the water refrigerant heat exchanger 12, the heating expansion valve 20a, the outdoor heat exchanger 22, the heating on-off valve 17b, the accumulator 26, and the compressor 11.

That is, in the refrigeration cycle 10 of the heating mode, the outdoor heat exchanger 22 is caused to absorb heat into the low-pressure refrigerant from the outside air, and the water refrigerant heat exchanger 12 is caused to dissipate heat of the high-pressure refrigerant discharged from the compressor 11 to the high-temperature side heating medium. By circulating the high-temperature side heating medium in the high-temperature side heating medium circuit 30, the ventilation air passing through the heater core 33 is heated by the heat of the high-temperature side heating medium.

Therefore, in the heating mode according to the third embodiment, heating in the vehicle interior can be performed by blowing out the ventilation air heated in the heater core 33 into the vehicle interior.

Here, in the third embodiment as well, frost is formed on the outdoor heat exchanger 22 when the outside air has a low temperature and a high humidity during the heating operation. The vehicle air conditioner 1 according to the third embodiment has a condensation heat defrosting mode as an operation mode of the defrosting operation.

Figure 26:
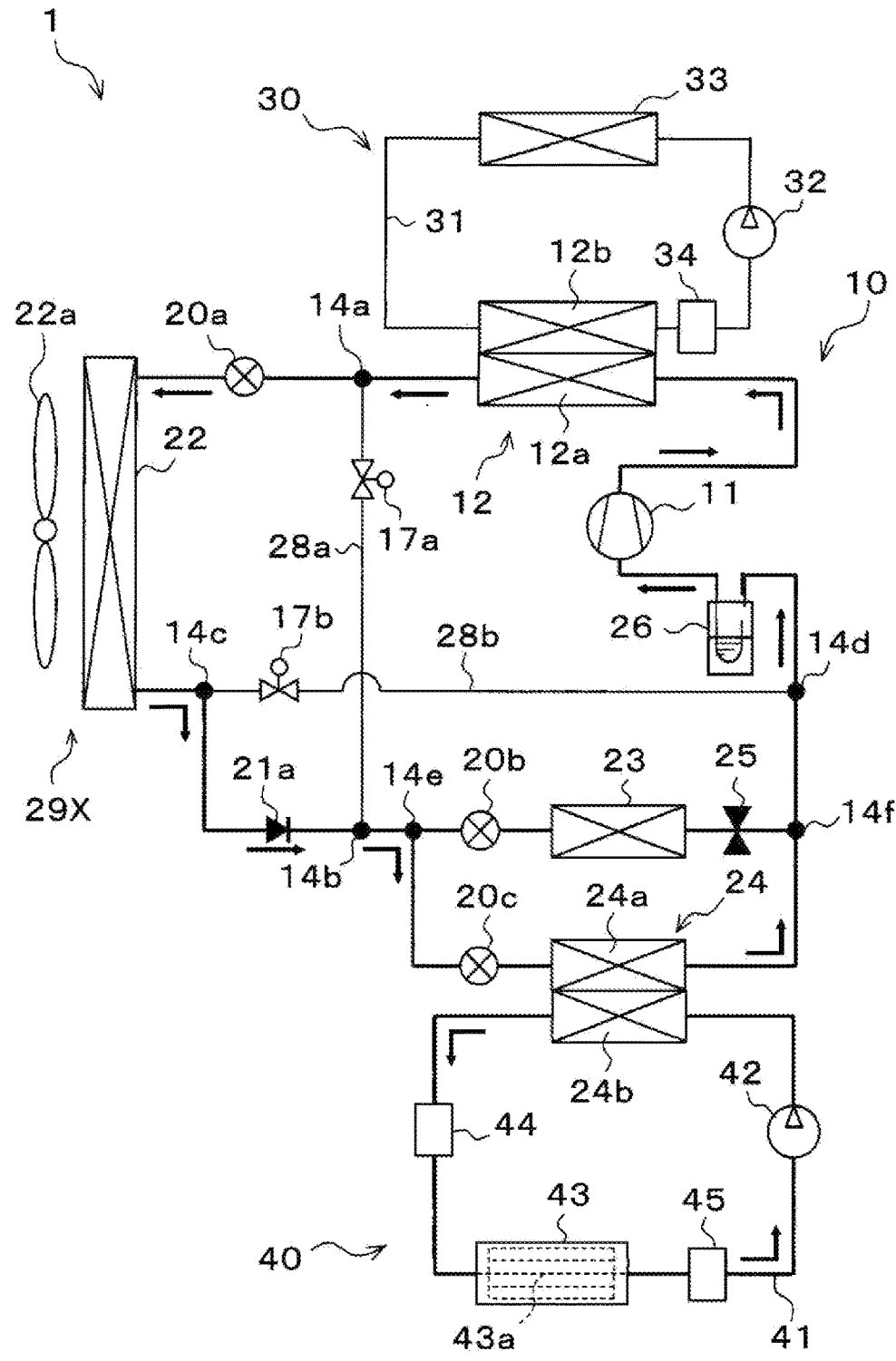
FIG. 26 is an overall configuration diagram showing an example of operation in a condensation heat defrosting mode in the vehicle air conditioner of the third embodiment.

Next, the condensation heat defrosting mode in the third embodiment will be described with reference to FIG. 26. Similarly to the first embodiment, the condensation heat defrosting mode of the third embodiment is an operation mode in which defrosting of the outdoor heat exchanger 22 is performed using heat absorbed from the low-temperature side heating medium circuit 40 by the chiller 24.

In the condensation heat defrosting mode, the controller 70 closes the dehumidification on-off valve 17a and the heating on-off valve 17b. The controller 70 brings the heating expansion valve 20a into the fully opened state and brings the cooling expansion valve 20c into the throttling state. The air-cooling expansion valve 20b is brought into a fully closed state.

In addition, with respect to the low-temperature side heating medium circuit 40, the controller 70 causes the low-temperature side pump 42 to operate and to pressure-feed the low-temperature side heating medium with a predetermined pressure-feeding capacity. In the condensation heat defrosting mode, the controller 70 keeps the high-temperature side pump 32 in a stopped state regarding the high-temperature side heating medium circuit 30.

Accordingly, in the refrigeration cycle 10 in the case of the condensation heat defrosting mode, the refrigerant flows and circulates in the order of the compressor 11, the water refrigerant heat exchanger 12, the heating expansion valve 20a, the outdoor heat exchanger 22, the first check valve 21a, the cooling expansion valve 20c, the chiller 24, the accumulator 26, and the compressor 11. With this circuit configuration, the controller 70 controls operations of various apparatuses to be controlled.

That is, in the refrigeration cycle 10 in the condensation heat defrosting mode, since the heat generated in the battery 75 absorbed by the chiller 24 is pumped up in the refrigeration cycle 10 and added to the outdoor heat exchanger 22, the outdoor heat exchanger 22 can be defrosted.

In the condensation heat defrosting according to the third embodiment as well, the melt defrosting and the dry defrosting are executed. Regarding a control mode of the melt defrosting and the dry defrosting, the same method as that of the first embodiment can be adopted.

Figure 27:
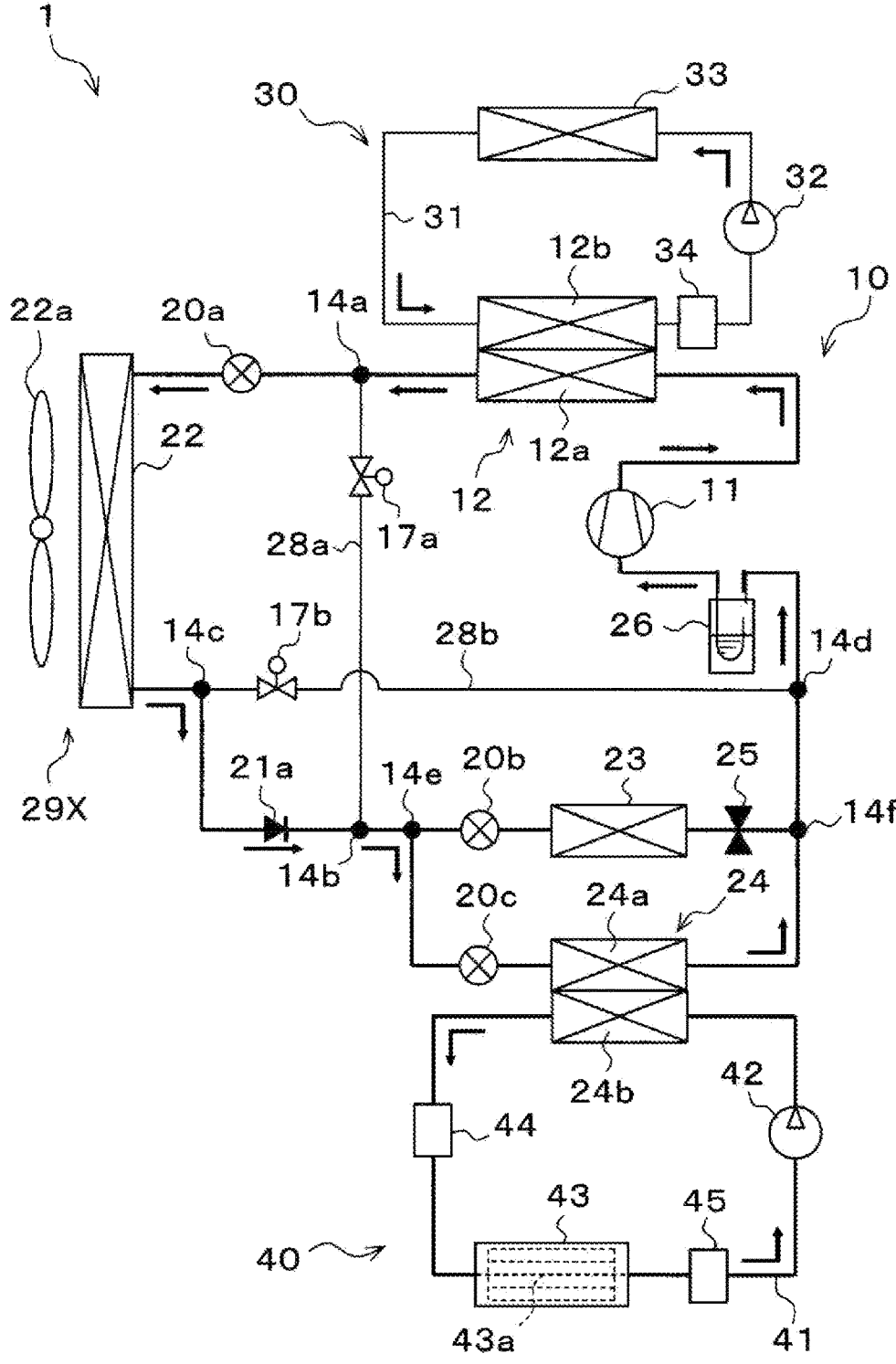
FIG. 27 is an overall configuration diagram showing an example of operation in a heating defrosting mode in the vehicle air conditioner of the third embodiment.

Next, a heating defrosting mode according to the third embodiment will be described with reference to FIG. 27. In the third embodiment as well, the heating defrosting mode is an operation mode in which heating of the space to be air conditioned and condensation heat defrosting of the outdoor heat exchanger 22 are executed in parallel. In the condensation heat defrosting in this case as well, melt defrosting and dry defrosting are included.

In the heating defrosting mode, the controller 70 closes the dehumidification on-off valve 17a and the heating on-off valve 17b. The controller 70 brings each of the heating expansion valve 20a and the cooling expansion valve 20c into the throttling state, and brings the air-cooling expansion valve 20b into the fully closed state.

In addition, with respect to the low-temperature side heating medium circuit 40, the controller 70 causes the low-temperature side pump 42 to operate and to pressure-feed the low-temperature side heating medium with a predetermined pressure-feeding capacity. In the heating defrosting mode, with respect to the high-temperature side heating medium circuit 30, the controller 70 causes the high-temperature side pump 32 to operate and to pressure-feed the high-temperature side heating medium with a predetermined pressure-feeding capacity.

Accordingly, in the refrigeration cycle 10 in the case of the heating defrosting mode, the refrigerant flows and circulates in the order of the compressor 11, the water refrigerant heat exchanger 12, the heating expansion valve 20a, the outdoor heat exchanger 22, the first check valve 21a, cooling expansion valve 20c, the chiller 24, the accumulator 26, and the compressor 11. With this circuit configuration, the controller 70 controls operations of various apparatuses to be controlled.

That is, in the refrigeration cycle 10 in the condensation heat defrosting mode, the heat generated in the battery 75 absorbed by the chiller 24 can be pumped up in the refrigeration cycle 10 and used for heating of the space to be air conditioned through the heating unit 35 and condensation heat defrosting of the outdoor heat exchanger 22.

In the heating defrosting mode according to the third embodiment, the control mode of each component device of the vehicle air conditioner 1 and the control contents related to the efficiency priority mode and the comfort priority mode can adopt the same method as that of the first embodiment described above. Therefore, repeated description related to the specific control mode of the heating defrosting mode will be omitted.

In the heating defrosting mode according to the third embodiment, when the temperature of the refrigerant required in the water refrigerant heat exchanger 12 is different from the temperature of the refrigerant required in the outdoor heat exchanger 22, two different refrigerant temperatures are achieved by the operation control of the compressor 11 and the operation control of the heating expansion valve 20a.

That is, the compression control unit 70d can control the operation of the compressor 11 and achieve the refrigerant temperature or pressure required for any one of the water refrigerant heat exchanger 12 and the outdoor heat exchanger 22. Furthermore, the decompression control unit 70e can control the operation of the heating expansion valve 20a and achieve the refrigerant temperature or pressure required for any one of the water refrigerant heat exchanger 12 and the outdoor heat exchanger 22.

As described above, according to the vehicle air conditioner 1 of the third embodiment, even when the accumulator cycle is adopted as the refrigeration cycle 10, the same effects as those of the above-described embodiments can be obtained from the same configuration as that of the above-described embodiments.

The present disclosure is not limited to the above-described embodiments, and can be variously modified as follows within a range of not departing from the gist of the present disclosure.

In the above-described embodiments, the melt defrosting and the dry defrosting are executed as the condensation heat defrosting. However, when it can be considered that moisture generated by melting is not re-frozen after the melt defrosting is executed, the dry defrosting may be omitted. For example, when weather information or the like corresponding to the current position of the electric vehicle is acquired by the communication unit 74 and the outside air temperature becomes higher than 0° C. for a predetermined period in the future, dry defrosting may be omitted.

In addition, the condensation heat defrosting in the above-described embodiments has, as an example, a mode in which heat absorbed from the low-temperature side heating medium circuit 40 by the chiller 24 is used, but the present disclosure is not limited to this mode. The heat absorbing target is not limited as long as the heat absorbed by the evaporator disposed on the low-pressure side can be used for defrosting of the outdoor heat exchanger 22. As a mode of the condensation heat defrosting, for example, heat can be absorbed from the air in the indoor air conditioning unit 60 in the indoor evaporator 23, or heat can be absorbed in both the indoor evaporator 23 and the chiller 24.

In the heating defrosting mode when the heating unit 35 of the vehicle air conditioner 1 includes the water refrigerant heat exchanger 12 and the high-temperature side heating medium circuit 30, it is also possible to initially set the comfort priority mode out of the efficiency priority mode and the comfort priority mode. In the comfort priority mode in this case, when the defrosting capacity of the outdoor heat exchanger 22 is insufficient, the condensation heat defrosting may be ended.

Although the present disclosure has been described in accordance with examples, it is understood that the present disclosure is not limited to the examples and structures. The present disclosure also includes various modifications, and modifications within an equivalent scope. In addition, various combinations and modes, and other combinations and modes including only one element, more elements, or less elements are also within the scope and idea of the present disclosure.

What is claimed is:

1. An air conditioner for a vehicle, comprising:
a refrigeration cycle including:
a compressor configured to compress and discharge a refrigerant, a heating unit including a heating heat exchanger configured to condense the refrigerant discharged from the compressor during a heating operation of heating a space to be air conditioned, the heating unit being configured to heat ventilation air to be blown to the space to be air conditioned using the refrigerant as a heat source, an outside-air heat exchange unit including an outside air heat exchanger in which the refrigerant absorbs heat from outside air during the heating operation, a first expansion valve disposed between an outflow port of the heating heat exchanger and an inflow port of the outside air heat exchanger, the first expansion valve being configured to decompress the refrigerant flowing out of the heating heat exchanger, a second expansion valve configured to decompress the refrigerant flowing out of at least one of the heating heat exchanger or the outside air heat exchanger, and an evaporator configured to cause the refrigerant decompressed by the second expansion valve to absorb heat and evaporate; and a controller configured to perform a condensation heat defrosting operation in which frost adhering to the outside air heat exchanger is melted and defrosted using heat of the refrigerant absorbed in the evaporator, and a heating operation in which a heating of the space to be air conditioned is performed using heat dissipation from the refrigerant in the heating heat exchanger, wherein the controller includes a compression control unit and a decompression control unit, and when the condensation heat defrosting operation and the heating operation of the space to be air conditioned are performed in parallel, and when a heating operation temperature or pressure of the refrigerant in the heating heat exchanger for the heating operation is different from a defrosting operation temperature or pressure of the refrigerant in the outside air heat exchanger for the condensation heat defrosting operation, the compression control unit is configured to achieve any one of the heating operation temperature or pressure of the refrigerant in the heating heat exchanger, or the defrosting operation temperature or pressure of the refrigerant in the outside air heat exchanger by controlling operation of the compressor, and the decompression control unit is configured to achieve the other one of the heating operation temperature or pressure of the refrigerant in the heating heat exchanger, or the defrosting operation temperature or pressure of the refrigerant in the outside air heat exchanger by controlling operation of the first expansion valve.

2. The air conditioner for a vehicle according to claim 1, wherein in the condensation heat defrosting operation, the outside air heat exchanger is configured to evaporate moisture generated by melting of the frost, by using heat absorbed in the refrigerant.

3. The air conditioner for a vehicle according to claim 2, wherein in the condensation heat defrosting operation, the controller sets the defrosting operation temperature or pressure of the refrigerant in the outside air heat exchanger so as to reduce visibility when moisture generated by defrosting of the outside air heat exchanger evaporates.

4. The air conditioner for a vehicle according to claim 2, further comprising an outside air fan configured to blow the outside air to the outside air heat exchanger during the condensation heat defrosting operation, wherein in the condensation heat defrosting operation, the controller sets a wind speed of the outside air by the outside air fan so as to reduce visibility when moisture generated by defrosting of the outside air heat exchanger evaporates.

5. The air conditioner for a vehicle according to claim 1, wherein the controller is configured to set an efficiency priority mode in which the condensation heat defrosting operation and the heating operation of the space to be air conditioned are performed in parallel and the condensation heat defrosting operation is prioritized over the heating operation of the space to be air conditioned, the compression control unit controls operation of the compressor to achieve the defrosting operation temperature or pressure of the refrigerant in the outside air heat exchanger, and the decompression control unit controls operation of the first expansion valve to achieve the heating operation temperature or pressure of the refrigerant in the heating heat exchanger.

6. The air conditioner for a vehicle according to claim 5, wherein when a temperature or a pressure of the refrigerant in the outside air heat exchanger is lower than the defrosting operation temperature or pressure of the refrigerant in the outside air heat exchanger in the efficiency priority mode, the decompression control unit increases an opening degree of the first expansion valve to reduce a heat dissipation amount in the heating heat exchanger.

7. The air conditioner for a vehicle according to claim 1, wherein the controller is configured to set a comfort priority mode in which the condensation heat defrosting operation and the heating operation of the space to be air conditioned are performed in parallel and the heating operation of the space to be air conditioned is prioritized over the condensation heat defrosting operation, and in the comfort priority mode, the compression control unit controls operation of the compressor to achieve the heating operation temperature or pressure of the refrigerant in the heating heat exchanger, and the decompression control unit controls operation of the first expansion valve to achieve the defrosting operation temperature or pressure of the refrigerant in the outside air heat exchanger.

8. The air conditioner for a vehicle according to claim 1, further comprising an auxiliary heater configured to heat ventilation air to be blown into the space to be air conditioned using a heat source different from the refrigeration cycle, wherein when the condensation heat defrosting operation and the heating operation of the space to be air conditioned are performed in parallel, and a temperature or a pressure of the refrigerant in the heating heat exchanger is less than a temperature or a pressure of the refrigerant for the heating operation of the space to be air conditioned, the controller is configured to operate the auxiliary heater and to compensate the heating capacity.

9. The air conditioner for a vehicle according to claim 1, wherein the controller further includes:

a mode determination unit configured to determine, which of an efficiency priority mode, in which the condensation heat defrosting operation is prioritized over the heating operation of the space to be air conditioned, or a comfort priority mode, in which the heating operation of the space to be air conditioned is prioritized over the condensation heat defrosting operation, is appropriate, when the condensation heat defrosting operation and the heating operation of the space to be air conditioned are performed in parallel, and a mode setting unit configured to set any one of the efficiency priority mode or the comfort priority mode based on a determination result of the mode determination unit.

10. An air conditioner for a vehicle, comprising:

a refrigeration cycle including:

a compressor configured to compress and discharge a refrigerant, a heating unit including a heating heat exchanger configured to condense the refrigerant discharged from the compressor during a heating operation of heating a space to be air conditioned, the heating unit being configured to heat ventilation air to be blown to the space to be air conditioned using the refrigerant as a heat source, an outside-air heat exchange unit including an outside air heat exchanger in which the refrigerant absorbs heat from outside air during the heating operation, a first expansion valve disposed between an outflow port of the heating heat exchanger and an inflow port of the outside air heat exchanger, the first expansion valve being configured to decompress the refrigerant flowing out of the heating heat exchanger, a second expansion valve configured to decompress the refrigerant flowing out of at least one of the heating heat exchanger or the outside air heat exchanger, and an evaporator configured to cause the refrigerant decompressed by the second expansion valve to absorb heat and evaporate; and a controller including at least one of (i) a circuit and (ii) a processor with a memory storing computer program code executable by the processor, the at least one of the circuit and the processor being configured to cause the controller to perform:

a condensation heat defrosting operation in which frost adhering to the outside air heat exchanger is melted and defrosted using heat of the refrigerant absorbed in the evaporator; and a heating operation in which a heating of the space to be air conditioned is performed using heat dissipation from the refrigerant in the heating heat exchanger, wherein when the condensation heat defrosting operation and the heating operation of the space to be air conditioned are performed in parallel, and when a heating operation temperature or pressure of the refrigerant in the heating heat exchanger for the heating operation is different from a defrosting operation temperature or pressure of the refrigerant in the outside air heat exchanger for the condensation heat defrosting operation, the controller is configured to:

achieve any one of the heating operation temperature or pressure, or the defrosting operation temperature or pressure by controlling operation of the compressor; and achieve the other one of the heating operation temperature or pressure, or the defrosting operation temperature or pressure by controlling operation of the first expansion valve.

11. The air conditioner for a vehicle according to claim 10, further comprising an auxiliary heater configured to heat ventilation air to be blown into the space to be air conditioned using a heat source different from the refrigeration cycle, wherein when the condensation heat defrosting operation and the heating operation of the space to be air conditioned are performed in parallel, and a temperature or a pressure of the refrigerant in the heating heat exchanger is less than a temperature or a pressure of the refrigerant for the heating operation of the space to be air conditioned, the controller is configured to operate the auxiliary heater and to compensate the heating capacity.

12. The air conditioner for a vehicle according to claim 1, wherein the controller is further configured to:

determine, which of an efficiency priority mode, in which the condensation heat defrosting operation is prioritized over the heating operation of the space to be air conditioned, or a comfort priority mode, in which the heating operation of the space to be air conditioned is prioritized over the condensation heat defrosting operation, is appropriate, when the condensation heat defrosting operation and the heating operation of the space to be air conditioned are performed in parallel; and set any one of the efficiency priority mode or the comfort priority mode based on a determination result of the mode determination unit.

* * * * *